United States Patent
Koplow

(10) Patent No.: US 8,854,713 B2
(45) Date of Patent: *Oct. 7, 2014

(54) POWER SELECTIVE OPTICAL FILTER DEVICES AND OPTICAL SYSTEMS USING SAME

(75) Inventor: Jeffrey P. Koplow, San Ramon, CA (US)

(73) Assignee: Sandia Corporation, Albuquerque, NM (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/464,245

(22) Filed: May 4, 2012

(65) Prior Publication Data
US 2012/0263197 A1  Oct. 18, 2012

Related U.S. Application Data

(63) Continuation-in-part of application No. 12/767,327, filed on Apr. 26, 2010, now Pat. No. 8,213,070.

(60) Provisional application No. 61/215,609, filed on May 6, 2009, provisional application No. 61/482,605, filed on May 4, 2011, provisional application No. 61/482,611, filed on May 4, 2011, provisional application No. 61/518,481, filed on May 5, 2011.

(51) Int. Cl.
*G02B 26/00* (2006.01)
*G02B 6/27* (2006.01)
*H01S 3/11* (2006.01)
*H01S 3/00* (2006.01)
*H01S 3/067* (2006.01)

(52) U.S. Cl.
CPC .............. *H01S 3/0675* (2013.01); *G02B 6/274* (2013.01); *H01S 3/0057* (2013.01); *H01S 3/06791* (2013.01); *H01S 3/1112* (2013.01); *H01S 3/06758* (2013.01); *H01S 2301/02* (2013.01); *H01S 3/06712* (2013.01)
USPC ............................................ 359/238; 359/256

(58) Field of Classification Search
USPC ......... 359/238, 246, 250, 251, 483, 484, 485, 359/497, 256, 352, 437, 489.01, 489.07, 359/489.15, 341.1; 385/11, 15, 18
See application file for complete search history.

(56) References Cited

U.S. PATENT DOCUMENTS 4,548,479 A  10/1985  Yeh
6,584,059 B1  6/2003  Saimi et al.
(Continued)

OTHER PUBLICATIONS

J. P. Koplow and D. B. Soh, "The 4FAD: a high-extinction-ratio, achromatic, temperature-insensitive, high-damage-threshold, all-fiber, power-selective filter," in *CLEO:2011—Laser Applications to Photonic Applications*, OSA Technical Digest (CD) (Optical Society of America, 2011), paper CMZ5.

(Continued)

Primary Examiner — Tuyen Tra
(74) Attorney, Agent, or Firm — Marcus Simon

(57) ABSTRACT

In an embodiment, a power selective optical filter device includes an input polarizer for selectively transmitting an input signal. The device includes a wave-plate structure positioned to receive the input signal, which includes at least one substantially zero-order, zero-wave plate. The zero-order, zero-wave plate is configured to alter a polarization state of the input signal passing in a manner that depends on the power of the input signal. The zero-order, zero-wave plate includes an entry and exit wave plate each having a fast axis, with the fast axes oriented substantially perpendicular to each other. Each entry wave plate is oriented relative to a transmission axis of the input polarizer at a respective angle. An output polarizer is positioned to receive a signal output from the wave-plate structure and selectively transmits the signal based on the polarization state.

25 Claims, 32 Drawing Sheets

(56) References Cited

U.S. PATENT DOCUMENTS 7,027,135 B2 * 4/2006 Fu et al. .................. 356/73.1
2004/0169923 A1 9/2004 Hug

OTHER PUBLICATIONS

Fiber Logix, "In-Line Fiber Optic Polarizer Data Sheet", Aug. 2004, pp. 1-2.

R. H. Stolen, J. Botineau, and A. Ashkin, "Intensity discrimination of optical pulses with birefringent fibers", *Bell Laboratories*, Optics Letters, vol. 7, No. 10, Oct. 1982, pp. 512-514.

Zhang et al., Measurements and analyses of fields in fused tapered single-mode fiber couplers, Applied Optics, vol. 28, No. 11, Jun. 1989, pp. 2026-2030.

International Search Report and Written Opinion from International Application No. PCT/US2011/031446 dated Dec. 29, 2011.

* cited by examiner

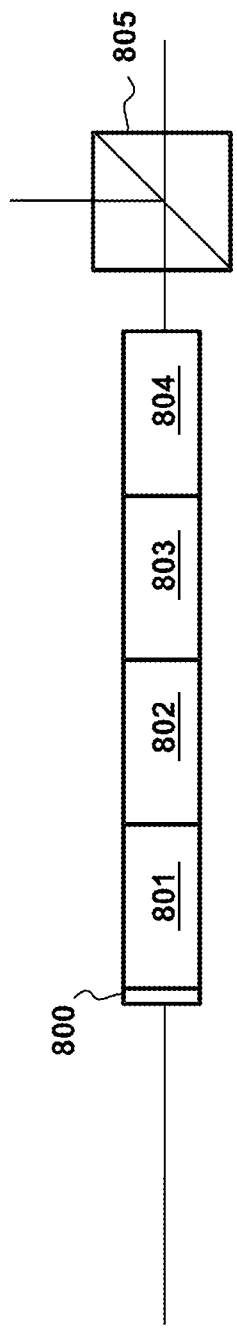
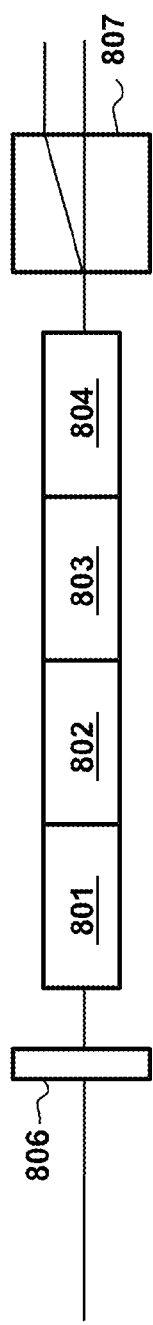
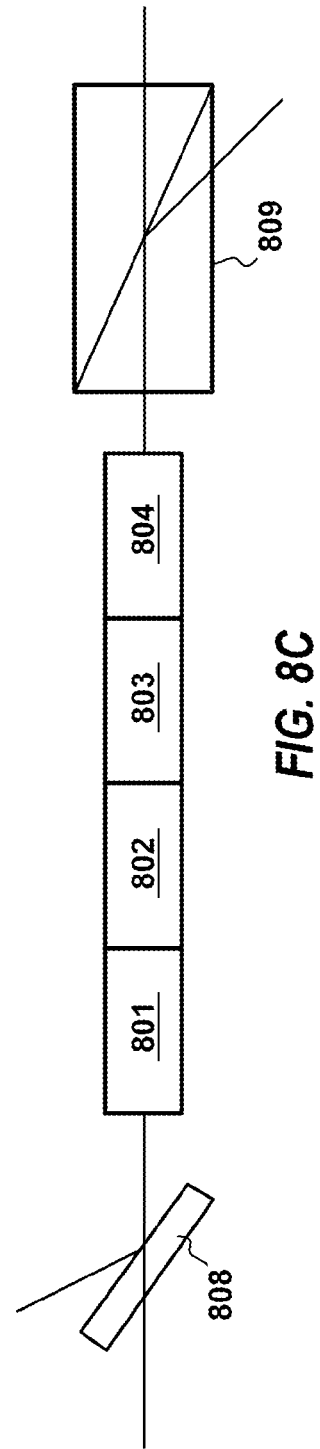
FIG. 8A
FIG. 8B
FIG. 8C

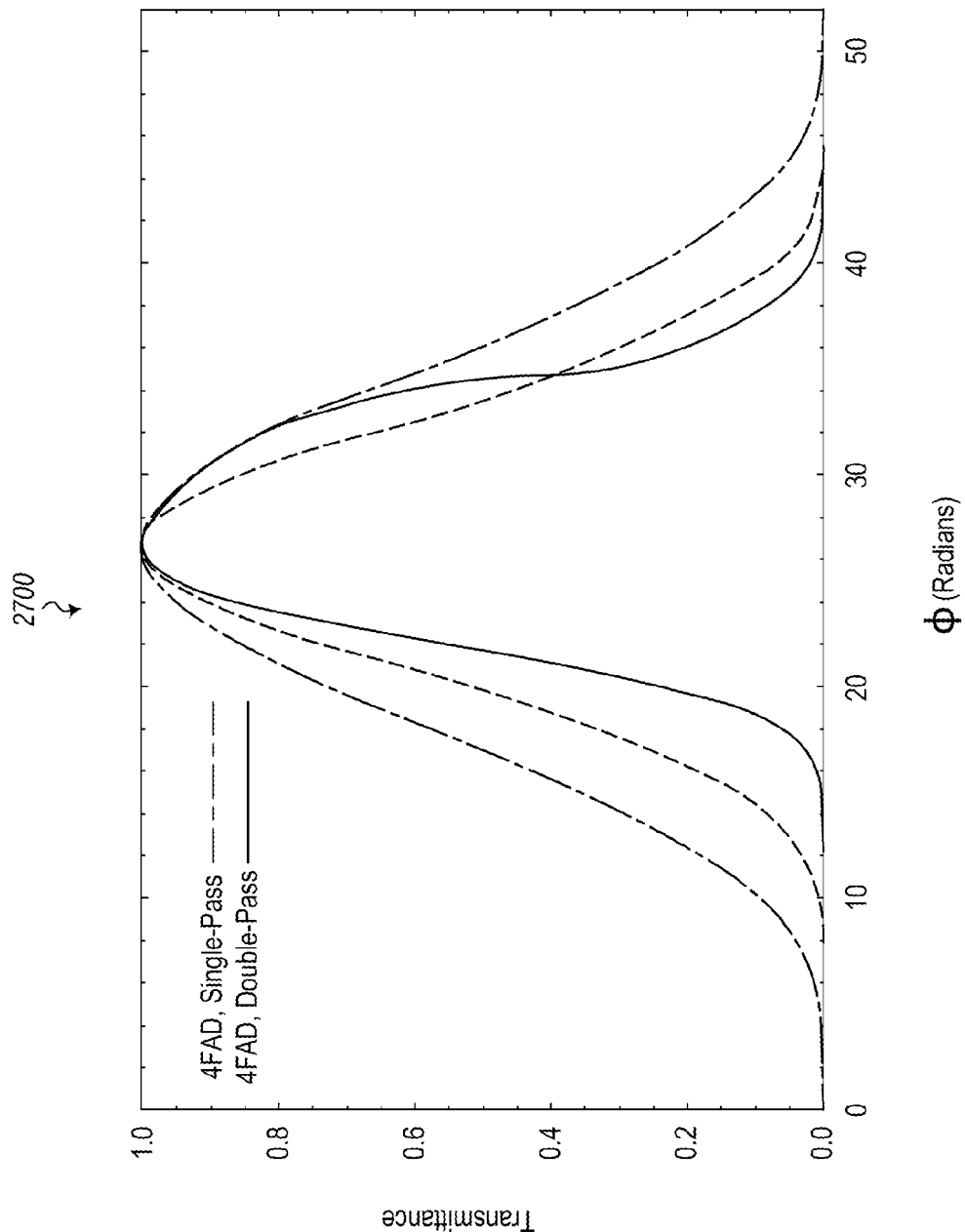

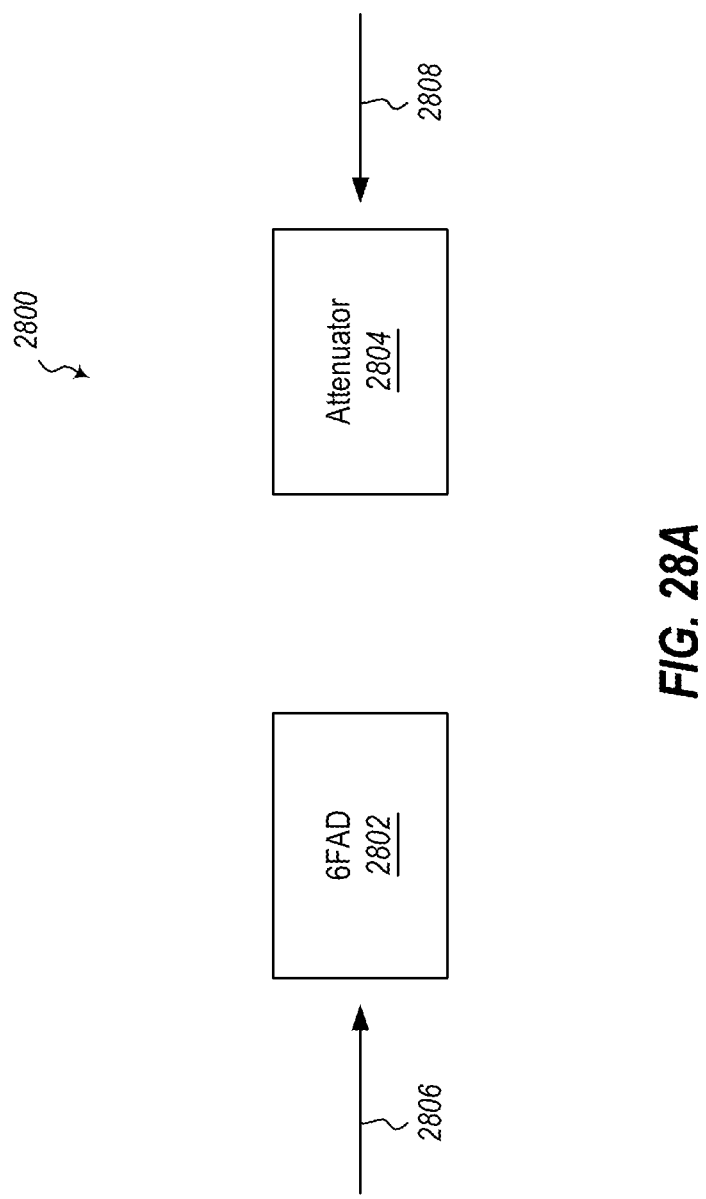

POWER SELECTIVE OPTICAL FILTER DEVICES AND OPTICAL SYSTEMS USING SAME

CROSS-REFERENCE TO RELATED APPLICATION

This application is a continuation-in-part of U.S. application Ser. No. 12/767,327 filed on 26 Apr. 2010 now U.S. Pat. No. 8,213,070, which claims the benefit of U.S. Provisional Application No. 61/215,609 filed on 6 May 2009. This application also claims the benefit of U.S. Provisional Application No. 61/482,605 filed on 4 May 2011, U.S. Provisional Application No. 61/482,611 filed on 4 May 2011, and U.S. Provisional Application No. 61/518,481 filed on 5 May 2011. The contents of each of foregoing applications are incorporated herein, in their entirety, by this reference.

STATEMENT REGARDING GOVERNMENT RESEARCH AND DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

Optical fiber amplifiers are used in a wide variety of important applications. An optical fiber amplifier typically includes a core region that is doped with at least one active element (e.g., a rare earth element) to provide gain. Examples of rare-earth dopants used in fiber amplifiers include Er, Yb, Nd, and Tu. Er-doped fiber amplifier technology is predominant in fiber optic communications applications because the range of wavelength over which Er-doped silica provides optical amplification (typically 1530 to 1580 nm) roughly coincides with the wavelength for minimum transmission loss in silica fiber. Yb-doped amplifiers, which typically provide amplification in the 1030 to 1100 nm range, are predominant in non-communications applications. This is primarily due to their high wall plug efficiency and scalability to extremely high average powers (multiple kW).

Roughly speaking, there are three distinct operating regimes for rare-earth-doped fiber laser technology. Fiber amplifiers may be configured as continuous wave ("cw") sources, low-energy-pulse sources, and high-energy-pulse sources.

When operated in cw mode, the fiber laser output power as a function of time is nominally constant, and the population inversion of the gain medium is in steady state equilibrium. Energy is extracted from the gain medium by stimulated emission at substantially the same rate that energy is delivered to the gain medium by absorption of pump light photons. Common cw fiber laser configurations include the master oscillator power amplifier ("MOPA"), in which a fiber amplifier is seeded by a low-power cw seed source, and various cw fiber laser architectures in which some form of regenerative feedback (e.g. fiber Bragg grating mirrors) and a partially transmitting output coupler are used in conjunction with a fiber amplifier, either in a linear or ring-shaped cavity. Also included in this first category are "quasi-cw" fiber lasers, involving intermittent cw operation for periods of time well in excess of the energy storage time of the fiber amplifier gain medium.

When operated in the low-energy-pulse mode, the total energy extracted by each pulse is a very small fraction of that stored in the fiber amplifier gain medium. Therefore, as in a cw fiber laser, the population inversion as a function of time is substantially constant. Examples of fiber amplifiers operating in the low-pulse-energy regime include amplification of high-bit rate signals, and mode-locked fiber lasers. In the former application (e.g. telecommunications), the pulse train is a pseudo-random train of ones and zeroes that may be modeled as a square wave of very high frequency (e.g., GHz) having a nominal duty cycle of 50%. Mode-locked fiber lasers, on the other hand, generate a low duty cycle (e.g. 1%) periodic waveform in which the peak power of each pulse may exceed the average output power by two or more orders of magnitude. Nonetheless, the total energy extracted by each pulse is a very small fraction of the energy stored in the fiber amplifier gain medium, such that the population inversion of the gain medium is substantially constant as a function of time. Typical pulse energies, pulse durations, and pulse repetition rates for mode-locked fiber lasers may be 0.1 to 100 nJ, 0.1 to 1000 ps, and 1 to 100 MHz, respectively.

The high-energy-pulse regime is distinctly different than the cw and low-energy-pulse regimes in that amplification occurs under non-steady-state-equilibrium conditions. The energy extracted by each pulse is a significant fraction of that stored in the fiber gain medium, and the population inversion of the gain medium is not constant as a function of time. Fiber laser configurations for operation in the high-energy-pulse regime include q-switched fiber lasers, fiber amplifiers seeded by high-peak-power sources such as passively q-switched micro-chip lasers, and appropriately configured multistage fiber amplifier chains used in conjunction with a low-peak-power seed sources such as pulsed diode lasers. Typical pulse energies, pulse durations, and pulse repetition rates may be 10 to 1000 µJ, to 100 ns, and 1 to 100 kHz, respectively.

The high-energy-pulse regime poses significant challenges to efficient operation of lasers and other types of amplifiers.

SUMMARY

Embodiments of the invention are directed to power selective optical filter devices, such as optical switch structures and optical limiter structures, and to self-starting, passively mode-locked fiber lasers.

In an embodiment, a power selective optical filter device includes an input polarizer having a transmission axis. The input polarizer is configured to selectively transmit at least a portion of an input signal therethrough, which exhibits a polarization state and a power. The power selective optical filter device also includes a wave-plate structure positioned to receive the at least a portion of the input signal transmitted through the input polarizer. The wave-plate structure includes at least a first substantially zero-order, zero-wave plate ("ZOZWP") configured to alter the polarization state of the input signal passing therethrough in a manner that is dependent on the power of the input signal. The first ZOZWP includes an entry wave plate having a fast axis and an exit wave plate having a fast axis. The fast axis of the entry wave plate is oriented substantially perpendicular to the fast axis of the exit wave plate. Each of the entry wave plates of the first and second ZOZWPs is oriented relative to the transmission axis of the input polarizer at a respective selected entry-wave-plate angle. The power selective optical filter device further includes an output polarizer positioned to receive the polarization-state-altered signal output from the wave-plate structure. The output polarizer is configured to selectively transmit at least a portion of the polarization-state-altered signal based on the polarization state thereof.

The disclosed power selective optical filter devices and/or wave-plate structures may be combined to selectively tailor a transmittance thereof. For example, in an embodiment, a power selective optical filter device includes a first power selective optical filter device. The first power selective optical filter device includes a first input polarizer having a transmission axis. The first input polarizer is configured to selectively transmit at least a portion of an input signal therethrough, which exhibits a polarization state and a power. The power selective optical filter device also includes a first wave-plate structure positioned to receive the at least a portion of the input signal transmitted through the first input polarizer. The first wave-plate structure includes a first ZOZWP and a second ZOZWP arranged in series with the first ZOZWP and oriented at a selected angle relative to the first ZOZWP. The first and second ZOZWPs are configured to alter the polarization state of the at least a portion of the input signal passing therethrough in a manner that is dependent on the power of the at least a portion of the input signal. Each of the first and second ZOZWPs includes an entry wave plate having a fast axis and an exit wave plate having a fast axis. The fast axis of the entry wave plate is oriented substantially perpendicular to the fast axis of the exit wave plate. Each of the entry wave plates of the first and second ZOZWPs is oriented relative to the transmission axis of the input polarizer at a respective selected entry-wave-plate angle. The first power selective optical filter device further includes a first output polarizer positioned to receive the polarization-state-altered signal output from the first wave-plate structure. The first output polarizer is configured to selectively transmit at least a portion of the polarization-state-altered signal based on the polarization state thereof.

The power selective optical filter device also includes a second power selective optical filter device. The second power selective optical filter device includes a second wave-plate structure positioned to receive the polarization-state-altered signal output transmitted through the first output polarizer. The second wave-plate structure includes a first ZOZWP and a second ZOZWP arranged in series with the first ZOZWP and oriented at a selected angle relative to the first ZOZWP. The first and second ZOZWPs of the second power selective optical filter device are configured to alter the polarization state of the at least a portion of the polarization-state-altered signal passing therethrough in a manner that is dependent on the power of the at least a portion of the at least a portion of the polarization-state-altered signal. Each of the first and second ZOZWPs of the second power selective optical filter device includes an entry wave plate having a fast axis and an exit wave plate having a fast axis. The fast axis of the entry wave plate is oriented substantially perpendicular to the fast axis of the exit wave plate. Each of the entry wave plates of the first and second ZOZWPs is oriented relative to the transmission axis of the input polarizer at a respective selected entry-wave-plate angle. The second power selective optical filter device further includes a second output polarizer positioned to receive the polarization-state-altered signal output from the second wave-plate structure. The second output polarizer is configured to selectively transmit at least a portion of the polarization-state-altered signal based on the polarization state thereof.

The disclosed wave-plate structures and power selective optical filter devices may be employed in a number of different applications. For example, in an embodiment, a self-starting, passively mode-locked fiber laser includes a polarizer having a transmission axis. The polarizer is configured to selectively transmit at least a portion of an input signal therethrough. At least a portion of the input signal exhibits a polarization state and a power. The self-starting, passively mode-locked fiber laser also includes a fiber amplifier configured to receive the input signal and amplify the power of the input signal, and a wave-plate structure positioned to receive the input signal. The wave-plate structure includes at least a first ZOZWP configured to alter the polarization state of the input signal passing therethrough in a manner that is dependent on the power of the input signal. The first ZOZWP includes an entry wave plate having a fast axis and an exit wave plate having a fast axis. The fast axis of the entry wave plate is oriented at a predetermined angle relative to the fast axis of the exit wave plate. The entry wave plate of the first ZOZWP is oriented relative to the transmission axis of the input polarizer at a selected entry-wave-plate angle. The wave-plate structure is twisted along a longitudinal axis thereof. In this manner, signals having a power below a threshold power level passing through the polarizer in either direction make only one pass through the fiber amplifier before being substantially extinguished when the signal reencounters the polarizer.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

FIG. 8A-8C are schematic side views of device configurations, according to different embodiments, illustrating some of the many different types of polarizers that may used in conjunction with four-wave-plate structure of FIG. 3 to form an optical switch structure or optical limiter structure.

FIG. 27 is a transfer function graph of the power selective optical filter device shown in FIG. 23.

FIG. 28A is a diagrammatic view of an embodiment of an optical system including a 6FAD in series with an attenuator to form a non-reciprocal optical device.

DETAILED DESCRIPTION

I. Introduction

Figure 1:
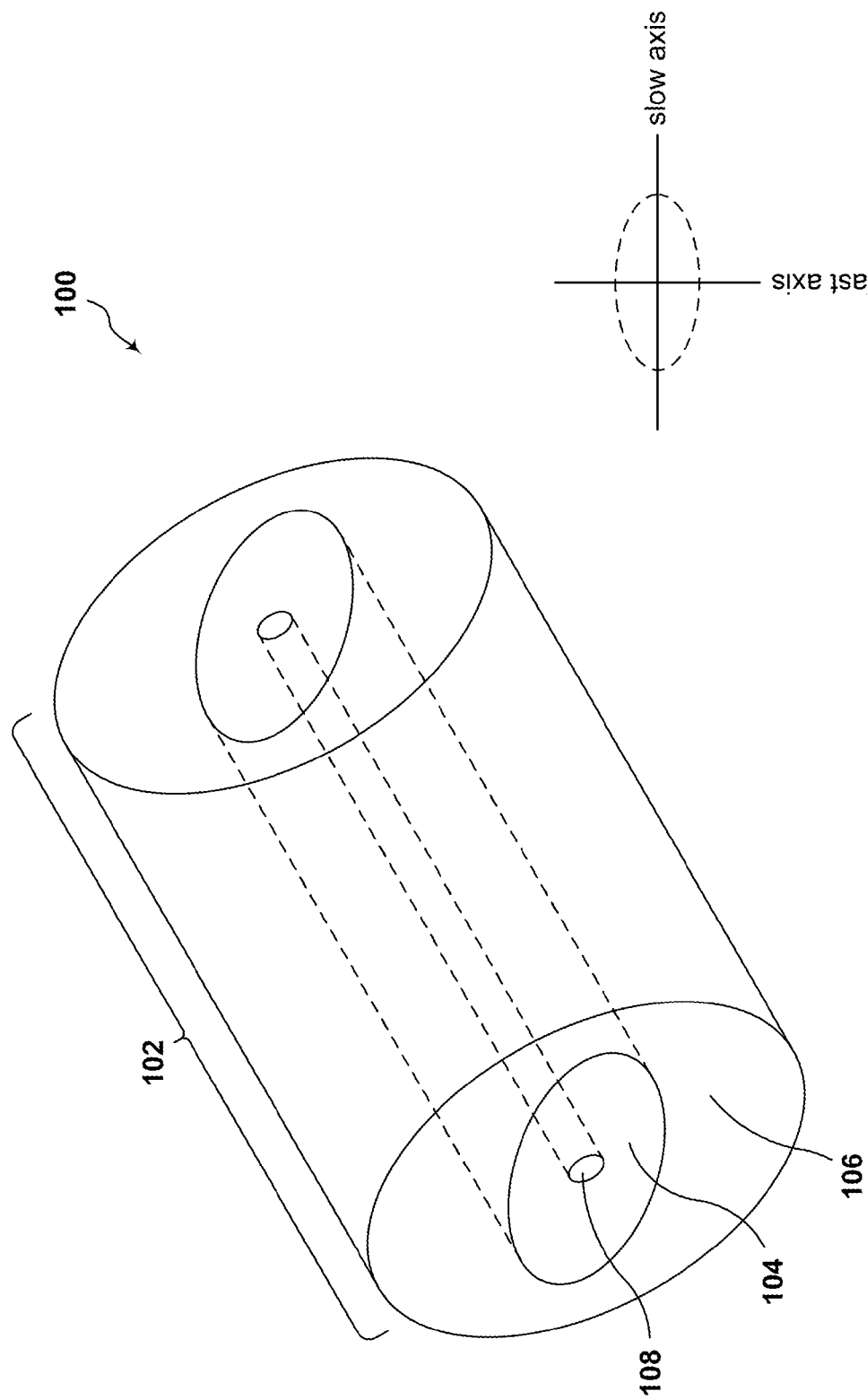
FIG. 1 is an isometric view of an example of a linearly birefringent passive optical component commonly referred to as a "wave plate" or "optical retarder."

Embodiments of the invention are directed to wave-plate structures and power selective optical filter devices, such as optical switch structures and optical limiter structures. A number of optical systems are also disclosed that employ such wave-plate structures and power selective optical filter devices in various applications.

One or more of the embodiments disclosed herein may provide an all-fiber, achromatic, nonlinear optical switching device that transmits high-peak-power pulses with very low-insertion-loss, but provides bi-directional blocking of low-peak-power and/or cw signals with very high extinction ratio. Such an optical switching device enables the construction of multi-stage fiber amplifiers having bi-directional isolation of ASE between successive fiber amplifiers, thereby enabling ultra-high-gain pulse amplification.

The ability to rigorously divide such an ultra-high-gain fiber amplifier into separate, lower gain sections also circumvents small-signal-gain limitations that would otherwise be imposed by cw parasitic lasing associated with in-fiber Rayleigh scattering. Such a nonlinear optical switching device may eliminate the need for Faraday isolators, wavelength filters, and amplitude modulators used in current state-of-the-art multi-stage fiber amplifiers, while at the same time providing much higher pulse amplification gain. More broadly, such a nonlinear optical switching device may eliminate high-peak-power seed sources and/or high performance q-switches as prerequisites to successful development of fiber technology for the high-energy-pulse regime.

II. Overview of Problems Operating in the High-Energy Pulse Regime

The inventor has appreciated numerous problems that occur when operating in the high-energy pulse regime. When operating in the high-energy-pulse regime, typically the objective is to store as much energy in a gain medium as possible, and then to extract as much of this energy as possible in the form of a brief pulse having extremely high peak power. The output pulse trains of such high energy pulsed fiber lasers may typically have duty cycles of order 0.0001 to 0.1%, and peak powers in the 1 to 1000 kW range. In contrast to the case of cw and low-energy-pulse lasers, when operated in the high-energy-pulse regime, the small-signal gain of the fiber amplifier is not clamped to low values by continuous extraction of power from the gain medium. Rather, between pulses the population inversion (and thus the small-signal gain and stored energy) is allowed to build up to very high levels, and is typically limited only by amplified spontaneous emission.

ASE is the amplification of photons generated by spontaneous emission (fluorescence) emitted by the excited-state rare-earth ions of the gain medium. A small fraction of this omni-directional fluorescent emission falls within the capture angle of the fiber optic waveguide. Once captured, these spontaneous emission photons propagate down the fiber (in both directions) and are therefore subject to amplification. The number of spontaneous emission photons generated per unit time is linearly proportional to the population inversion, but the amount of amplification they receive within the fiber amplifier is exponentially proportional to the population inversion. Thus, in cw and low-energy-pulse systems, where the population inversion is clamped to a low, constant value, the effects of amplified spontaneous emission on device operation are typically of no particular significance. On the other hand, if the population inversion is allowed to build-up indefinitely, eventually the small-signal gain of the amplifier becomes so large (e.g. 40 dB) that ASE photons are generated at a rate that is comparable to the rate at which pump photons are absorbed by the gain medium. In this high-pump-power limit, the steady state population inversion transitions from a linear to a logarithmic dependence on pump power.

Thus, ASE imposes practical limitations on the maximum amount of energy that may be stored in the gain medium and the maximum amount of small-signal gain that can be attained in a single-stage amplifier. The limited energy storage places an upper bound on fiber laser pulse energy. The limited small-signal gain has important consequences because of the technological limitations (low peak power) of pulsed seed sources.

For example, passively q-switched micro-chip lasers generating ns-duration pulses with peak powers of order 1 to 10 kW are well suited to operation of fiber lasers in the high-energy-pulse regime. A single-stage fiber amplifier seeded by a micro-chip laser seed source may easily generate pulse energies of several hundred µJ and peak powers of several hundred kW. But passively q-switched micro-chip lasers are available only at a few discrete wavelengths, provide little or no adjustability of temporal pulse shape, duration and repetition rate, and are prohibitively expensive for many real-world applications. A further drawback of using micro-chip lasers in conjunction with high gain fiber amplifiers is the need to optically isolate the highly reflective micro-chip laser output coupler from the fiber amplifier. Typically, a two-stage Faraday isolator is required to obtain adequate isolation. This is a serious drawback because most high-energy-pulse sources are based on Yb-doped fiber lasers operating in the 1040 to 1080 nm range; there is a limited choice of non-absorbing Faraday rotator materials in this wavelength range, and the resulting Faraday isolators are large, heavy, and expensive.

Unlike micro-chip laser seed sources, laser diode seed sources, which are available at a wide range of wavelengths, provide complete flexibility with respect to pulse shape, duration, and repetition rate, and are not prohibitively expensive. However, the relatively low peak power available from pulsed laser diode seed sources having adequate beam quality to couple efficiently into the lowest-order transverse mode of a fiber laser (1 to 10 W, limited primarily by the low optical damage threshold of semi-conductor materials), when used in conjunction with a single-stage fiber amplifier, falls far short of what's required to reach the high-energy-pulse regime. Similar considerations apply to pulsed seed laser sources comprising a low-power cw or long-pulse-duration laser that is "chopped" or "gated" by an external amplitude modulator.

At first this may seem perplexing given that single-stage fiber amplifiers having small-signal gains of order 40 dB are readily available; this would seem to imply that a pulsed diode laser seed source with a peak power of 10 W could be amplified to a peak power of 100 kW. But recall that operation in the high-energy-pulse regime implies that the energy extracted by each pulse is a significant fraction of that stored in the fiber gain medium. If, for example, half of the energy stored in a four-level laser system (e.g., as an Nd-doped fiber amplifier) is extracted, the fiber amplifier gain collapses from 40 dB to 20 dB (a factor of 100), effectively turning off the amplification process. The situation is even worse in quasi-three-level laser systems such as Yb, Er, and Tu, in which a significant fraction of the population inversion is used to simply to bleach the fiber to transparency (i.e. to reach 0 dB gain) because of ground state absorption. Thus, Yb, Er, and Tu fiber lasers are even more sensitive to gain depletion during pulse amplification. This is a reminder that the word "small" in "small-signal gain" denotes fiber amplifier gain in the limit of a small amplitude seed signal, where negligible depletion of the population inversion occurs during signal amplification.

Thus, despite the fact that fiber amplifiers offer very high small-signal gain, in practice, to access the high-energy-pulse regime, requirements for seed laser peak power and/or pulse energy are quite demanding. Moreover, operation of fiber amplifiers at extremely high gain results in poor efficiency because a substantial fraction of the output power of the fiber amplifier is in the form of cw ASE between pulses. It is also difficult to operate at extremely high gain because even very small back-reflections (e.g. at optical interfaces) along the optical signal path can result in parasitic lasing. Parasitic lasing can place an even more stringent limit on fiber amplifier gain and stored energy than ASE. In light of these considerations, in practice, fiber amplifiers operated in the high-energy-pulse regime typically provide on the order of 15 to 25 dB amplification of pulse energy.

In addition to direct amplification of an external seed source, another approach that can be used to attempt operation in high-energy-pulse regime is q-switching. For example, in a q-switched Nd:YAG laser, a large population inversion is allowed to build up in the gain medium, during which time regenerative feedback (and therefore lasing) is blocked by one or more q-switching elements, such as a high-speed electro-optic shutter. The q-switch is then suddenly switched to its high-transmittance state, thereby allowing regenerative feedback in the laser cavity. For example, such a laser cavity may be comprised of a gain medium and optical shutter sandwiched between a first mirror having 100% reflectivity and a second mirror having only 50% reflectivity (the output coupler). Shortly after q-switch is opened, the resulting intra-cavity avalanche of photons is transmitted through the output coupler, generating a high-energy pulse with a duration of one to several times the round-trip transit time for circulation of light through the laser cavity (typically one to tens of ns).

But the application of q-switching to fiber lasers, rather than bulk solid-state lasers, has been hampered by several difficulties. Q-switched operation requires that the fiber amplifier be operated at very high small signal gain, for two reasons. The first reason is the lack of availability of q-switching devices with very low insertion loss that can be incorporated directly into the fiber. This precludes the construction of a high-q (i.e. low loss) q-switched fiber laser cavity. The latter requirement, that such a q-switch be incorporated directly into the fiber, stems from the high losses associated with fiber-to-free-space-to-fiber coupling (e.g. if a bulk-optic q-switch is used). Thus, it is not possible to construct a conventional low-loss Q-switched laser cavity in which the build-up of a high-energy-pulse from intracavity ASE involves a large number of successive passes through the gain medium, such that the need for high small-signal gain is obviated. Rather, because of cavity losses, q-switched fiber lasers must generally be designed for pulse build up over a relatively small number of passes, which necessitates the use of very high-small signal gain (such that the vast majority of energy extracted by pulse occurs during its final pass through the amplifier, after which the pulse immediately exits the fiber amplifier). This, in turn, requires that the fiber laser q-switch have extremely high extinction ratio (i.e., low leakage when the q-switch is in the "off" state). The extinction ratio of available q-switches is in many cases inadequate (resulting in parasitic lasing). The second reason that the fiber amplifier must be operated at high-small-signal gain is that it must store as much energy as possible. The small cross-sectional area of a fiber (compared to a bulk gain medium such as a Nd:YAG rod) means that energy storage is at a premium, and thus compels operation at high population inversion.

The application of passive rather than active q-switching to fiber amplifiers is hampered by the fact that the absorption cross-sections of available saturable absorber materials are too small (typically $10^{-18}$ to $10^{-17}$ cm$^2$) to be of practical use. On the one hand, operation of the fiber amplifier at very high gain necessitates that the unbleached saturable absorber have very high optical density. This requires a very large number of absorbing species because the absorption cross sections for available materials are relatively small. But a very large number of absorbing species implies that a very large number of photons must be absorbed to switch the saturable absorber from to its absorbing state to its transmitting state. For a fiber amplifier, the amount of pulse energy consumed by such saturable absorbers can be highly prohibitive.

A further difficulty with the application of conventional q-switching to fiber lasers is concerns pulse duration. As mentioned earlier, q-switching generates pulse durations of order one to several times the cavity round trip time. In the case of fiber lasers, this typically implies q-switched pulse durations of order 100 ns. Such long pulse durations are undesirable in many applications. For example, very high peak power may be required for efficient nonlinear frequency conversion, or short pulse duration may be required to meet the spatial resolution requirements of optical ranging applications. The use of short pulse durations to inhibit Stimulated Brillouin scattering ("SBS") is frequently a requirement as well. As a result, pulse durations of order 1 ns are typically considered most desirable. This makes q-switching of fiber lasers rather awkward. Even if an appropriate saturable absorber material was available, passive q-switching would generate long-duration pulses. Active q-switching is possible, but requires an optical shutter having very high extinction ratio that can execute a "closed-open-closed" switching cycle in a period of time of order 1 ns, and repeat this operation several times over a span of a few hundred ns; typically three to five passes through the fiber laser gain medium are required to generate a high-energy-pulse from regenerative amplification of ASE.

The remaining alternative is the use of pulsed laser diode seed sources in conjunction with multi-stage fiber amplifiers. In fact, the use of two or more fiber amplifiers in series would appear to be the obvious solution to the problem of low-peak-power seed sources. But the implementation of such a pulsed laser architecture is badly undermined by ASE. For example, if two nominally identical Nd fiber amplifiers, each having a small-signal gain of 40 dB are spliced together, the result is not a fiber amplifier with a small-signal gain of 80 dB. Rather, the first nominally 40 dB fiber amplifier is flooded by high-average-power ASE generated by the second nominally 40 dB fiber amplifier, and likewise, the second nominally 40 dB fiber amplifier is flooded by high-average-power ASE from the first nominally 40 dB fiber amplifier. This bi-directional exchange of high-power ASE results in very strong mutual gain depletion. The end result is that such a two-stage Nd-doped fiber amplifier behaves like a single-single fiber amplifier having twice the length of the original amplifier, an approximately a two-fold increase in maximum average output power, but still only ~40 dB of small-signal gain. There is also no significant improvement in stored energy. Bi-directional exchange of ASE has in effect turned both 40 dB fiber amplifiers into 20 dB fiber amplifiers. In addition to not providing higher small-signal gain, given the interest in generating high-peak power pulses, a factor of two increase in fiber length is counterproductive from the standpoint of suppressing nonlinear processes such as Stimulated Brillouin scattering, Stimulated Raman scattering ("SRS"), self phase modulation, cross phase modulation, four-wave mixing, etc. In the case of quasi-three-level laser systems such as Yb, Er, and Tu, the wavelength distribution of the fiber gain curve also changes (shifts to longer wavelengths). This can, in fact, cause a net reduction in small-signal gain at the intended operating wavelength.

Because of the ASE problem, multistage amplification can only provide significant benefit if one or more measures are taken to limit the exchange of ASE between successive fiber amplifiers. For example, some degree of improvement can be realized by placing optical isolators between successive fiber amplifiers. Then in principle, multi-stage amplification of ASE can only occur in one propagation direction. In an n-stage fiber amplifier, this allows the first amplifier in the chain to be isolated from ASE generated by the rest of the amplifier chain, and provides a mirror improvement in small-signal gain for amplifiers 2 through n. The efficacy of this technique is modest however, and in practice somewhat degraded by the fact that Faraday isolators typically only provide high extinction ratio over a narrow range of wavelengths (compared to the range of wavelengths contained in the ASE spectrum of a typical fiber amplifier). On the other hand, because ASE has a relatively broad spectral distribution, the addition of n−1 band pass filters, one at each amplifier-amplifier interface, can be used to restrict the range of wavelengths over which ASE is transmitted between amplifiers. For example, such a filter may transmit only 1% of the spectrally broad ASE signal impinging on it from each side (and also addresses the problem that Faraday isolators are not achromatic devices). Unfortunately much of this 20 dB reduction in ASE seed signal is offset in an n-stage amplifier because within the spectral window provided by the series combination of n−1 band pass filters, ASE can still propagate through the entire length of the amplifier chain. Thus, even if the path provided for inter-stage ASE propagation is restricted to one direction of propagation and a relatively narrow wavelength region, such a multi-stage architecture still provides a very effective mechanism for gain clamping, because of power extraction by narrowband ASE and/or narrowband parasitic lasing.

Typically the last resort to combat the problem of inter-stage ASE is to gate the amplification process temporally using n−1 optical shutters having high extinction ratio. Available amplitude modulators having low insertion loss suffer from relatively low extinction ratio, low damage threshold, and/or slow switching time, however. To understand the effect of slow switching time, consider multi-stage amplification of a f-ns-duration seed pulse in a system gated by acousto-optic amplitude modulator having a rise/fall time of 100 ns. The amplified output waveform will consist of a 1-ns-pulse sitting on top of a ~100-ns-wide "pedestal" of amplified ASE. The energy contained in the pedestal portion of the pulsed waveform may be comparable to or greater than the energy contained in the amplified seed pulse, in which case the resulting penalty in efficiency is substantial. The presence of such a pedestal can be detrimental in some applications as well. A large spectral pedestal will also accompany the wavelength spectrum of the amplified pulse, which is also undesirable in some applications. In addition to the fact that the above counter-measures for ASE exchange between successive stages of amplification are not particularly effective, the size, cost, and complexity of such additional hardware has proven prohibitive in many applications.

Having described the extremely detrimental effects of fiber laser ASE on both fiber laser performance and practicality, it is important emphasize that all of the ASE-related problems discussed thus far arise in the context of high-energy-pulse operation. Operation of fiber lasers in the cw and low-energy-pulse regimes is not significantly affected by ASE because power is extracted from the fiber gain medium on a continuous basis using seed power provided on a continuous basis by an external seed source or wavelength-selective regenerative feedback, either of which can be made orders of magnitude more powerful than the effective seed power generated by spontaneous emission.

On the other hand, the inadequate peak power available from practical seed sources such as laser diodes, and to a lesser extent, the need to operate at high population inversion to store as much energy as possible, render an externally seeded fiber amplifier architecture impractical for operation in the high-pulse-energy regime (unless the numerous drawbacks of micro-chip laser seed sources or multi-stage fiber amplifier configurations can be tolerated). If instead, it is attempted to access the high-pulse-energy regime using regenerative feedback rather than an external seed source, we find that existing q-switch technology imposes severe limitations. To successfully apply fiber laser technology to the high-pulse-energy regime, it appears that either (1) an alternative pulsed seed source that preserves the numerous advantages of diode lasers, but circumvents the intrinsically low optical damage threshold of semi-conductor materials must be developed, (2) a q-switch that can meet all of the stringent performance requirements described earlier must be developed, or (3) the problem of ASE exchange in multistage amplifiers must be solved.

This perspective on the successes and failures of fiber amplifier technology with regard to operation in the cw, low-energy-pulse, and high-energy-pulse regimes leads directly to consideration of specifically what optical component technologies are missing in the current state of the art. Major advances in fiber laser technology thus far include (1) the development of rare-earth-doped fiber laser technology itself, (2) the invention of the cladding pumped fiber amplifier, (3) the discovery of photosensitivity and subsequent invention of techniques for external writing of fiber Bragg gratings, the invention and development of (4) fused fiber coupler technology (e.g., wavelength division multiplexing in telecommunications), (5) polarization maintaining fiber, (6) methods for obtaining diffraction limited output from highly multimode gain fibers, (7) the adoption of mode-locking and chirped pulse amplification techniques from the field of ultrafast solid-state lasers, (8) the invention and development of micro-structured fiber technology (also known as "holey", "photonic band gap", and/or "photonic crystal" fibers), (9) the development of high-power, high-brightness pump diodes suitable for pumping double-clad fibers, and (10) the development of fused-fiber-bundle components for high pump power delivery.

Notable deficiencies in fiber laser technology include lack of (1) a practical source of high-power, broad-band, diffraction-limited pump light suitable for pumping fiber Raman amplifiers (e.g. for long-haul fiber telecommunications), (2) adequate process control in rare-earth-doped fiber fabrication (mode-scrambling effects due to fiber perform inhomogeneities and an inability to fabricate optimized refractive index and/or dopant distributions currently limit the maximum core diameter from which diffraction-limited output can be obtained), (3) resolution of issues associated with rare-earth-doped fiber photo-darkening, (4) availability of certain optical components in all-fiber form (e.g. to avoid insertion losses associated with coupling, simplify fiber laser architecture, and/or provide increased reliability), (5) high-performance amplitude modulators (having very high extinction ratio, low insertion loss, fast switching times, and high damage threshold in the form of a compact, low-cost device), (6) satisfactory optical isolator technology at wavelengths below 1100 nm, (7) practical pulsed seed sources for operation of single-stage fiber amplifiers in the high-energy-pulse regime, and (8) a method for multi-stage-fiber-amplifier pulse amplification that provides far better performance, and far better practicality than state of the art multi-stage fiber amplifier systems.

III. Overview of Wave Plates and Substantially Zero-Order, Zero-Wave Plates

Before discussing the various different embodiments of the invention directed to wave-plate structures and power selective optical filters in Section IV hereinbelow, the structure and function of a wave plate and a ZOZWP is discussed with respect to FIGS. 1 and 2. FIG. 1 is an isometric view of an example of a linearly birefringent passive optical component 100, commonly referred to as a "wave plate" or "optical retarder". The wave plate 100 includes a segment 102 of elliptically clad polarization maintaining ("PM") fiber. Such PM fiber incorporates one or more stress-applying structural elements 104 embedded in a fiber cladding 106 that subject a core region 108 of the fiber segment 102 to a mechanical stress field having substantially bilateral symmetry. Examples of commercially available polarization maintaining fiber include, but are not limited to, "Panda" PM fiber (which uses stress rods that are nominally circular in cross section), "Bow-tie" PM fiber (in which the stress rods take the form of annular wedges), and elliptical clad PM fiber (in which an elliptically shaped cladding such as the fiber cladding 104 generates the required stress field). As a result of the elasto-optic effect, the segment 102 of PM fiber acts as a linearly birefringent waveguide, having a "high-index" or "slow" transverse axis substantially parallel to the major axis of the elliptical cladding (or substantially parallel to the plane of the stress rods in a non-elliptical-cladding PM fiber), and a "low-index" or "fast" transverse axis substantially perpendicular to the major axis of the elliptical cladding (plane of the stress rods). In this context, the term "high-index" ("low-index") refers to the waveguide refractive index for a linearly polarized signal propagating through the fiber whose polarization vector is parallel (perpendicular) to the major axis of the elliptical cladding (plane of the stress rods), and the term "slow" ("fast") refers to the relative propagation speed of linearly polarized light whose polarization vector is parallel (perpendicular) to the major axis of the elliptical cladding (plane of the stress rods). Hereafter, the absolute angular orientation of a given segment of PM fiber is specified in terms of the angular orientation of its slow axis relative to the transmission axis of the input polarizer. Unless otherwise stated, it is to be assumed that the fiber segments in question are single transverse mode fibers throughout the relevant range of device operating wavelength.

Such fibers are polarization preserving because the signals traveling down the slow and fast axes dephase relative to each other over a length scale of ~1 mm, thereby preventing efficient mode coupling that would otherwise be caused by refractive index perturbations having spatial frequencies greater than ~1 mm. The degree of process control attainable in practice during the fabrication of real-world fibers is such that the vast majority index perturbations have spatial frequencies much longer than a millimeter. Stated another way, in a conventional non-polarizing fiber, index variations having spatial frequencies much larger than 1 mm are responsible for the vast majority of polarization scrambling observed. As a result of inefficient mode coupling between the fast and slow axes of a PM fiber, in the absence of nonlinear effects, the signal components launched into the fiber that are polarized parallel to the fast and slow axes propagate independently and can be analyzed as such.

Figure 2:
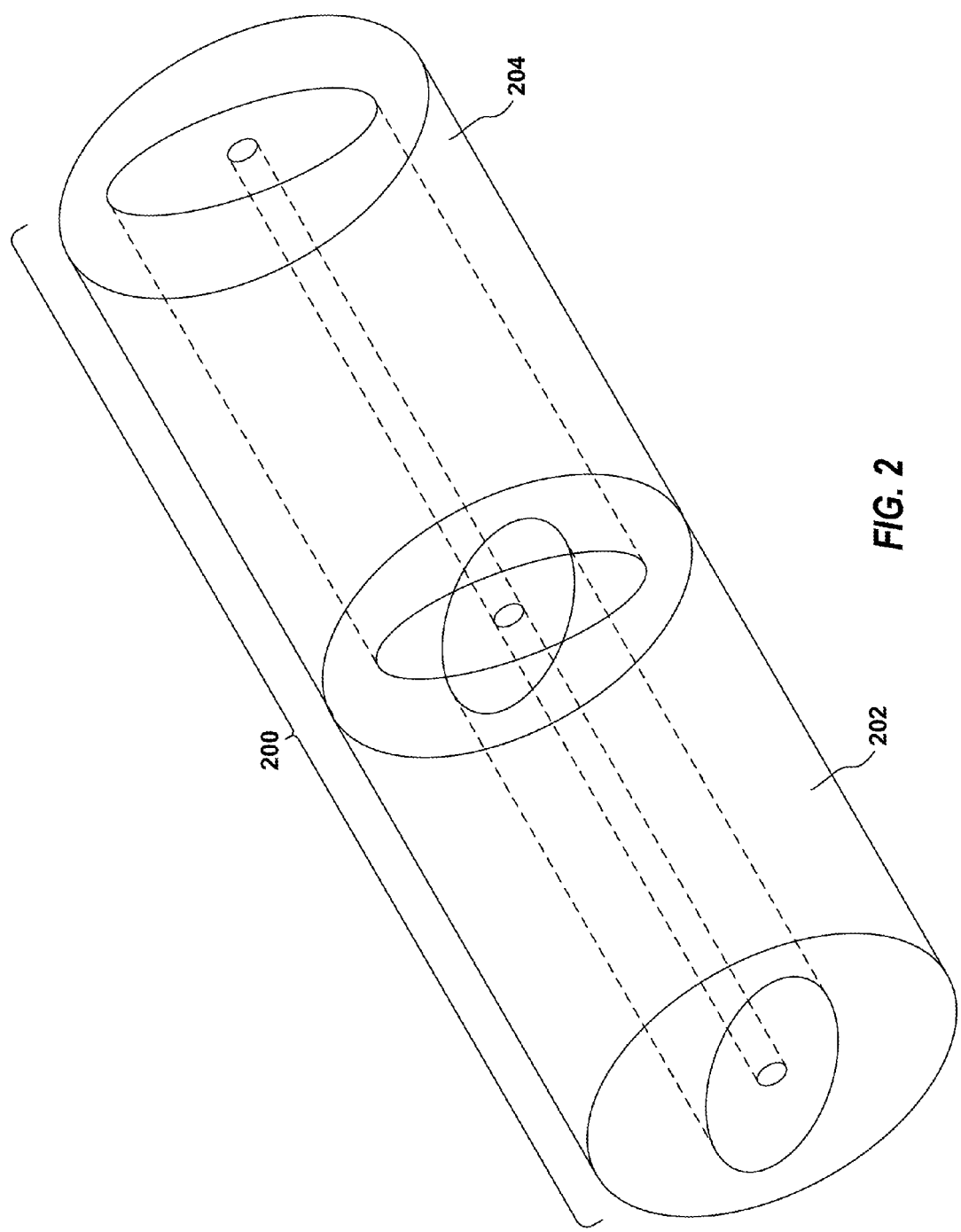
FIG. 2 is an isometric view of an example of a structure having substantially zero net retardation, substantially independent of signal wavelength and ambient temperature, including two wave plates having substantially equal retardation and disposed in a substantially mutually perpendicular orientation.

FIG. 2 is an isometric view of a structure 200 having substantially zero net retardation constructed from two of the wave plates 100 shown in FIG. 1. The structure 200 includes an entry wave plate 202 and an exit wave plate 204 having substantially equal retardations. The slow and fast axes of the entry wave plate 202 are oriented substantially perpendicular to the corresponding slow and fast axes of the exit wave plate 204. Using conventional nomenclature, such a structure may be referred to as a "zero-order, zero-wave plate" or "ZOZWP." Zero-order, zero-wave plates are typically not encountered in optics because in principle they perform no optical function. In the absence of nonlinear effects, such a device performs a null operation on the polarization state of any input signal passing therethrough. In other words, there is no change in the polarization state because there is no net retardation. The signal component that travels along slow axis of entry wave plate 202 travels along the fast axis of the exit wave plate 204, and the signal component that travels along fast axis of entry wave plate 202, travels along the slow axis of the exit wave plate 204. The transit time for both signal components is therefore substantially identical. A linearly polarized signal injected into a ZOZWP therefore experiences substantially no change in polarization state.

The distinction between a zero-wave plate and a ZOZWP is as follows. The term zero-wave plate pertains to any structure in which the net difference in optical path length (distance× index of refraction) for light polarized along the fast and slow axes is an integral number of wavelengths. For example, an $N^{th}$-order zero wave plate would have a net difference in optical path length of $\Delta n\, L = N\lambda$, where $\Delta n$ is the birefringence of the wave plate material, L is the length of the wave plate along the axis of signal propagation, N is an integer, and $\lambda$ is the wavelength of the optical signal. A signal component traversing the wave plate polarized along the slow axis experiences a phase retardation of $2\pi N$ radians relative to a signal component polarized along the fast axis. In general, wave plates are not achromatic devices, for two reasons. The first reason pertains to the wavelength dependence of the equation $\Delta n\, L = N\lambda$. For example, an optical path length difference of 10 μm represents a retardation of exactly 10λ at a wavelength of 1000 nm, but 10.20λ at a wavelength of 980 nm. In this case the net retardation would be zero radians for signal components at 1000 nm, but 1.3 (0.20×2π) radians for signal components at 980 nm. A further consideration is that the birefringence, $\Delta n$, for a given material and/or waveguide structure typically varies as a function of wavelength.

As mentioned above, an $N^{th}$-order wave plate can be constructed from a single length of birefringent material for which $\Delta n\, L = N\lambda$. But an $N^{th}$-order wave plate can also be constructed by placing two lengths of birefringent material having mutually perpendicular fast (slow) axes in series, for which $\Delta n_1\, L_1 - \Delta n_2\, L_2 = N\lambda$. This makes it possible to construct a ZOZWP of non-zero length (by having $\Delta n_1\, L_1 = \Delta n_2\, L_2$). If the two lengths of birefringent material comprising such a zero-order, zero-wave-plate structure each have an identical wavelength dependence for $\Delta n$, or if the two lengths of birefringent material comprising such a structure are each fabricated from the same birefringent material, the net retardation of such a wave plate will be zero radians, independent of wavelength. If the two lengths of birefringent material comprising such a zero-order, zero-wave-plate structure have an identical temperature dependence for $\Delta n\, L$ (dictated by the thermal expansion coefficient of the fiber materials, including the stress applying element(s), and the effective value of do/dT for in mode field region of the fiber), or if the two lengths of birefringent material comprising such a structure are simply fabricated from the same birefringent material, the net retardation of such a wave plate will be zero radians, independent of changes in ambient temperature.

Therefore, a zero-order, zero-wave-plate constructed from nominally equal lengths of nominally identical PM fiber has the following desirable properties for various embodiments described herein. The use of PM fiber eliminates the polarization scrambling effects normally associated with non-polarization-maintaining fiber. In the absence of nonlinear effects, a zero-wave plate performs a null operation on the polarization state of any input signal. A compound structure comprising two mutually perpendicular segments of nominally equal length and nominally identical PM fiber further enables the construction of a ZOZWP, wherein the above null property is substantially independent of wavelength and ambient temperature. In addition, unlike a single wave plate structure, a two-wave-plate structure enables the construction of a ZOZWP having non-zero length. In fact, such a twowave-plate structure can be made arbitrarily long provided that it is constructed from two pieces of nominally identical fiber of substantially equal length. The use of substantially non-zero lengths of fiber optic waveguide enables the generation of substantial self-phase modulation ("SPM") and cross-phase modulation ("XPM") by high-peak-power pulsed optical signals. As described herein, the interaction of these two nonlinear effects can be used to advantageously alter the polarization of high-peak-power signals, and the substantial absence of SPM and XPM generated by low peak-power-power signals leaves the polarization state of such signals significantly unaltered.

Figure 3:
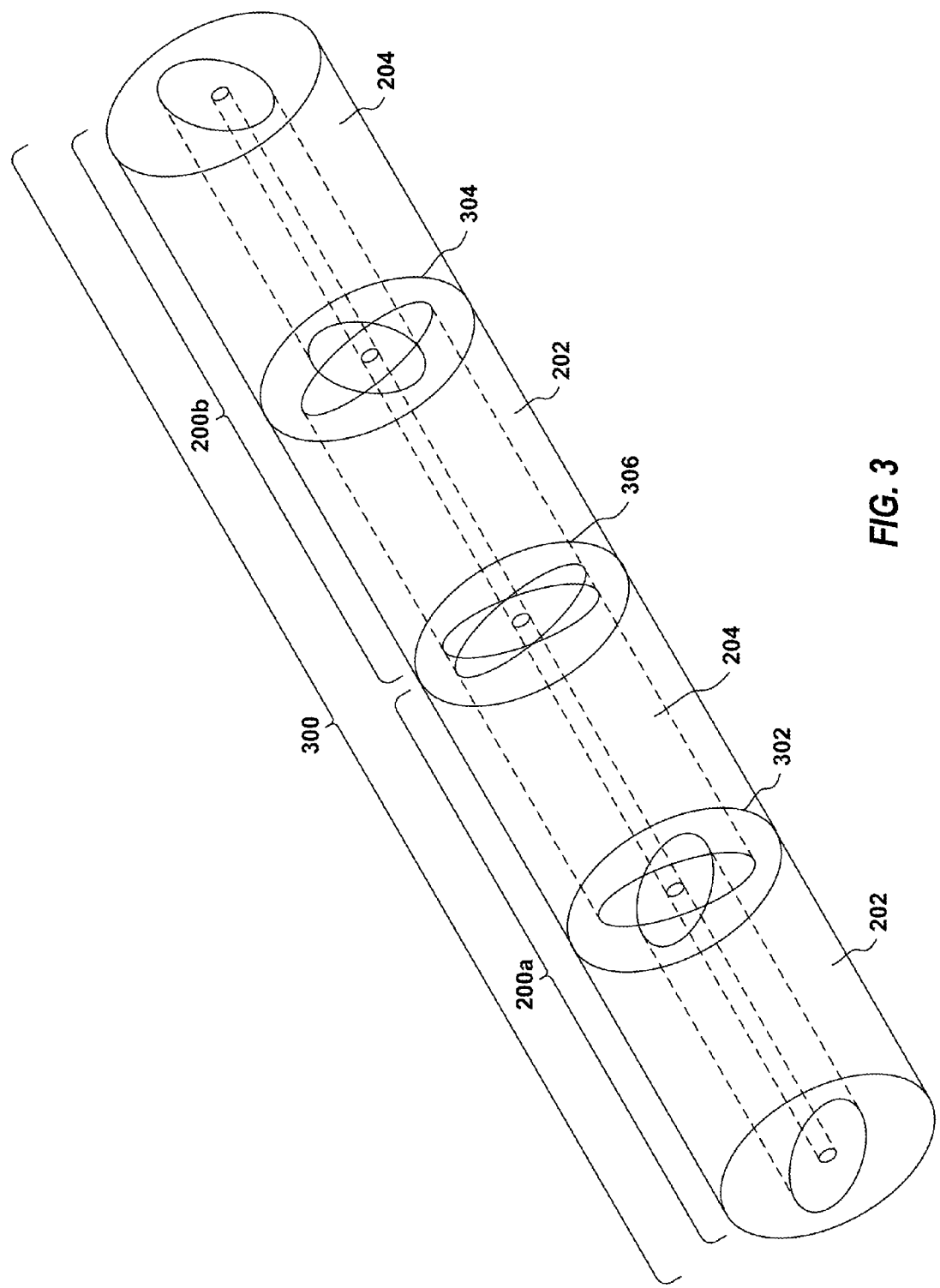
FIG. 3 is an isometric view of an embodiment of a four-wave-plate structure having substantially zero net retardation, substantially independent of signal wavelength and ambient temperature, including a pair of the zero-order, zero-wave-plate structures shown in FIG. 2 disposed in a specified relative angular orientation.

IV. Embodiments of Invention Directed to Wave-Plate Structures and Power Selective Optical Filter Devices FIG. 3 is an isometric view of an embodiment of a four-wave-plate structure 300 having substantially zero net retardation, substantially independent of signal wavelength and ambient temperature, comprising a pair of the substantially zero-order, zero-wave-plate structures 200a and 200b shown in FIG. 2, disposed in a specified relative angular orientation. As depicted in FIG. 3, a relative angle 302 between the slow axis of the entry wave plate 202 and the slow axis of the exit wave plate 204 of the first ZOZWP (ZOZWP 200a) is substantially equal to 90°. A relative angle 304 between the slow axis of the entry wave plate 202 and the slow axis of the exit wave plate 204 of the second ZOZWP 200b is also substantially equal to 90°. A relative angle 306 between the slow axis of the exit wave plate 204 of the first ZOZWP 200a and the slow axis of the entry wave plate 202 of the second ZOZWP 200b is about 40° to about 50°, more specifically about 43° to about 47°, and even more specifically about to 45°.

Some or all of the entry and exit wave plates 202 and 204 of the first and second ZOZWPs 200a and 200b may be constructed from one or more PM fiber segments and such PM fiber segments may be fusion spliced together to form an integral fiber structure. In other embodiments, the one or more PM fiber segments may comprise polarization maintaining fiber specifically designed to have high optical nonlinearity. For example, such high nonlinearity fiber may be fabricated through the use of specific co-dopants such as $GeO_2$ and $Bi_2O_3$, the use of high-numerical-aperture, small-mode-field-area fiber structures, the use polarization maintaining fiber reduced in diameter by stretching and/or tapering, and/or the use of micro-structured fibers (e.g. holey fibers, photonic bandgap fibers, photonic crystal fibers). A conventional polarization maintaining fiber has a nonlinear coefficient $\gamma$ of order $5 \times 10^{-3}$ $W^{-1}$ $m^{-1}$.

$$\gamma = \frac{2\pi n_2}{\lambda A_{eff}}$$

In the above equation, $n_2$ is the effective nonlinear refractive index for light propagating in the fiber core (~$2.6 \times 10^{-20}$ $m^2$ $W^{-1}$ for fused silica), $\lambda$ is the signal wavelength, and $A_{eff}$ is the effective mode-field area of the of the fiber. $\gamma$ can be thought of as the number of radians of nonlinear phase shift (due to self-phase modulation) per Watt-meter. For example, for a typical silica core polarization maintaining fiber having a mode-field diameter of 6.0 μm at $\lambda$=1000 nm:

$$\gamma = \frac{2\pi(2.6 \times 10^{-20} \ m^2 W^{-1})}{(1.0 \times 10^{-6} \ m)[\frac{\pi}{4}(6.0 \times 10^{-6} \ m)^2]} = 5.8 \times 10^{-3} \ W^{-1} m^{-1}$$

Specialty high-nonlinearity fibers have been fabricated with values of $\gamma$ is excess of 1 $W^{-1}$ $m^{-1}$; a 1-Watt input signal transmitted through a 1-meter-long segment of such high nonlinearity fiber may generate a nonlinear phase shift of order 1 radian.

In other embodiments, the one or more of PM fiber segments may incorporate a photosensitive core (e.g. $GeO_2$-doped). This may allow the optical path length of one or fiber segments to be adjusted following device fabrication by UV irradiation. Such a technique may facilitate the fabrication of ZOZWPs having extremely precise optical path lengths and/or be used to compensate for limitations imposed by certain fabrication methodologies.

Figure 6:
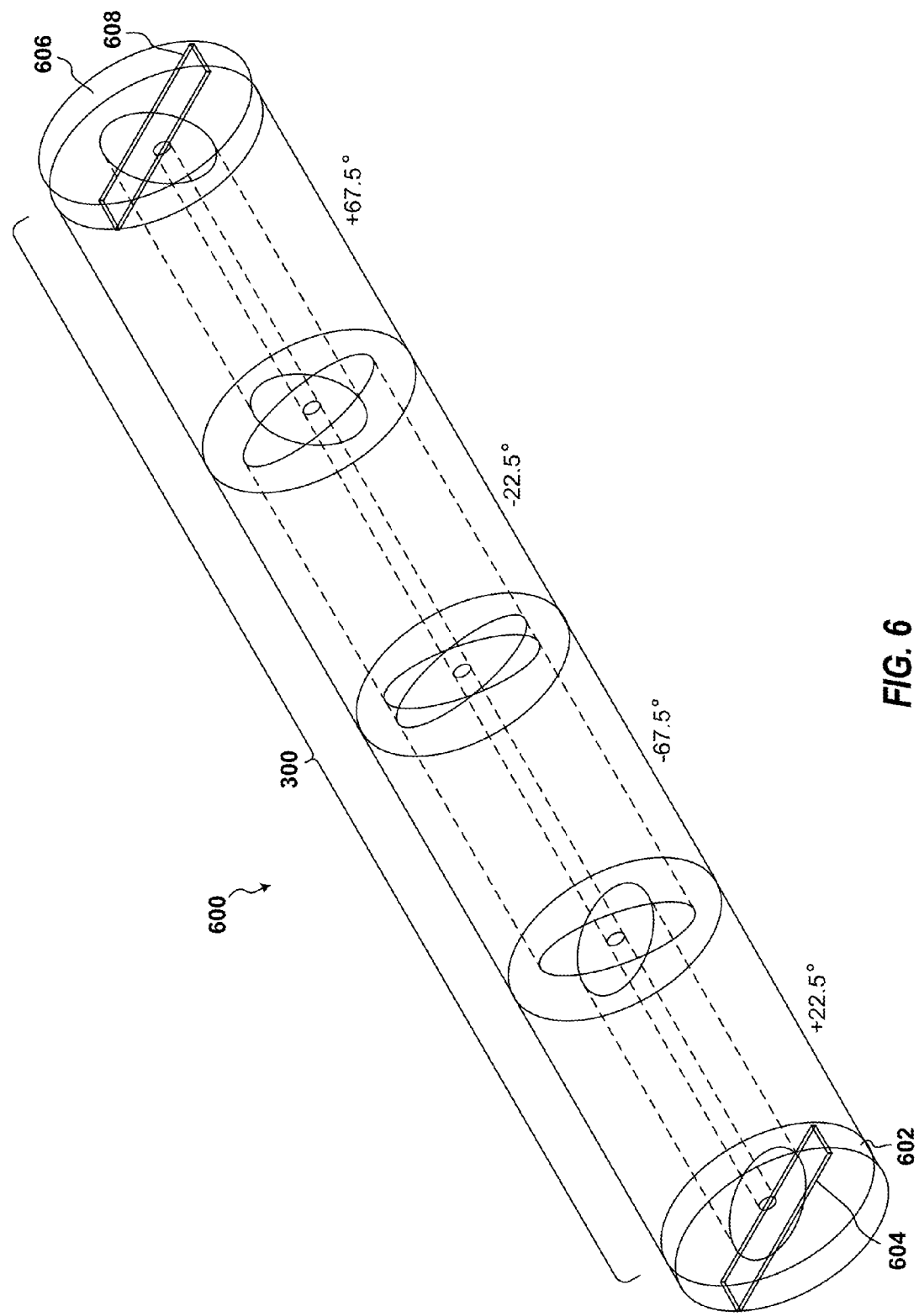
FIG. 6 is an isometric view of an embodiment of a power selective optical filter device configured as an optical limiter structure that substantially attenuates high-peak-power optical signals while allowing low-peak-power optical signals to pass therethrough including the four-wave-plate structure shown in FIG. 3 sandwiched between and disposed in a specified angular orientation relative to a pair of linear polarizers having substantially mutually parallel transmission axes.

For example, the four-wave-plate structure 300 shown in FIG. 3 may configured as shown in FIG. 6 (which is discussed in more detail hereinbelow) wherein the input signal is a cw source of white light (e.g. a light source having a smooth, continuous, spectral distribution spanning hundreds of nanometers), and the output signal is connected to an optical spectrum analyzer. To the extent that the four-wave-plate structure deviates from an ideal ZOZWP, the output spectrum of the white light source will appear amplitude modulated in wavelength on the optical spectrum analyzer (because the structure comprising the "unbalanced" four-fiber-structure and pair of polarizers functions as a crude birefringent filter). Iterative exposure of one or more of the fiber PM fiber segments to UV light may then be used for in situ adjustment of optical path length until the above amplitude modulation is reduced to substantially zero. In an embodiment, a near-UV source (for example, at ~330 nm) may be used to expose the photosensitive core region through the fiber jacket, thereby eliminating any need to strip the fiber.

Such a technique may also be useful for in situ adjustment of optical path length in applications in where the four-fiber assembly is subject to a large longitudinal temperature gradient. More generally, any method or combination of methods for optical path length adjustment may be used to pre-compensate or post-compensate for any effect(s) that would otherwise degrade device performance (e.g., extinction ratio) during operation of such a device.

In a further embodiment, fiber polishing, lapping, grinding, machining, tapering, stretching, bending, or combinations of the foregoing may be used to adjust the optical path length of one or more fiber segments after fabrication. In a further embodiment, one or more heating elements may be incorporated into the four-fiber assembly forming the four-wave-plate structure 300 to adjust the optical path length and/or birefringence of one or more fiber segments. In a further embodiment, one or more mechanisms for controlled application of mechanical stress are incorporated into the four-fiber assembly to adjust the optical path length and/or birefringence of one or more fiber segments.

In another embodiment, the four-wave-plate structure 300 may be fabricated from double-clad or multi-clad fiber polarization maintaining fiber. Such a structure may allow transmission of pump light through the four-wave-plate structure 300.

In another embodiment, a portion or all of the four-wave-plate structure 300 may be created by irradiation, thermal poling, electric field poling, magnetic field poling of one or more optical materials, or combinations of the foregoing.

In another embodiment, the generation of SRS may be suppressed in the four-wave-plate structure 300 by incorporating one or more dopants that absorb strongly over the wavelength range for the first-order and/or higher-order Stokes lines for SRS. In another embodiment, the generation of SRS may be suppressed in the four-fiber assembly 300 by incorporating one or more fiber Bragg gratings (e.g. a long-period fiber Bragg grating) that interferes with propagation of first-order and/or higher-order Stokes lines for SRS. In another embodiment, the generation of SRS in a laser system incorporating one or more of the four-wave-plate structures 300 may be suppressed by the addition of separate optical components and/or modification of such a laser system architecture so as to attenuate or otherwise discriminate against the propagation of signals associated with first-order and/or higher-order SRS.

In other embodiments, the entry and exit wave plates 202 and 204 of the substantially zero-order, zero-wave-plate structures 200a and 200b illustrated in FIG. 3 as one or more of PM fiber segments may be replaced with bulk (i.e., non-fiber) birefringent optical elements. For example, the bulk non-fiber birefringent optical elements may exhibit the same or similar birefringence and nonlinear optical characteristics as the PM optical fibers to form any of the power selective optical filter devices described herein.

Figure 4:
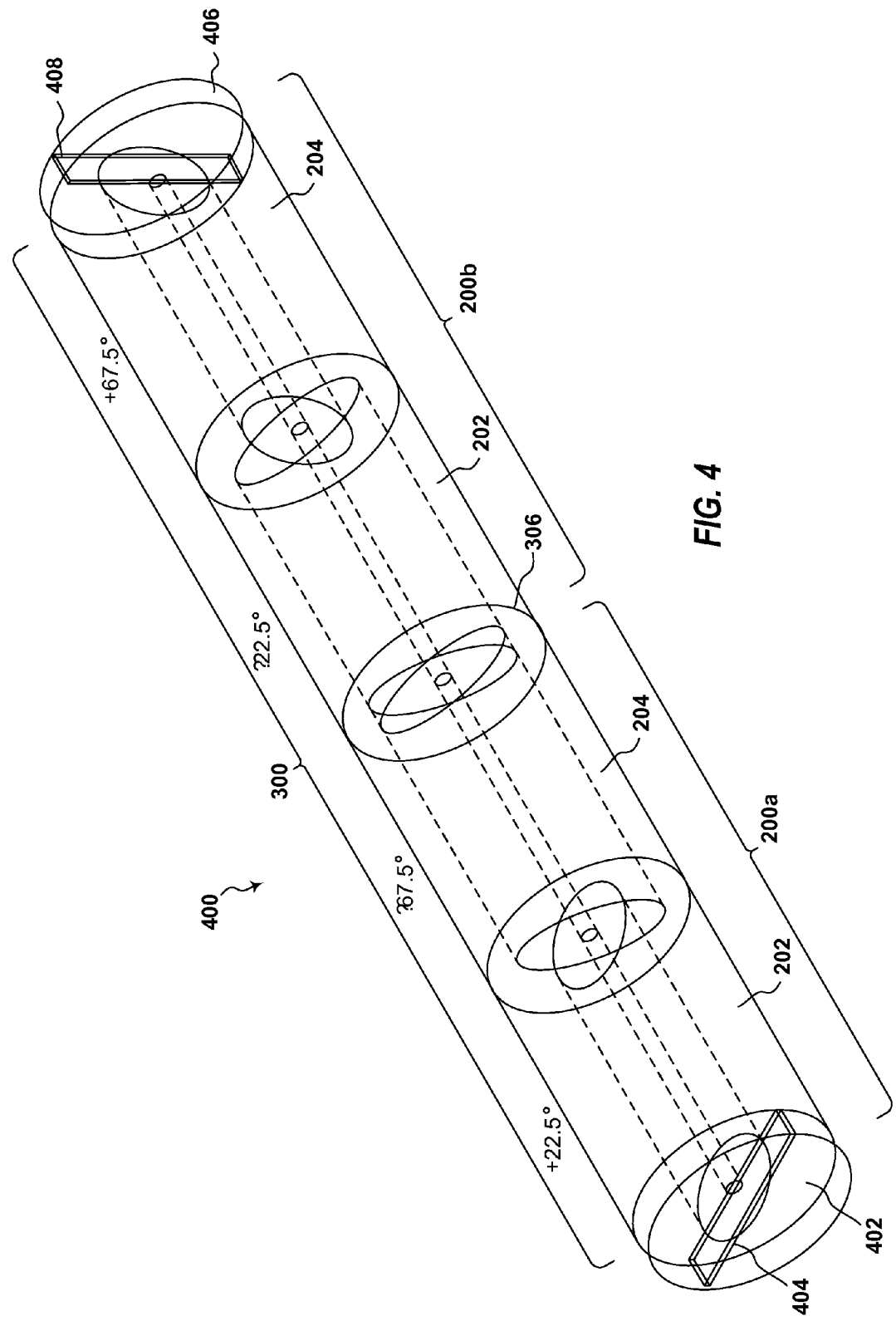
FIG. 4 is an isometric view of an embodiment of a power selective optical filter device configured as an optical switch structure that substantially attenuates low-peak-power optical signals while allowing high-peak-power optical signals to pass therethrough including the four-wave-plate structure shown in FIG. 3 sandwiched between and disposed in a specified angular orientation relative to a pair of linear polarizers having substantially mutually perpendicular transmission axes.

FIG. 4 is an isometric view of an embodiment of a power selective optical filter device 400, comprising the four-wave-plate structure 300 shown in FIG. 3, configured to substantially attenuate low-peak-power optical signals while allowing high-peak-power optical signals to pass therethrough. Thus, the power selective optical filter 400 may also be referred to herein as an optical switch structure. The four-wave-plate structure 300 is sandwiched between and disposed in a specified angular orientation relative to a linear input polarizer 402 having a transmission axis 404 and a linear output polarizer 406 having a transmission axis 408 oriented substantially perpendicular to the transmission axis 404. The respective angular orientations of each of the four wave plate slow axes of the individual entry and exit wave plates 202 and 204 relative to the transmission axis 404 of the input polarizer 402 are substantially equal to +22.5°, −67.5°, −22.5°, and +67.5°, respectively.

The input polarizer 402 receives, for example, an input signal of randomly polarized light, elliptically polarized, circularly polarized, or linearly polarized from an optical source (e.g., an optical fiber amplifier or seed laser) and is configured to selectively transmit at least a portion of the input signal as linearly polarized light therethrough. For example, when the input signal is randomly polarized, elliptically polarized, or circularly polarized, the transmitted intensity of the input signal is attenuated because only a component of the time-varying electric field of the input signal is substantially parallel to the transmission axis 404 of the input polarizer 402, while when the input signal is linearly polarized with its time-varying electric field substantially parallel to the transmission axis 404 of the input polarizer 402, substantially all of the input signal is allowed to pass therethrough.

The four-wave-plate structure 300 is positioned to receive a linearly polarized input signal transmitted through the input polarizer 402. Some or all of the various polarizers (402 and 406) and wave plates (202 and 204) may be fusion spliced together. The four-wave-plate structure 300 is configured to alter the polarization state of the linearly polarized input signal in a manner that depends on the power of the linearly polarized input signal. As will be discussed in more detail hereinbelow, when the linearly polarized input signal is at a sufficiently high power, the four-wave-plate structure 300 converts the linearly polarized input signal to a substantially perpendicular linear polarization state (i.e. aligned with the transmission axis 408 of the output polarizer 406). When the linearly polarized input signal is at a relatively lower power, the four-wave-plate structure 300 may insignificantly alter the polarization state of the linearly polarized input signal to an elliptical polarization state. As the power of the linearly polarized input signal increases, the magnitude of the component of the time-varying electric field of the linearly polarized input signal that is projected onto the transmission axis 408 of the output polarizer 406 becomes increasingly greater. If the power of the input signal is made large enough, the polarization state of the linearly polarized input signal is substantially rotated by about 90 degrees, thereby allowing substantially all of the input signal power to be transmitted through the output polarizer 406.

The power selective optical filter device 400 is also bi-directional. For example, the orientation of the input polarizer 402 in FIG. 4 may be denoted as horizontal (0°) and the orientation of the output polarizer 44 may be denoted as vertical) (±90°. The net transmittance as a function of optical power for a horizontally polarized optical signal incident on the input polarizer 402, and later emerging from the output polarizer 406, is substantially equal to the to net transmittance as a function of optical power for a vertically polarized optical signal incident on the output polarizer 406, and later emerging from the input polarizer 402.

Figure 5A:
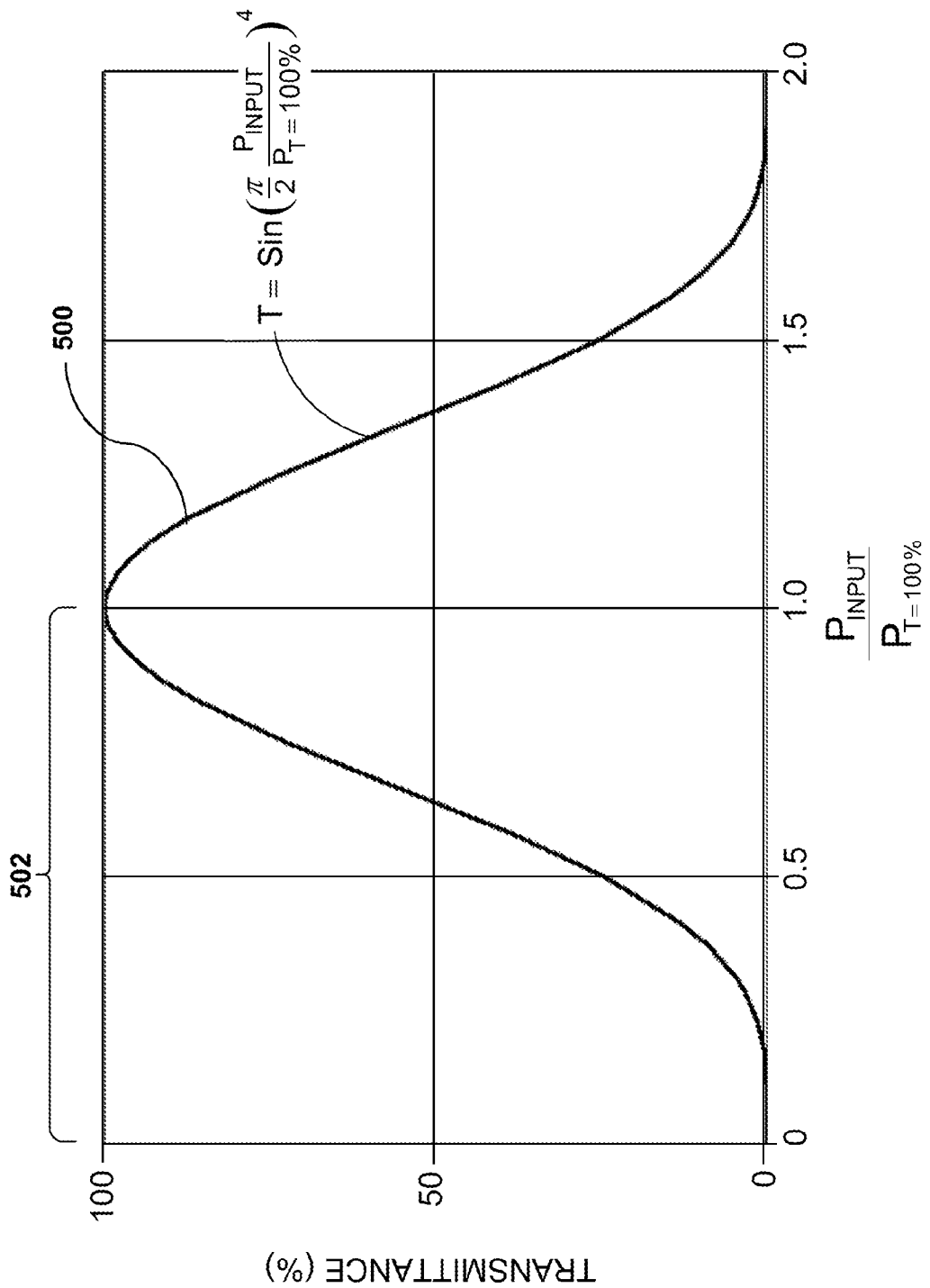
FIGS. 5A and 5B are graphs of the power-dependent transmittance of the optical switch structure shown in FIG. 4, according to an embodiment, as a function of power for an injected linearly polarized signal.

FIG. 5A is a graph 500 of the transmittance (T) of the power selective optical filter device 400 shown in FIG. 4 according to an embodiment. The transmittance (T) of the optical filter device 400 can be described by:

$$T = \operatorname{Sin}\left(\frac{\pi}{2} \frac{P_{input}}{P_{T=100\%}}\right)^4$$

where $P_{input}$ is the power of the linearly polarized signal received by the four-wave-plate structure 300, and $P_{T=100\%}$ is a constant that is the value of $P_{input}$ for which the transmittance (T) first reaches substantially 100 percent. In the limit of low input power, where nonlinear effects such as self-phase modulation and cross phase modulation are negligible, the four-wave-plate structure 300 functions as a ZOZWP that does not significantly alter the polarization state of the input signal. As mentioned earlier, this low-power null property is substantially independent of signal wavelength and ambient temperature. As the power ($P_{input}$) of the linearly polarized input signal is increased beyond $P_{T=100\%}$, the polarization state of the signal impinging on the output polarizer 406 is no longer linear and aligned with the transmission axis 408 of the output polarizer 406, but rather becomes increasingly elliptical with increasing power. Accordingly, the transmittance of the power selective optical filter 400 decreases.

Referring again to FIG. 3 and FIG. 4, the structure and functioning of the four-wave-plate structure 300 and the power selective optical filter 400 will now be described in more detail. In the four-wave-plate structure 300, the first ZOZWP 200a includes the entry wave plate 202 shown as a first "entry" segment of PM fiber and the exit wave plate 204 shown as a second "exit" segment of PM fiber connected in series so that the transverse orientations of the slow axes of the entry and exit wave plates 202 and 204 are substantially perpendicular. In the four-wave-plate structure 300, the second ZOZWP 200b includes the entry wave plate 202 shown as a third "entry" segment of PM fiber and the exit wave plate 204 shown as a fourth "exit" segment of PM fiber connected in series so that the transverse orientations of the slow axes of the entry and exit wave plates 202 and 204 are substantially perpendicular.

Referring specifically to FIG. 4, the orientation of the first and second ZOZWPs 200a and 200b are now specified in terms of the slow-axis angular orientation of their respective entry wave plates 202 relative to the transmission axis 404 of the input polarizer 402. In an embodiment, the slow axis of the entry wave plate 202 of the first ZOZWP 200a is oriented at an entry-wave-plate angle of θ relative to the transmission axis 404 of the input polarizer 402, and the slow axis of the entry wave plate 202 of the second ZOZWP 200b is oriented at a substantially equal and opposite entry-wave-plate angle (−θ) relative to the transmission axis 404 of the input polarizer 402.

In further embodiments, θ=Θ±δ, where Θ=22.5°, and 0°≤δ≤5°. The parameter Θ can be thought of the ideal or target value for θ, and the parameter δ represents deviations from Θ (e.g. because of manufacturing tolerances). Likewise, in further embodiments, the orientation of the slow axis of the entry wave plate 202 of the second ZOZWP 200b relative to the transmission axis 404 of the input polarizer 402 is in the range of about −Θ±δ, with 0°≤δ≤5°.

Figure 5B:
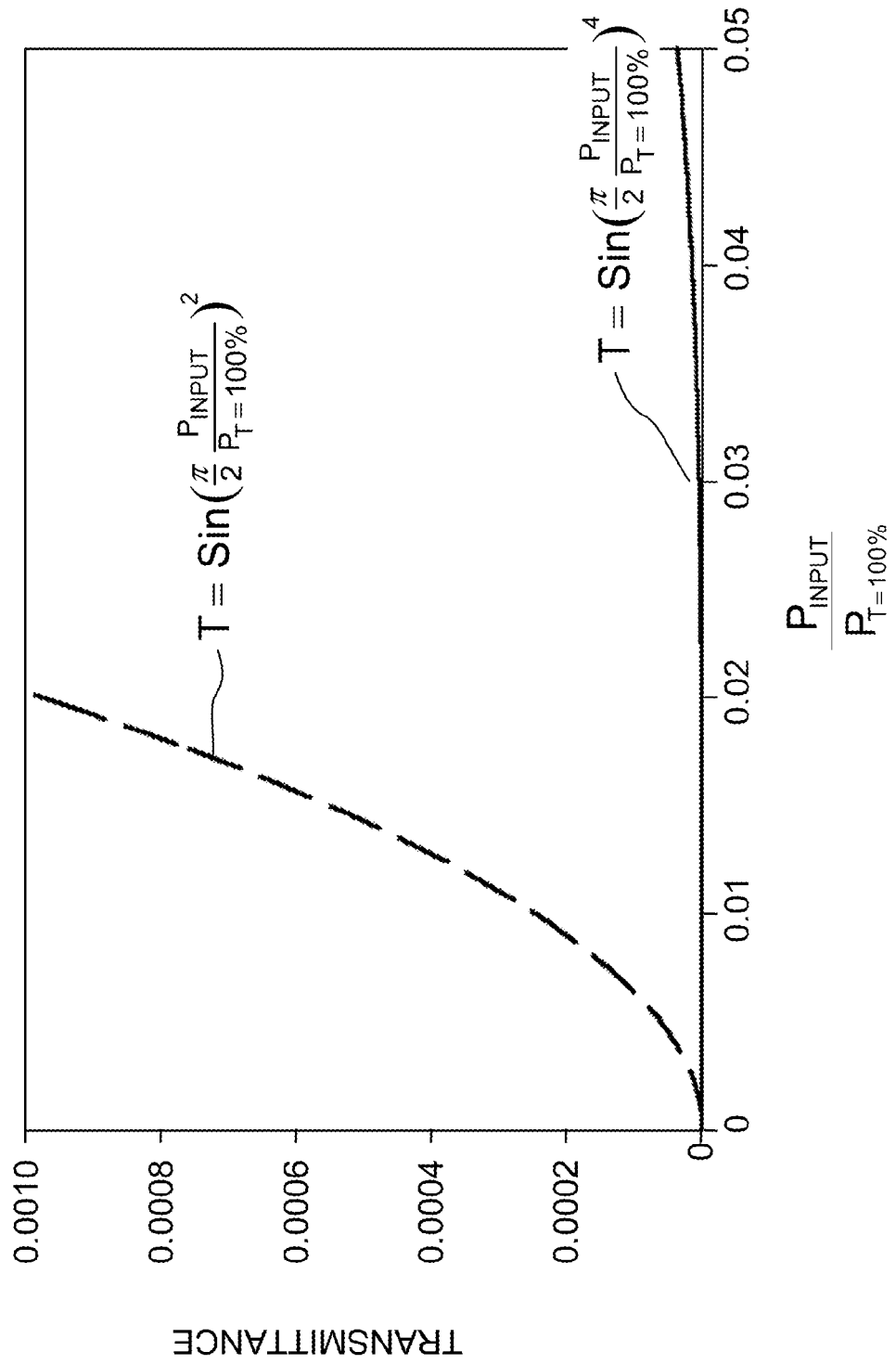

To the extent that one or both zero-wave plate orientations deviate from the above specifications, the transmittance behavior for the optical filter device 400 may deviate from the transmittance behavior shown in the graphs of FIG. 5A and FIG. 5B. For example, as the wave-plate angle θ departs from 22.5 degrees, secondary maxima may be introduced into the transmission curve, and the maximum transmittance may decrease to substantially less than one hundred percent.

In the illustrated embodiment shown in FIG. 4, the entry and exit wave plates 202 and 204 of the first ZOZWP 200a are first and second PM optical fibers, and the product of the fiber birefringence and fiber length (Δn L) is approximately equal for the first and second PM fibers. For example, the product of the fiber birefringence and fiber length for the first and second PM fibers may be equal to each other or differ by for example, 1 percent to about 10 percent. In the illustrated embodiment shown in FIG. 4, the entry and exit wave plates 202 and 204 of the second ZOZWP 200b are third and fourth PM fibers, which also exhibit approximately values of Δn L. For example, Δn L for the third and fourth PM fibers may be equal to each other or differ by, for example, 1 percent to about 10 percent. In some embodiments, the first, second, third, and fourth optical fibers may have substantially the same value of Δn L. For example, to facilitate forming the first, second, third, and fourth optical fibers with substantially the same value of Δn L, the first, second, third, and fourth PM fibers may be fabricated from substantially equal lengths of fiber cut from the same spool of PM fiber.

In one or more embodiments, the product of the nonlinear coefficient and fiber length (γL) of each of the first, second, third, and fourth PM fibers may be substantially equal to each other or differ by, for example, 1 percent to about 10 percent. The product of the nonlinear coefficient and fiber length (γL) is indicative of the extent to which an optical fiber segment generates nonlinear optical effects, such as self-phase modulation or cross-phase modulation.

An explanation of how nonlinear optical effects that occur inside a ZOZWP act to alter the polarization state of a linearly polarized input signal is described below. Referring to the first ZOZWP 200 shown in FIG. 2, when a linearly polarized signal is incident at high power, the polarization state of the linearly polarized signal undergoes a significant change through the combined effects of self-phase modulation ("SPM") and cross-phase modulation ("XPM"). Because the PM optical fibers forming the entry and exit wave plates 202 and 204 are polarization maintaining, a linearly polarized signal injected, for example, along the slow axis of the entry wave plate 202 will emerge linearly polarized along the fast axis of the exit wave plate 204 with substantially no change in its polarization state. The electric field component of the linearly polarized signal that is oriented along the slow optical axis of the entry wave plate 202 and the fast optical axis of the exit wave plate 204 is referred to herein as the "sf" (slow/fast) polarization component. The electric field component of the linearly polarized signal that is oriented along the fast optical axis of the entry wave plate 202 and the slow optical axis of the exit wave plate 204, is referred to herein as the "fs" (fast/slow) polarization component. The change in refractive index due to nonlinear phase shift through the combined effects of SPM and XPM on the electric field components $E_x$ and $E_y$ is:

$$\Delta n_{Ex} = \varepsilon_o c n_2 \left( \langle E_x^2 \rangle + \frac{2}{3} \langle E_y^2 \rangle \right)$$

$$\Delta n_{Ey} = \varepsilon_o c n_2 \left( \frac{2}{3} \langle E_x^2 \rangle + \langle E_y^2 \rangle \right)$$

In the above equations, x and y denote the horizontal and vertical transverse coordinates of an xyz coordinate system in which the signal in the fiber core propagates along the z axis, $\varepsilon_o$ is the permittivity of free space, c is the speed of light, $n_2$ is the nonlinear index of refraction of the PM fiber material (dependent on core and cladding composition), and $\langle E^2 \rangle$ denotes the time-averaged value of $E^2$ over one optical cycle.

If a linearly polarized signal is incident upon the entry wave plate 202 at a polarization angle of θ with respect to the x-axis, the fraction of power polarized along the sf axis is Cos$[θ]^2$, and the fraction of power polarized along the fs axis is Sin$[θ]^2$. The signal components polarized along the sf and fs axes therefore experience index changes of:

$$\Delta n_{sf} = \varepsilon_o c n_2 \langle E^2 \rangle \left( \cos[θ]^2 + \frac{2}{3} \sin[θ]^2 \right)$$

$$\Delta n_{fs} = \varepsilon_o c n_2 \langle E^2 \rangle \left( \frac{2}{3} \cos[θ]^2 + \sin[θ]^2 \right)$$

where, θ, as previously discussed, denotes the orientation of the slow axis of the entry wave plate 202 relative to the x (horizontal) axis. Subtracting the above equations yields a net nonlinear birefringence for the first ZOZWP 200 of:

$$\Delta \Delta n = \frac{1}{3} \varepsilon_o c n_2 \langle E^2 \rangle \cos(2θ)$$

Therefore, two equal lengths of PM optical fiber spliced together to form the structure 200 with the slow optical axis of one of the PM optical fibers oriented substantially parallel to the fast optical axis of the other one of the PM optical fibers function as a wave plate in which the net birefringence thereof depends on $\langle E^2 \rangle$ (i.e., the power of the linearly polarized input signal). In the limit of a low power input signal, $\langle E^2 \rangle = 0$, the net birefringence of this two-fiber structure is nominally zero.

Referring to FIG. 4, the transmittance (T) for the power selective optical filter device 400 may be determined by taking the product of the Jones Matrix for the input polarizer 402, the four-wave-plate structure 300, and the output polarizer 406. For light propagating down the +z axis of an xyz coordinate system, the Jones Matrix for a single wave plate ("WP") of retardation $\phi$ whose slow axis oriented at is oriented at an angle $\theta$ with respect to the x axis is:

$$J_{WP}(\phi, \theta) =$$

$$\begin{pmatrix} J_{xx} & J_{xy} \\ J_{yx} & J_{yy} \end{pmatrix} = \begin{pmatrix} \cos\left(\frac{\phi}{2}\right) - i\sin\left(\frac{\phi}{2}\right)\cos(2\theta) & -i\sin\left(\frac{\phi}{2}\right)\sin(2\theta) \\ -i\sin\left(\frac{\phi}{2}\right)\sin(2\theta) & \cos\left(\frac{\phi}{2}\right) + i\sin\left(\frac{\phi}{2}\right)\cos(2\theta) \end{pmatrix}$$

In the limit of low input power, nonlinear effects are substantially zero, in which case the first substantially ZOZWP 200a acts like a wave plate having no net retardation ($\phi=0$). It's Jones Matrix is therefore:

$$J_{200a} = J_{WP}(0, \theta) = \begin{pmatrix} 1 & 0 \\ 0 & 1 \end{pmatrix}$$

Thus, at low input power the first substantially zero-order, wave plate 200a performs a null operation on the optical signal; there is no change in the polarization state for light passing through the device. As mentioned earlier, a very important point is that this null property may be substantially independent of wavelength and ambient temperature. This makes it possible to construct a power selective optical filter whose extinction ratio is substantially constant as a function of wavelength and temperature. This is in marked contrast to a variety of other optical devices that may only provide high extinction ratio over a relatively narrow range of wavelengths (e.g. Faraday isolators), and/or temperature range.

At higher input power, the effective birefringence due to optical nonlinearity:

$$\Delta\Delta n = \frac{1}{3}\varepsilon_o c n_2 \langle E^2 \rangle \cos(2\theta) = \frac{n_2 \cos(2\theta) P_{input}}{3 A_{eff}}$$

becomes non-negligible, and over a length of fiber L, generates a net optical retardation of:

$$\phi = \frac{n_2 P \cos(2\theta) L}{3\lambda A_{eff}}$$

In the above equations, $\theta$ is the angular orientation of the slow axis of the entry wave plate 202 of the first ZOZWP 200a, $\lambda$ is the wavelength of the optical signal, $P_{input}$ is the power of the optical signal transmitted through input polarizer 402, and $A_{eff}$ is the effective mode field area of the fiber. The second substantially zero-wave plate 200b functions in an analogous manner.

Referring now to the power selective optical filter device 400 as a whole (FIG. 4), for a horizontally polarized signal passing through the input polarizer 402, the state of polarization ("SOP") of the signal that emerges from the vertically oriented output polarizer 406 is:

$$SOP = J_{VerticalPolarizer} \cdot J_{2ndZOZWP} \cdot J_{1stZOZWP} \cdot E_{HorizontallyPolarizedSignal}$$

$$SOP = \begin{pmatrix} 0 & 0 \\ 0 & 1 \end{pmatrix} \cdot J_{200b}(\phi_{200b}, -\theta) \cdot J_{200a}(\phi_{200a}, +\theta) \cdot \begin{pmatrix} 1 \\ 0 \end{pmatrix}$$

$$SOP = \begin{pmatrix} 0 \\ \sin(4\theta)\sin\left(\frac{\pi n_2 P_{input} L}{6\lambda A_{eff}}\cos(2\theta)\right)^2 \end{pmatrix}$$

where the subscript "ZOZWP" denotes "zero-order, zero-wave plate", and L is the combined length of the first, second, third and fourth PM fiber segments forming the individual entry and exit wave plates of the four-wave-plate structure 300.

The transmittance (T) of the power-dependent optical filter device 400 as a whole is therefore:

$$T = \sin(4\theta)^2 \sin\left(\frac{\pi n_2 P_{input} L}{6\lambda A_{eff}}\cos(2\theta)\right)^4$$

For the special case of $\theta=22.5°$:

$$T = \sin\left(\frac{\sqrt{2}\,\pi n_2\, P_{input} L}{12\lambda A_{eff}}\right)^4$$

It is convenient to express this equation as:

$$T = \sin\left(\frac{\pi}{2}\frac{P_{input}}{P_{T=100\%}}\right)^4$$

where $P_{T=100\%}$ is the input power at which 100% transmittance is first reached:

$$P_{T=100\%} = \frac{3\sqrt{2}\,\lambda A_{eff}}{n_2 L} = \frac{6\sqrt{2}\,\pi}{\gamma L}$$

Using the value of $\gamma$ provided earlier ($\gamma=5.8\times10^{-3}$ $W^{-1}$ $m^{-1}$), for a typical PM fiber operating a wavelength of ~1.0 μm, the above equation indicates that a 1-meter-long device would have a threshold of $P_{T=100\%}$=4.6 kW. This figure may be decreased several-fold by simply using PM fiber with a highly $GeO_2$-doped core (e.g. polarization maintaining photosensitive fiber), which is readily available. Using specialty high-nonlinearity fiber ($\gamma=$~1 $W^{-1}$ $m^{-1}$) and/or somewhat longer lengths of fiber, $P_{T=100\%}$ may be lowered to 10 W or less. Using shorter lengths of conventional or low-nonlinearity PM fiber, $P_{T=100\%}$ may be raised to 1 MW or more. Thus, the switching threshold for the power-dependent optical filter devices described herein may be specified over a very wide dynamic range.

The $Sin^4$ transmittance function of the optical filter device 400 may provide for very high extinction ratio compared to a wide variety of other devices that may have a transmittance function of the form $Sin^2$, for example, fiber loop mirrors, and various types of amplitude modulators. This difference is illustrated explicitly in FIG. 5B, and is relevant in applications related to ASE blocking, such as multi-stage fiber amplifier systems.

Note also that T is a periodic function of P. As the input power is increased beyond $P_{T=100\%}$ the transmittance T decreases until it reaches a minimum of substantially zero at an input power of $P=2 P_{T=100\%}$. More generally, the transmittance T is substantially 100% when $P=(2 m+1) P_{T=100\%}$, and the transmittance T is substantially 0% when $P=2 m P_{T=100\%}$, where m=0, 1, 2, 3, etc. In many practical applications of the power-dependent optical filter device 400, only the region 502 ($0 \leq P_{input}/P_{T=100\%} \leq 1$) of FIG. 5A is of relevance.

Thus far, the described embodiments have $\theta = \Theta \pm \delta$, where $\Theta = 22.5°$, and $0° \leq \delta \leq 5°$. Again, $\Theta$ is the ideal or target value for $\theta$, and $\delta$ represents deviations from $\Theta$ (e.g. because of manufacturing tolerances). It should be understood that an equivalent structure can be fabricated under the more general specification:

$$\Theta = \pm(22.5° + n45°)$$

In the above equation n is an integer. Thus, for example, if $\delta=0$, over the range $-180° \leq \theta \leq +180°$, $\theta$ may take on any of the following values: $-157.5°$, $-112.5°$, $-67.5°$, $-22.5°$, $+22.5°$, $+67.5°$, $+112.5°$, $+157.5°$. Referring back to the device transfer function, $$T = \operatorname{Sin}(4\theta)^2 \operatorname{Sin}\left(\frac{\pi n_2 PL}{6 \lambda A_{eff}} \operatorname{Cos}(2\theta)\right)^4$$

the fundamental requirement is that $\theta$ be chosen such that the terms $\operatorname{Sin}(4\theta)$ and $\operatorname{Cos}(2\theta)$ evaluate to:

$$\operatorname{Sin}(4\theta) = \pm 1 \text{ and } \operatorname{Cos}(2\theta) = \pm \frac{\sqrt{2}}{2}$$

For example, we could choose $\theta = -67.5° \pm \delta$, with $0° \leq \delta \leq 5°$, to represent an embodiment equivalent to $\theta = 22.5° \pm \delta$, with $0° \leq \delta \leq 5°$.

Figure 7:
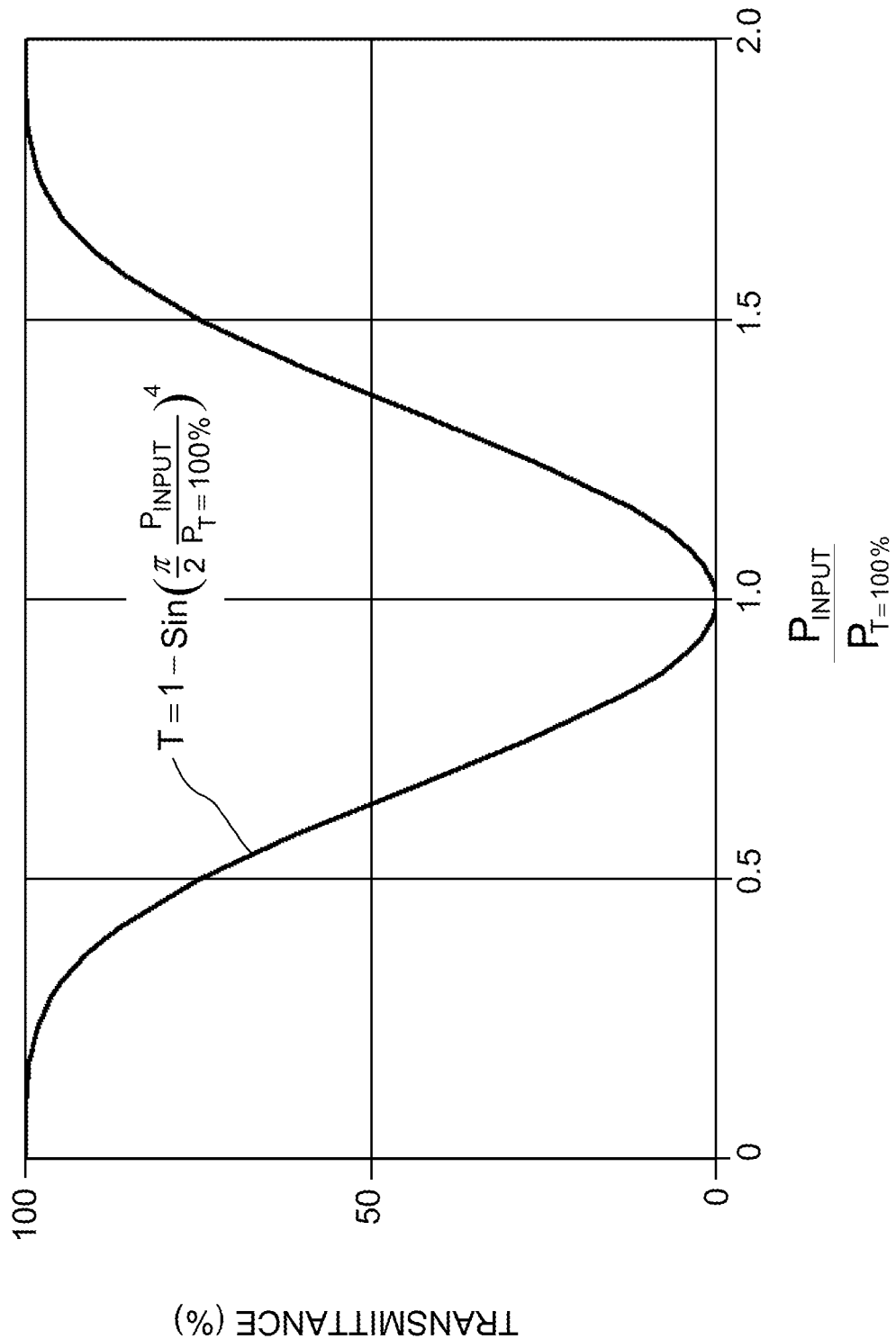
FIG. 7 is a graph of the transmittance of the optical limiter structure shown in FIG. 6, according to an embodiment, as a function of power for the injected linearly polarized signal.

FIG. 6 is an isometric view of an embodiment of a power selective optical filter device 600 configured to substantially attenuate high-peak-power optical signals while allowing low-peak-power optical signals to pass therethrough. Thus, the power $$T = 1 - \operatorname{Sin}\left(\frac{\pi}{2} \frac{P_{input}}{P_{T=100\%}}\right)^4$$

selective optical filter 600 is also referred to herein as an "optical limiter structure." The power selective optical filter 600 includes the four-wave-plate structure 300 of FIG. 3, sandwiched between, and disposed in a specified angular orientation relative to a pair of linear polarizers 602 and 606 having substantially mutually parallel transmission axes 604 and 608. When configured as an optical limiter structure, the output polarizer transmission axis 608 is disposed substantially parallel, rather than substantially perpendicular, to the input polarizer transmission axis 604. This is the only structural difference between the optical filter device 600 configured to substantially attenuate higher-power light while allowing lower-power light to pass therethrough, and the optical filter device 400 configured to substantially attenuate lower-power light while allowing higher-power light to pass therethrough. The transmittance of the device 600 as a function of input power in this optical limiter configuration (plotted in FIG. 7) is:

More generally, in other embodiments the transmission axis of the output polarizer may be set at a specified intermediate angle, neither parallel nor perpendicular to the transmission axis of the input polarizer, to obtain other device transfer functions, such as:

FIG. 8A-8C are a schematic side views of device configurations, according to different embodiments, illustrating some of the many different types of linear $$T = \operatorname{Sin}\left(\frac{\pi}{2} \frac{P_{input} - P_{T=0\%}}{P_{T=100\%}}\right)^4$$

polarizers that may used in conjunction with four-wave-plate structure (represented separately in FIG. 3) comprising PM fiber segments 801, 802, 803 and 804 to create an optical switch structure or optical limiter structure. The term "linear polarizer" is used to distinguish against a less common type of polarizing device, the "circular polarizer". Whereas a linear polarizer may be used, for example, to transmit horizontally polarized light while rejecting vertically polarized light, a circular polarizer may be used, for example, to transmit left-hand circularly polarized light while rejecting right-hand circularly polarized light. In the discussion that follows, the term "polarizer" denotes a linear polarizer unless otherwise stated.

There are two main classes of polarizers. The first class of polarizers transmits some or all of an incident signal that is linearly polarized along the transmission axis of the polarizer, and absorbs some or all of an incident signal linearly polarized perpendicular to its transmission axis. Such devices are referred to herein as "absorptive polarizers". The second class of polarizers transmits some or all of an incident signal that is linearly polarized along its transmission axis, but reflects, deflects, or otherwise deviates substantially some or all of an incident signal linearly polarized perpendicular to its transmission axis. Such devices are referred to herein as "non-absorptive polarizers".

Examples of absorptive polarizers include wire grid polarizers, Polaroid film, Polarcor glass manufactured by Corning Inc., and in-fiber polarizers based on evanescent coupling to an embedded metal film, such as those manufactured by General Photonics Inc. Non-absorbing polarizers are commonly used to redirect the non-transmitted portion of an incident signal for use elsewhere, or divert it to an absorbing target that can dissipate a large amount of optical power (e.g., compared to a thin sheet of Polarcor glass). Referring to FIG. 8A, polarizer 800 represents an in-fiber absorptive polarizer. Referring to FIG. 8B, polarizer 806 is also an absorptive polarizer, but in the form of a bulk optical component (e.g. a 1-cm-diameter circular disc of Polarcor glass), rather than a fiber optic component. Polarizers 805, 807, 808, and 809 shown in FIGS. 8A-8C, all represent non-absorptive polarizers. Examples of non-absorptive polarizers include, but are not limited to, Nicol prisms, Wollaston prisms, Glan-Thompson prisms, Glan-Foucault prisms, Glan-Taylor prisms, and Rochon prisms. Referring back to FIG. 4, in various embodiments, one or both of the polarizers 402 and 406 may be replaced by any type of absorbing or non-absorbing polarizer, or combination of absorbing and/or non-absorbing polarizers. As discussed later, where one or more non-absorbing polarizers are used, the diverted beam(s) may be used for a variety of purposes.

In various embodiments, one or both of the polarizer elements of such a power-dependent optical filter may be provided by other optical components, thereby obviating the need for one or both polarizer elements. For example, a polarizing ("PZ") fiber amplifier provides gain for only one polarization state. Such a PZ fiber amplifier may be placed before and/or after one or more of the power-dependent optical filter devices disclosed herein, and in some cases, may eliminate the need for one or both polarizing elements. A number of other optical components perform functions in which the polarization of a signal passing therethrough is either incidental to, or a critical feature of, component function (e.g. non-polarization-independent Faraday isolators). Any such active or passive component having a polarization-dependent transmittance, or any combination of such polarizing components, may be used to augment or replace one or both polarizing elements of the power-dependent optical filter devices disclosed herein.

V. Embodiments of Invention Directed to Optical Systems Incorporating the Disclosed Wave-Plate Structures and Power Selective Optical Filters Several applications of the optical switch structures and optical limiter structures are described with respect to FIGS. 9-19. These applications include, but are not limited to, optical isolation of pulsed laser sources, all-optical switching/gating, actively and passively mode-locked lasers, actively and passively q-switched lasers, temporal pulse shaping and/or clean up, stabilization of cw lasers, improving the extinction ratio of amplitude modulators and other switching devices, amplitude limiting to prevent optical damage, and laser cavity dumping.

Figure 9:
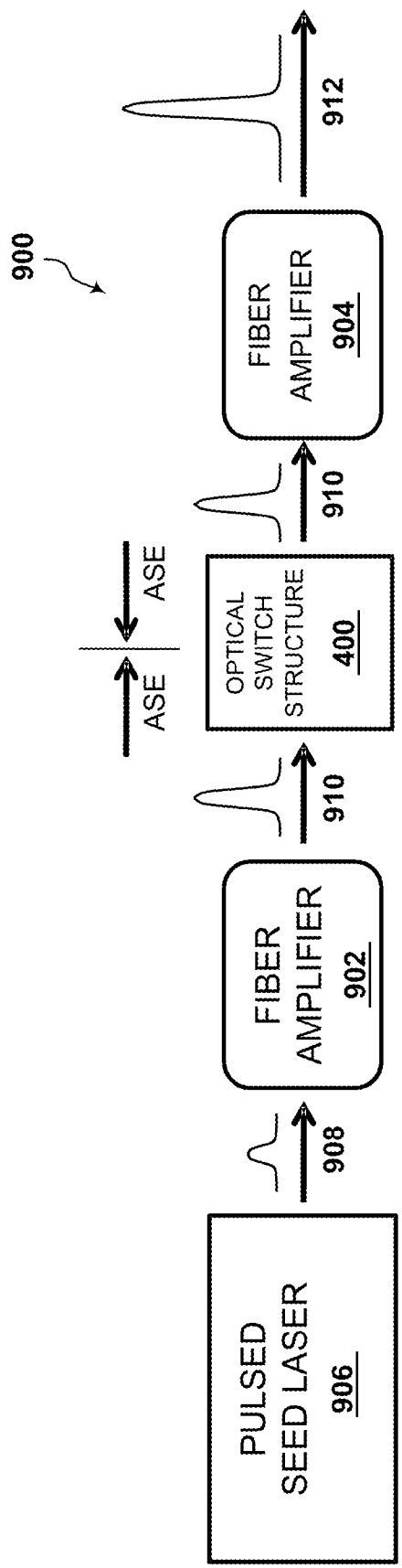
FIG. 9 is a diagrammatic view of an embodiment of a two-stage fiber amplifier system including the optical switch structure of FIG. 4 disposed between first and second fiber amplifiers.

FIG. 9 is a diagrammatic view of an embodiment of a two-stage fiber amplifier system 900 including the optical switch structure 400 of FIG. 4 disposed between first and second fiber amplifiers 902 and 904. The system 900 may be used for two-stage amplification of a pulsed seed laser 906. In such an embodiment, the seed laser 906 is configured to output a low-peak-power pulse 908 that is received and amplified by the first fiber amplifier 902 to generate an amplified pulse 910. The amplified pulse 910 may be transmitted through the optical switch structure 400 (see FIG. 4) with substantially zero attenuation. The amplified pulse 910 transmitted through the optical switch structure 400 may be further amplified in a second fiber amplifier 904 to generate a highly-amplified output pulse 912.

In such an embodiment, the optical switch structure 400 may substantially prevent ASE generated in the first fiber amplifier 902 from being transmitted to the second fiber amplifier 904, and the optical switch structure 400 may substantially prevent ASE generated in the second fiber amplifier 904 from being transmitted to the first fiber amplifier 902. This bidirectional blocking of ASE may enable both fiber amplifiers 902 and 904 to be operated at very high small-signal gain. The optical switch structure 400 may reduce or substantially eliminate multi-stage amplification of ASE and/or multi-stage parasitic lasing (e.g. due to reflections at optical interfaces or in-fiber Rayleigh scattering). The optical switch structure 400 may further prevent damage to the second fiber amplifier 904 or other optical components by regulating the amplitude of the amplified pulse 910 transmitted through the optical switch structure 400. In further embodiments, a plurality of optical switch structures may be used in conjunction with a plurality of fiber amplifiers to create a wide variety of multi-stage fiber amplifier systems.

Figure 10:
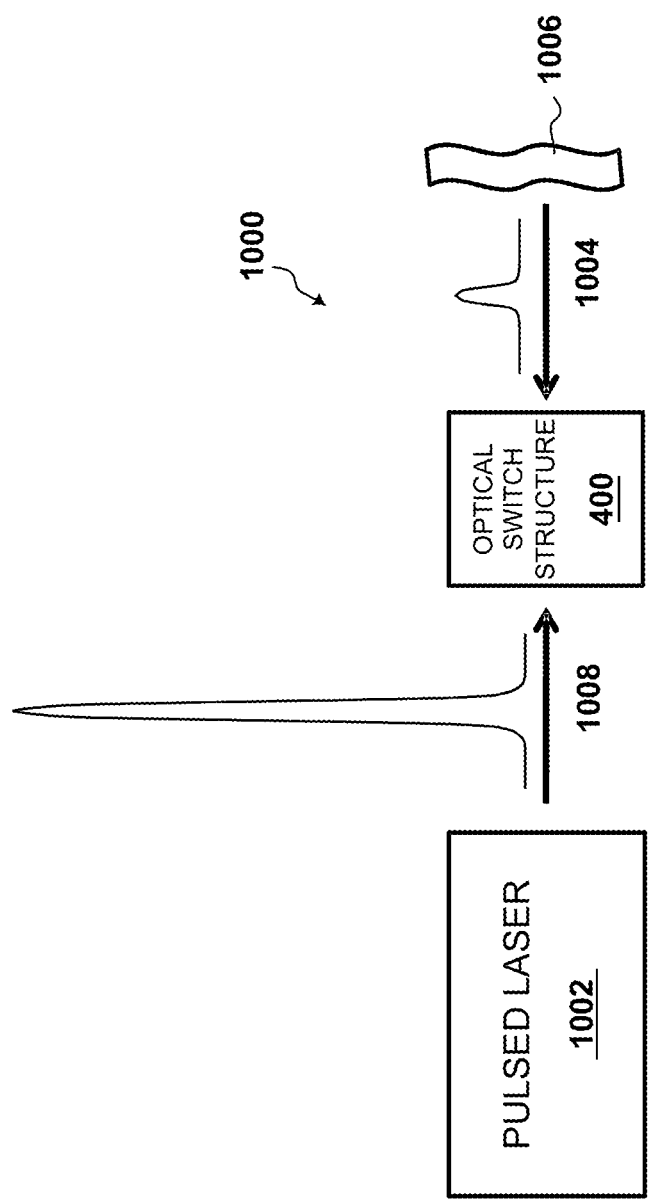
FIG. 10 is a diagrammatic view of an optical system illustrating the use of the optical switch structure of FIG. 4 to isolate a pulsed laser source from back-reflected pulses according to an embodiment.

FIG. 10 is a diagrammatic view of an embodiment of an optical system 1000 illustrating the use of the optical switch structure 400 shown in FIG. 4 to substantially optically isolate a pulsed laser source 1002 from a back-reflected pulse 1004 reflected from a reflective surface 1006. In system 1000, the optical switch structure 400 is positioned between the pulsed laser source 1002 and the reflective surface 1006. The optical switch structure 400 substantially blocks the low-power back-reflected pulse 1004, while also allowing a high-power pulse 1008 output by the pulsed laser 1002 to pass therethrough. Such optical isolation is often desirable in pulsed laser systems because even a small amount of back-reflected signal may be amplified to very high-peak power if it is coupled back into the pulsed laser 1002, where it may cause damage to one or more optical components. A related problem concerns pulsed laser systems whose operation may be disrupted by parasitic cw lasing due to back-reflected light from one or more surfaces. In the illustrated embodiment shown in FIG. 10, the optical switch structure 400 provides double-pass attenuation of any such circulating cw signal.

Figure 11:
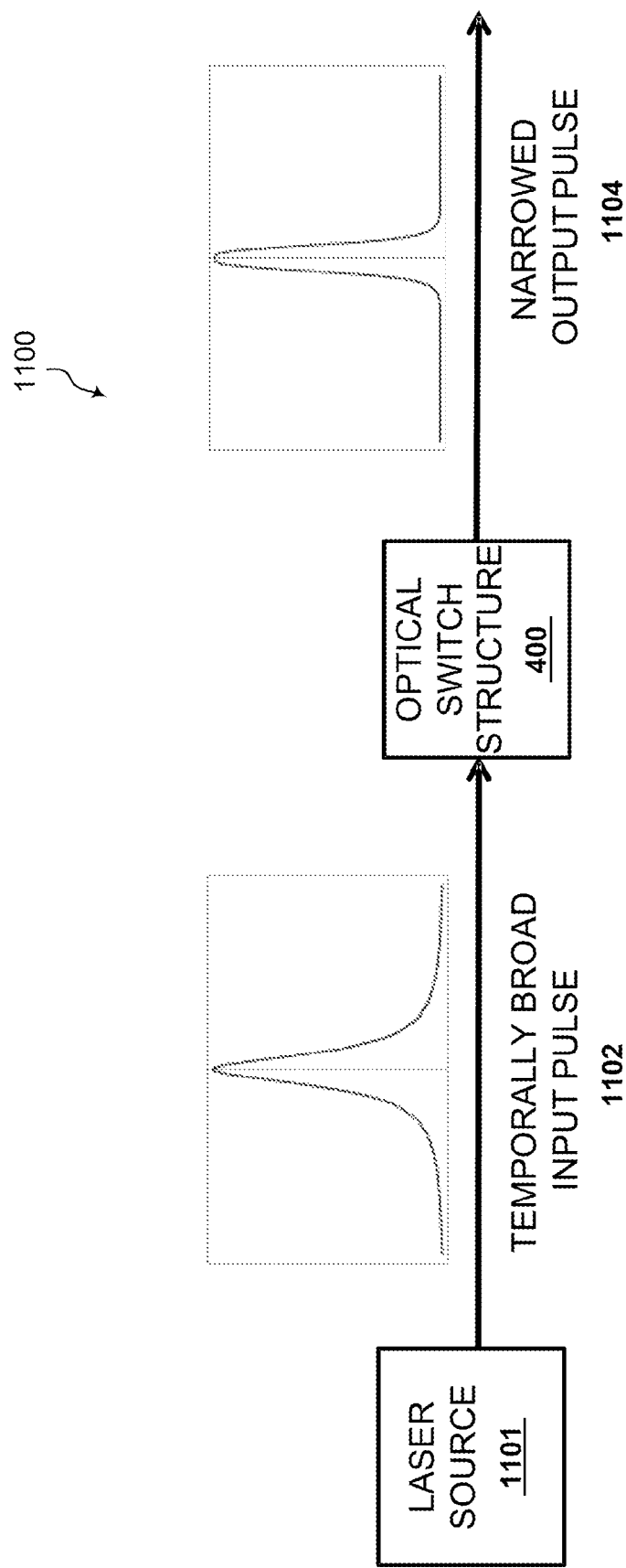
FIG. 11 is a diagrammatic view of an optical system illustrating the use of the optical switch structure of FIG. 4 to alter the temporal shape of a laser pulse according to an embodiment.

FIG. 11 is a diagrammatic view of an embodiment of an optical system 1100 illustrating the use of the optical switch structure 400 of FIG. 4 to alter the temporal shape of a laser pulse. In such an application one or more of disclosed optical switch structures and/or optical limiter structures may be used for a wide variety of pulse shaping applications including, but not limited to, the elimination of broad "wings" in the time domain intensity waveform of a pulse light source, as illustrated in FIG. 11, the elimination of one or more "pedestals" of lower peak power and longer duration than the desired portion of the pulsed waveform, pulse steepening, pulse shortening, pulse splitting, and decoupling pulse pulsed waveforms from cw background signals. As shown in FIG. 11, the system 1100 includes a laser source 1101 configured to output a temporally broad input pulse 1102. The optical switch structure 400 is positioned to receive the input pulse 1102, which may be transmitted into and through the optical switch structure 400. The optical switch structure 400 narrows the temporally broad input pulse 1102 (i.e., a first temporal pulse shape) by filtering lower power portions thereof so that a narrowed output pulse 1104 (i.e., a second temporal pulse shape different than the first temporal pulse shape) is output from the optical switch structure 400.

Figure 12:
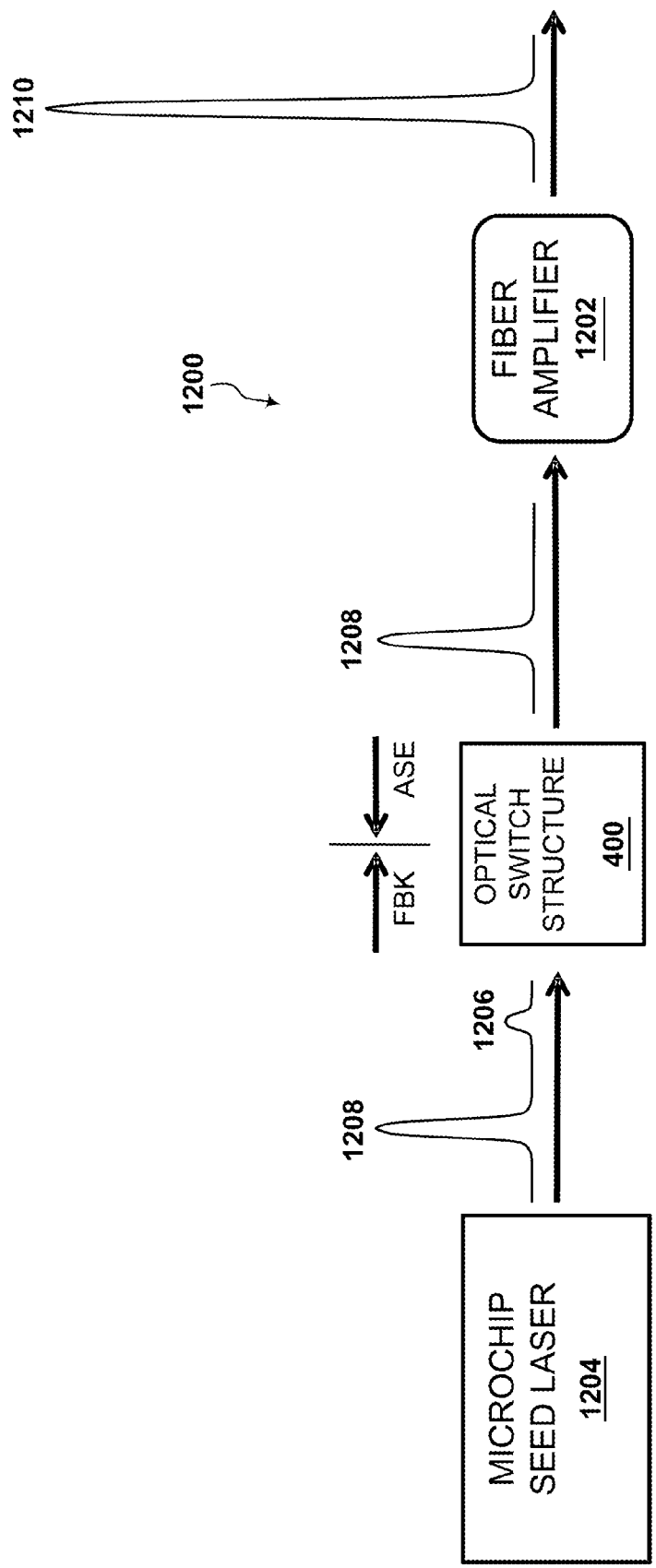
FIG. 12 is a diagrammatic view of an embodiment an of optical system illustrating the use of the optical switch structure of FIG. 4 to provide bidirectional optical isolation between a fiber amplifier and a passively-q-switched, microchip laser seed source, and elimination of the after-pulse generated by the micro-chip laser.

FIG. 12 is a diagrammatic view of an embodiment of an optical system 1200 illustrating the use of the optical switch structure 400 shown FIG. 4 to provide bidirectional optical isolation between a fiber amplifier 1202 and a passively-q-switched, micro-chip laser seed source 1204, and elimination of one or more after-pulses 1206 generated by the micro-chip laser 1204. In the absence of the optical switch structure 400, both a main pulse 1208 and the after-pulse 1206 would be present in the amplified output 1210 output by the fiber amplifier 1202, which is undesirable in many applications. The after-pulse generated by many micro-chip lasers may result from spatial hole burning in the gain medium of the micro-chip laser and may be difficult to eliminate by other means. In the absence of the optical switch structure 400, backward propagating ASE generated by the fiber amplifier 1202 may be reflected off of the output coupler (not shown) of the micro-chip chip laser 1204, resulting in further amplification of ASE, parasitic lasing, and/or damage to the micro-chip laser 1204.

In operation, the microchip seed laser 1204 outputs a pulse including the main pulse 1208 and the after-pulse 1206, which is received by the optical switch structure 400. The optical switch structure 400 substantially blocks the low-power after-pulse 1206 from being received by the fiber amplifier 1202, while allowing the high-power main pulse 1208 to be transmitted therethrough to the fiber amplifier 1202. The fiber amplifier 1202 amplifies the main pulse 1208 to generate the amplified output 1210. The optical switch structure 400 also substantially blocks amplified spontaneous emission output from the fiber amplifier 1202 from being received by the microchip seed laser 1204.

Figure 13:
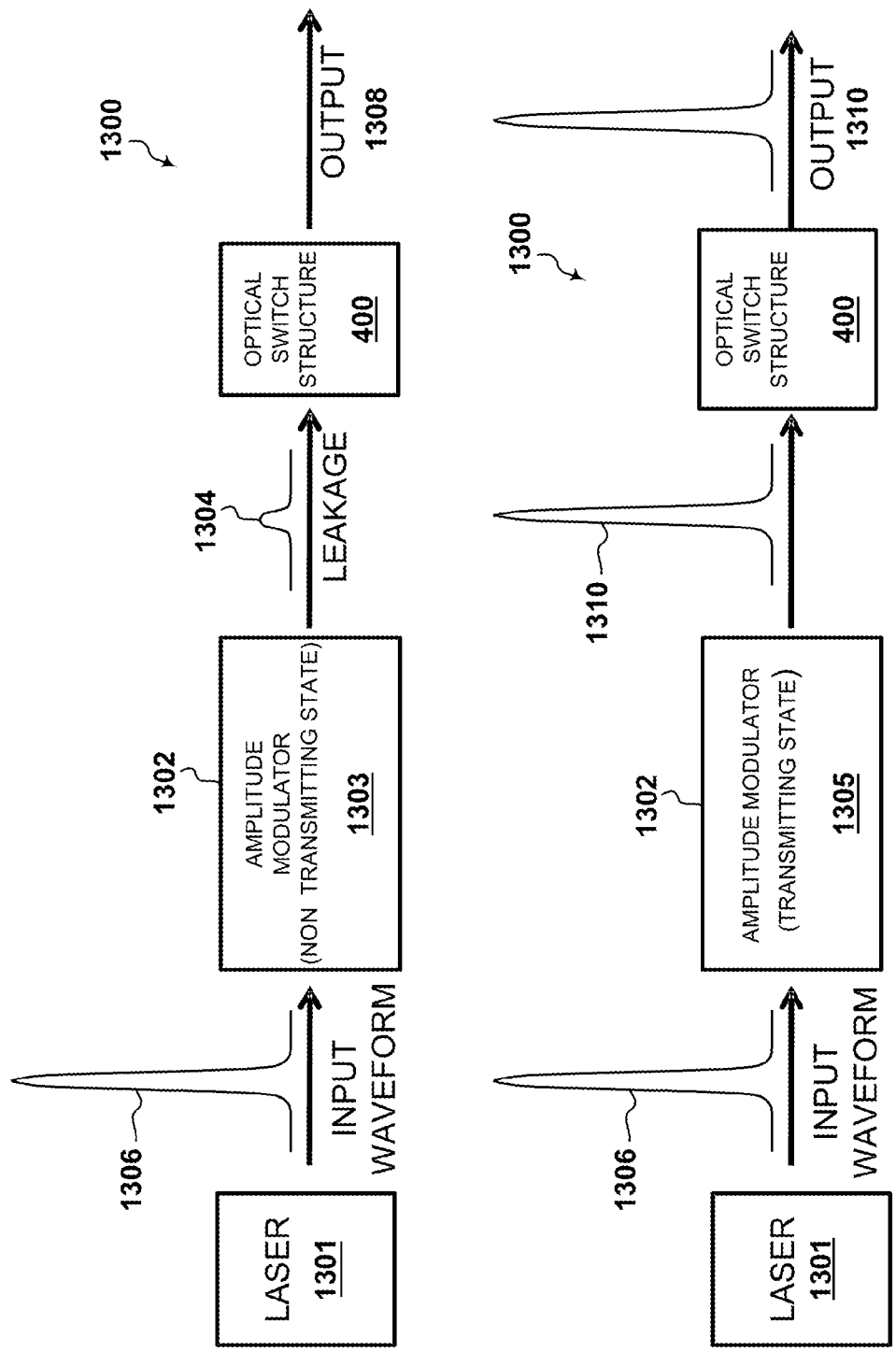
FIG. 13 is a diagrammatic view of an embodiment of an optical system illustrating the use of the optical switch structure of FIG. 4 to enhance the extinction ratio of an amplitude modulator.

FIG. 13 is a diagrammatic view of an embodiment of an optical system 1300 illustrating the use of the optical switch structure 400 shown in FIG. 4 to enhance the extinction ratio of an amplitude modulator. The system includes an amplitude modulator 1303 (e.g., a Pockels cell or an acoustic-optical modulator) disposed between a laser source 1301 and the optical switch structure 400. The amplitude modulator 1303 is configurable between a non-transmitting state in which a low-amplitude leakage pulse 1304 is output therefrom while an input pulse or waveform 1306 output from the laser 1301 is substantially blocked, and a transmitting state in which the input pulse 1306 is transmitted.

In operation, the low-amplitude leakage pulse 1304 is substantially blocked by the optical switch structure 400 to thereby enhance the extinction ratio between input pulse 1306 and output pulse 1308 when the amplitude modulator 1302 is in its nominally non-transmitting state (1303). On the other hand, when the amplitude modulator is in its transmitting state (1305), the optical switch structure 400 may have substantially no effect on the amplitude of the transmitted pulse 1310 (i.e., the input pulse 1306). Thus, the optical switch structure 400 may allow the extinction ratio of the amplitude modulator 1302 to be increased drastically without any significant insertion loss penalty.

In other embodiments pertaining to enhancement of amplitude modulator performance, one or more stages of amplification may be used with a low-peak-power seed source to ensure that pulses amplified while the amplitude modulator is in its transmitting state attain a peak power of order $P_{T=100\%}$, such that they may be transmitted through the optical switch structure without substantial attenuation. In further embodiments pertaining to enhancement of amplitude modulator performance, the use of one or more optical switch structures in conjunction with an amplitude modulator provides a faster rise time and/or fall time in the switching waveform of the transmitted optical signal.

Figure 14:
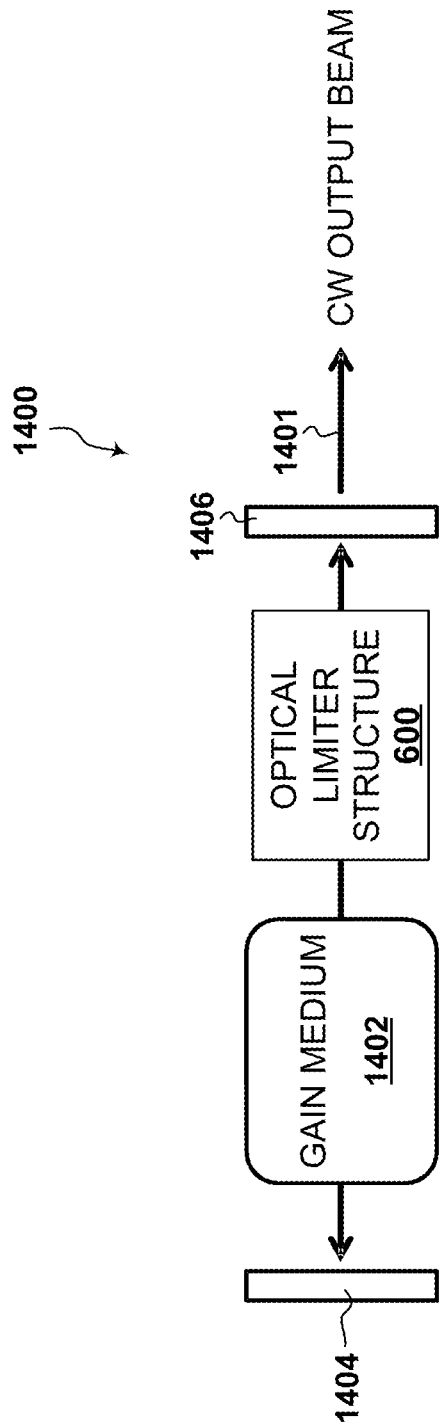
FIG. 14 is a diagrammatic view of an embodiment of an optical system illustrating the use of the optical limiting structure of FIG. 6 to suppress amplitude fluctuations in a cw laser.

FIG. 14 is a diagrammatic view of an embodiment of an optical system 1400 illustrating the use of the optical limiter structure 600 of FIG. 6 to suppress amplitude fluctuations in a cw laser. The system 1400 includes a laser comprising a gain medium 1402 disposed between a mirror 1404 and a partially reflective mirror 1406 that define an optical cavity. The optical limiter structure 600 is disposed between the gain medium 1402 and the mirror 1406.

In operation, the optical limiter structure 600 may transmit low power (e.g. cw) signals 1401 with negligible attenuation while absorbing high-peak power pulses that may arise from relaxation oscillations, self-q-switching, chaotic pulsing, or other sources of amplitude instability (e.g. instabilities induced by fluctuations in absorbed pump power). Accordingly, the low power signals 1401 are transmitted through the mirror 1406. The insertion of a large intra-cavity loss for such amplitude spikes may substantially prevent their regenerative amplification. While the embodiment in FIG. 14 depicts the gain medium 1402 and the optical limiter structure 400 sandwiched between the mirrors 1404 and 1406 to form a linear standing-wave cavity, it should be understood that this embodiment may be practiced in wide variety of laser configurations (e.g., ring, compound cavity, folded resonator, etc.).

Figure 15:
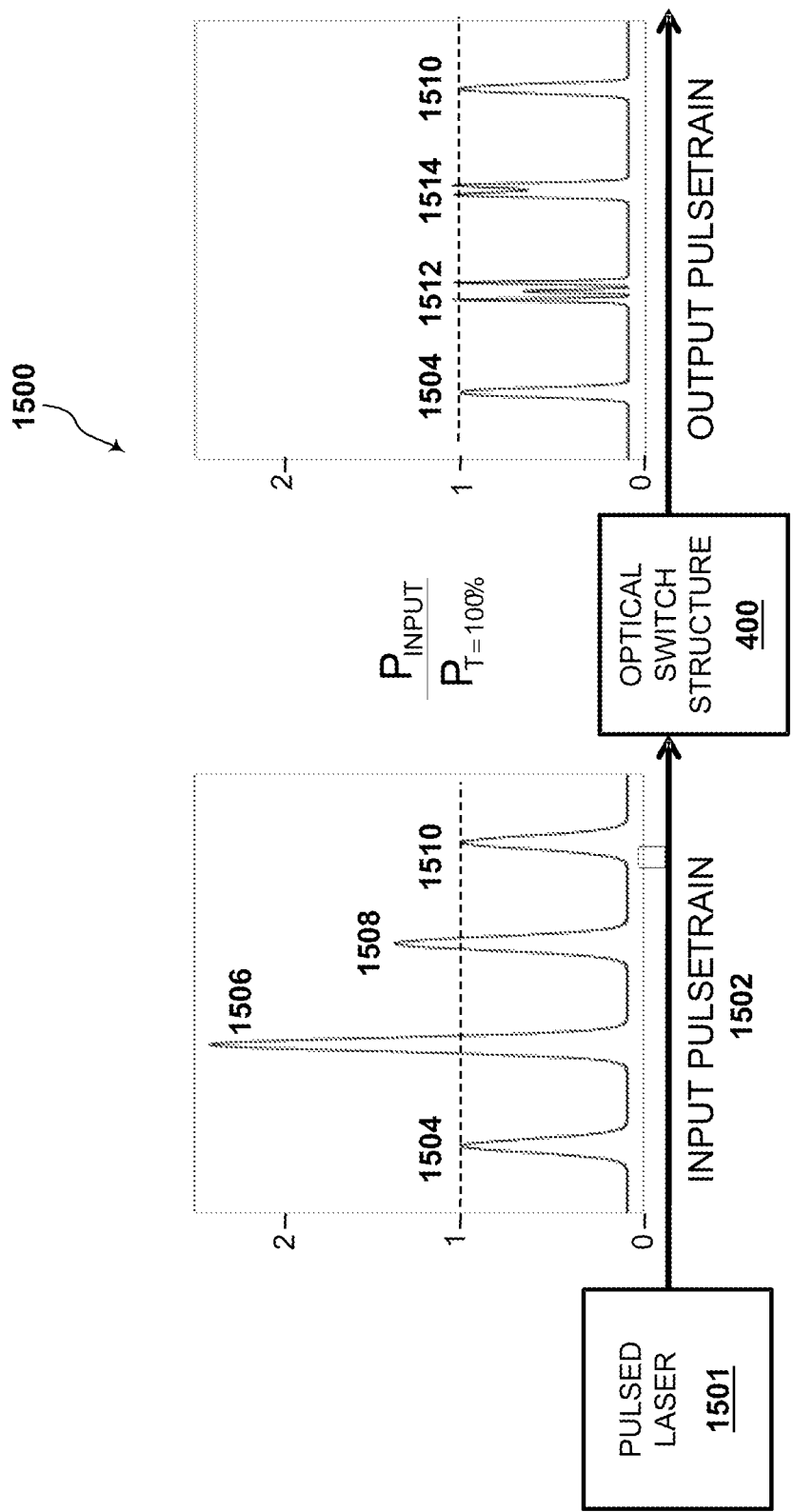
FIG. 15 is a diagrammatic view of an embodiment of an optical system illustrating the use of the optical switch structure of FIG. 4 to prevent a pulsed waveform from exceeding the optical damage threshold of one or more downstream optical components.

FIG. 15 is a diagrammatic view of an embodiment of an optical system 1500 illustrating the use of the optical switch structure 400 of FIG. 4 to prevent a pulsed waveform from exceeding the optical damage threshold of one or more downstream optical components. The system 1500 includes a pulsed laser 1501 operably coupled to the optical switch structure 400. The pulsed laser 1501 may generate an input pulse train 1502 having two pulses each having a peak power at or below a threshold power comparable to $P_{T=100\%}$ (1504 and 1510) and two "rogue pulses" 1506 and 1508 each having a peak power above the threshold power (i.e., of significantly higher amplitude).

In operation, the pulse train 1502 output from the pulsed laser 1501 is received by the optical switch structure 400. The amplitude irregularities in the input pulse train 1502 can result, for example, from mode beating within the pulsed laser 1501 operating on multiple longitudinal modes. In some applications, even one such high-amplitude rogue pulse can permanently damage downstream optical components. The optical switch structure 400 substantially prevents transmission of the rogue pulses 1506 and 1508 at a power greater than $P_{T=100\%}$.

For example, it is sometimes desirable to amplify such pulses in a large mode area fiber amplifier to several megawatts ("MW") peak power. It is important, however, not to exceed the threshold power for self-focusing in the fiber (~4 MW), because catastrophic beam collapse and optical damage may occur instantaneously. Thus, if such a seed source is used to generate 3 MW output pulses from seed pulses such as 1504 and 1510 having a peak power of order $P_{T=100\%}$, the rogue pulse 1506 may, in the absence of the optical switch structure 400, destroy a downstream fiber amplifier that attempts to amplify pulse 1506 well beyond 4 MW.

In addition to self-focusing, optical damage (dielectric breakdown) inside the fiber has a sharply defined threshold as well. Depending on the mode field area of the fiber, the threshold for optical damage may be substantially less than ~4 MW, the threshold for self-focusing. For example, one may operate a large-mode-area fiber amplifier having an optical damage threshold of 400 kW at a peak power of 300 kW on an indefinite basis. But a single instance of longitudinal mode beating in a seed source such as a pulsed laser diode or q-switched laser may be sufficient to destroy such an amplifier. The ability of the optical switch structure 400 to automatically reduce the peak power of rogue pulses 1506 and 1508 to approximately $P_{T=100\%}$ (pulses 1512 and 1514) is a direct consequence of the $T=\operatorname{Sin}^4[\pi P_{input}/(2\, P_{T=100\%})]$ transfer function.

In other embodiments the optical limiter structure 600 of FIG. 6 having the nominal transfer function $T=1-\operatorname{Sin}^4[\pi P_{input}/(2\, P_{T=100\%})]$, and more generally, devices having other transfer functions such as $T=\operatorname{Sin}^4[(\pi[P_{input}-P_{T=100\%}])/(2\, P_{T=100\%})]$ may be configured so as provide protection from optical damage in an analogous manner. In other embodiments, one or more optical switches and/or optical limiter structures may provide bidirectional ASE isolation and optical damage protection simultaneously. For example, in the two-stage pulse amplification system 900 shown in FIG. 9, the optical switch structure 400 may provide the second fiber amplifier 904 with some degree of protection from amplitude fluctuations in the pulsed seed laser 906.

Figure 16:
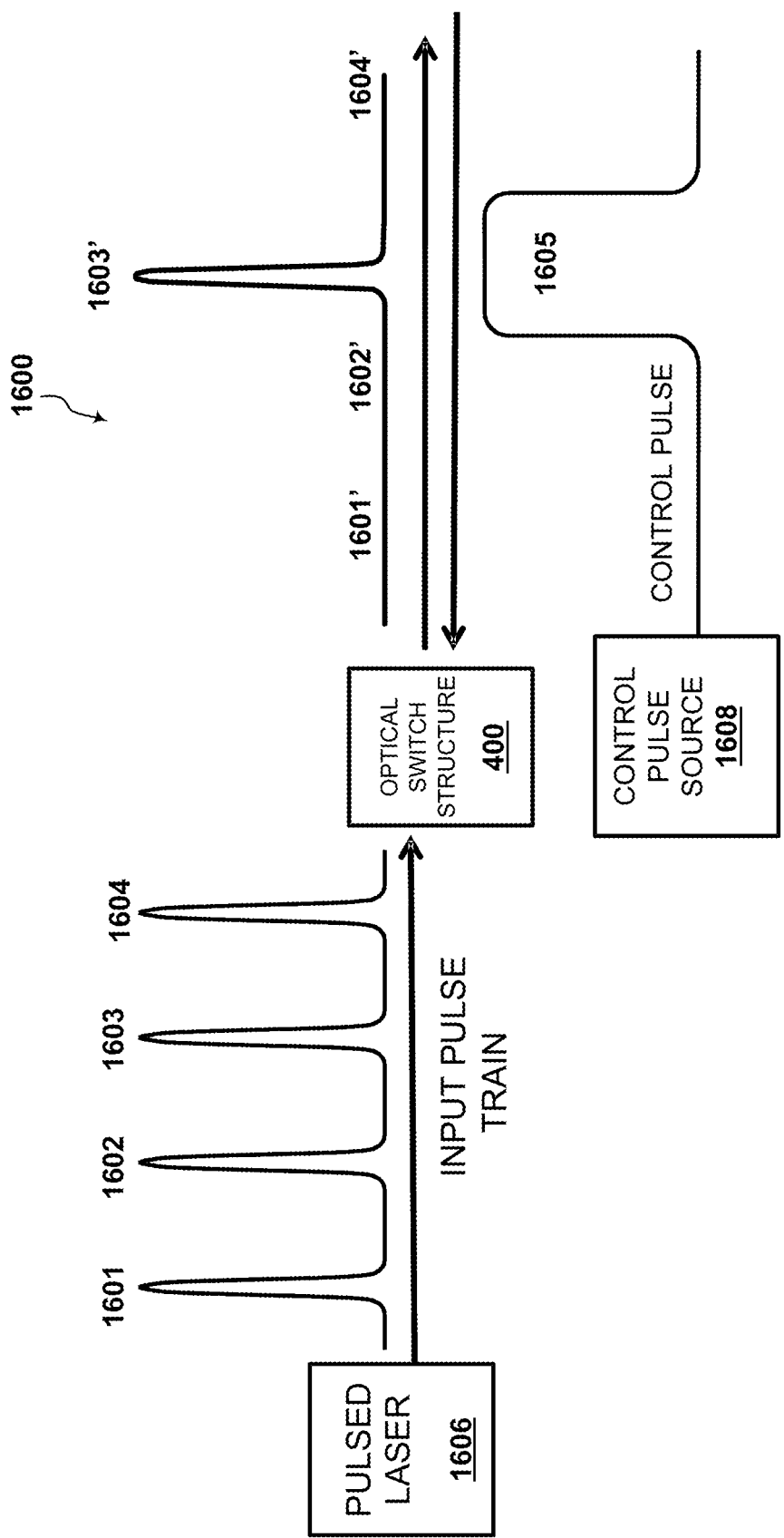
FIG. 16 is a diagrammatic view of an embodiment of an optical system illustrating the use of the optical switch structure of FIG. 4 for all-optical switching of a pulsed waveform.

FIG. 16 is a diagrammatic view of an embodiment of an optical system 1600 illustrating the use of the optical switch structure 400 of FIG. 4 for all-optical switching of a pulsed waveform. The system 1600 includes a pulsed laser 1606 configured to output a high-repetition-rate pulse train that includes input pulses 1601-1604 (e.g. generated by a mode-locked laser), a control pulse source 1608 configured to output one or more control pulses 1605, and the optical switch structure 400 operably coupled to the pulsed laser 1606 and the control pulse source 1608.

In operation, the input pulse train of input pulses 1601-1604 is transmitted into the optical switch structure 400 along with the counter-propagating control pulse 1605. At the location of the optical switch structure 400, the timing of the control pulse 1605 is substantially coincident (overlapping in time) with, for example, the input pulse 1603. The combined peak-power of the input pulse 1603 and the control pulse 1605 is of order $P_{T=100\%}$. For example, the peak power of the input pulse 1603 may be 0.1 $P_{T=100\%}$, and the peak power of the control pulse 1605 may be 0.9 $P_{T=100\%}$. In the absence of the control pulse 1605, the transmittance of the optical switch structure 400 is very low (in this example, 0.06%) because $P_{input} \ll P_{T=100\%}$. Thus, the transmittance of the optical switch structure 400 for input pulses 1601, 1602, and 1604 is substantially zero. On the other hand, because the combined peak power of the input pulse 1603 and the control pulse 1605 is of order $P_{T=100\%}$, the transmittance of the optical switch structure 400 for input pulse 1603 is substantially 100%.

Such an embodiment may be used for applications such as "pulse picking", as explained next. For example, in one representative application, a mode-locked fiber laser provides a convenient means of generating 5-picosecond-duration pulses having a specific desired time-domain waveform and wavelength spectrum. A repetition rate of 100 kHz is desired for a particular application, but the mode-locked fiber laser operates at a repetition rate of 10 MHz. Referring to the representative embodiment shown in FIG. 16, if the backward-propagating control pulse 1605 comprises a properly timed 100 kHz pulse train, only every 100$^{th}$ input pulse will be transmitted in the forward-propagating direction through the optical switch structure, thereby providing a source of 5-ps-pulses at a repetition rate of 100 kHz.

Alternatively, the control pulse 1605 may comprise a mode-locked pulse train and the "input" signal could comprise a low-repetition-rate, low-duty-cycle waveform, a brief portion of which (~5 ps, in this example) would be transmitted in the forward direction. The choice of waveforms for the input and control signals may be application dependent, and may be driven by a variety of considerations such as the power and/or wavelength of available laser sources, and the amount of switching extinction ratio required.

The above embodiment is meant to by illustrative and not limiting in any way. Numerous other all-optical switching embodiments are possible, involving the interaction of two or more co-propagating and/or counter-propagating pulses, at substantially the same or substantially different wavelengths, wherein such pulsed waveforms may be derived from the same laser source, two or more different laser sources operating independently, or two or more laser sources having specific phase and/or frequency relationships. For instance, in the example discussed above, a 9.9 MHz mode-locked laser pulse train could replace the 100 kHz control pulse waveform 165. Provided the correct phase relationship is maintained between the 9.9 MHz control and 10 MHz input waveforms, a 100 kHz pulse train would be transmitted in the forward propagating direction through the optical switch structure 164.

In one of the examples discussed above, the peak power of the input pulses 1601-1604 was 0.1 $P_{T=100\%}$, the peak power of the control pulse 1605 was 0.9 $P_{T=100\%}$, the on-state transmittance of the optical switch structure 400 for the input pulse train was 100%, and the off-state transmittance of the optical switch structure 400 for the input pulse train was 0.06%. A potential disadvantage of such a configuration is that the peak power of the control pulse 1605 must be approximately an order of magnitude greater than the input signal being controlled. If the peak powers of the input and control signals been made comparable ($P_{input}$=0.5 $P_{T=100\%}$/$P_{control}$=0.5 $P_{T=100\%}$)/optical switching would still be observed, but the off-state transmittance would be of order 25%, rather than 0.06%. Other embodiments may be directed towards reducing the required peak-power of the control signal while maintaining high on/off switching extinction ratio.

Such embodiments include those that take advantage of the fact that the transmittance as a function of the input power, T($P_{input}$), for both the optical switch structure (FIG. 4) and optical limiter structure (FIG. 6), is a periodic function of $P_{input}$. For example, in the case of the optical switch structure, earlier we noted that as the input power is increased beyond $P_{T=100\%}$ the transmittance T decreases until it reaches a minimum of substantially zero at an input power of P=2 $P_{T=100\%}$. More generally, the transmittance T is substantially 100% when P=(2 m+1) $P_{T=100\%}$, and the transmittance T is substantially 0% when P=2 m $P_{T=100\%}$/where m=0, 1, 2, 3, etc. Thus, for example, it is possible to have an input signal comprising a cw input beam of power $P_{input}$=2 m $P_{T=100\%}$, which, in the absence of a control signal, is not transmitted in the forward direction. Then, for example, the application of a backward propagating control pulse of peak power $P_{control}$=$P_{T=100}$% may result in substantially 100% of the cw input signal being transmitted in the forward direction for substantially the duration of the control pulse. In this manner, the ratio $P_{control}$/$P_{input}$ is reduced to of order 1/m, and very high on/off extinction ratio is simultaneously obtained. Other such embodiments that exploit the periodicity of the T($P_{input}$) transfer function may be contemplated, including switching architectures based on the optical limiter structure of FIG. 6, rather the optical switch structure of FIG. 4.

Figure 17A:
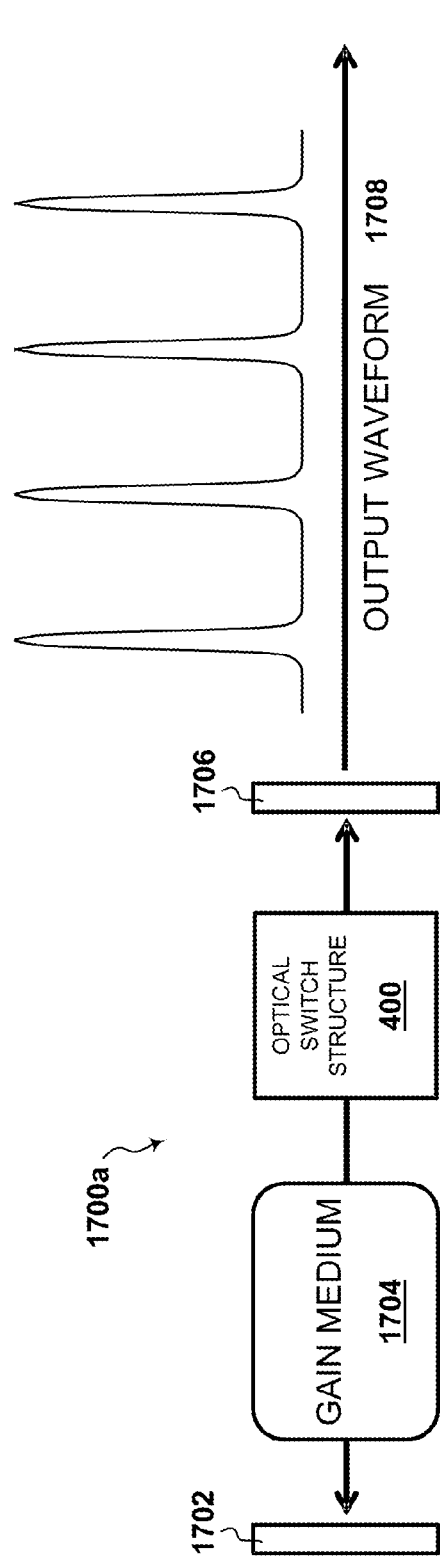
FIGS. 17A and 17B are diagrammatic views of embodiments of an optical system illustrating the use of the optical switch structure of FIG. 4 as a nonlinear element of a passively mode-locked laser.
Figure 17B:
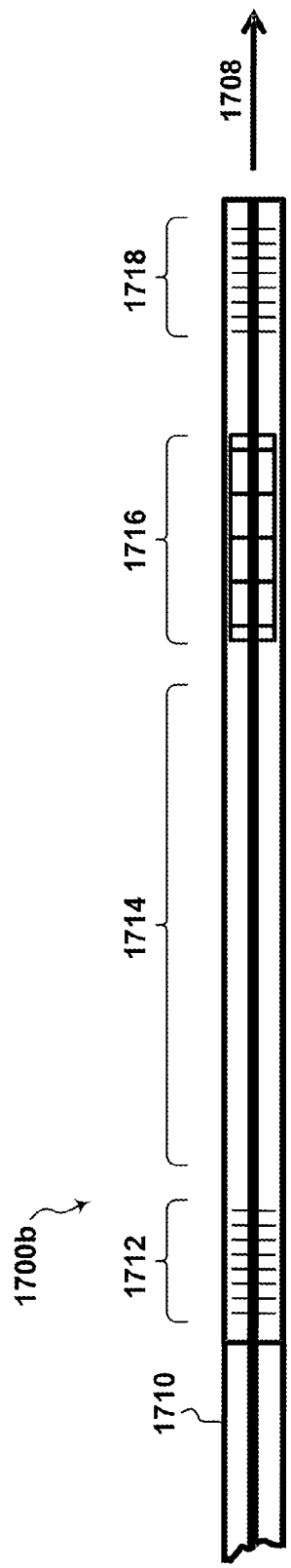

FIG. 17A is a diagrammatic view of an embodiment of a mode-locked laser system 1700a illustrating the use of the optical switch structure 400 of FIG. 4 as a nonlinear element. The mode-locked laser system 1700a includes an end mirror 1702, a gain medium 1704, the optical switch structure 400, and an output coupler 1706 in a linear, standing-wave cavity. It should be understood that a wide variety of mode-locked laser configurations are possible, including, but not limited to, standing-wave cavities, ring cavities, compound cavities, or combinations of the foregoing, which may incorporate a wide variety of other components (e.g. filters, optical isolators, active modulators). FIG. 17B depicts an embodiment of an all-fiber mode-locked laser architecture 1700b based on the optical switch structure 400 of FIG. 4. This all-fiber mode-locked laser comprises a fiber coupled pump 1710, a fiber Bragg grating end mirror 1712, a section of gain fiber 1714, an all-fiber version of the optical switch structure 1716, and a fiber Bragg grating output coupler 1718. In certain embodiments, some or all fibers comprising such a structure are fusion spliced together. The gain fiber 1714 may be core pumped, in which case the fiber coupled pump source 1710 may comprise a single-mode fiber having a near diffraction-limited output. Alternatively, the gain fiber 1714 may be cladding pumped, in which case the gain fiber 1714 and fiber Bragg Grating end mirror 1712 may comprise double-clad or multi-clad fiber structures, and the fiber coupled pump source may 1710 comprise a multimode fiber. FIGS. 17A and 17B are representative embodiments of how the power-dependent optical filter devices disclosed herein may be used to simplify, or drastically simplify, the architecture of mode-locked laser systems.

Figure 18:
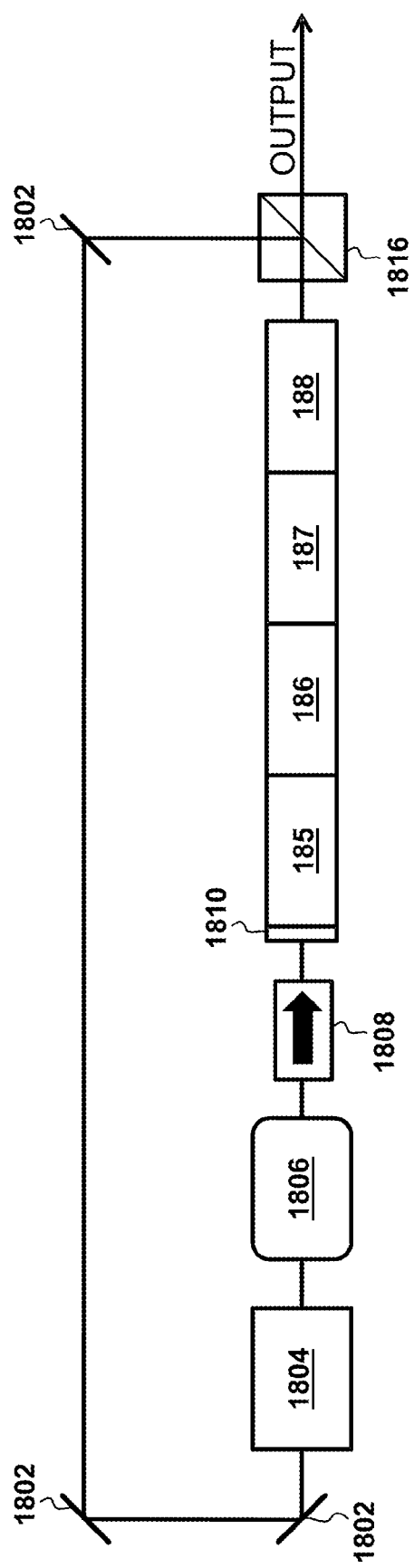
FIG. 18 is a diagrammatic view of an embodiment of an optical system illustrating the use of the optical switch structure of FIG. 4 as a power-dependent output coupler in a q-switched laser.

FIG. 18 is a diagrammatic view of an embodiment of an optical system 1800 illustrating the use of the optical switch structure 400 of FIG. 4 as a power-dependent output coupler in a q-switched laser. In this representative embodiment, an actively q-switched ring laser comprises a plurality of cavity mirrors 1802, an amplitude modulator 1804, a gain section 1806, an optical isolator 1808 (to ensure substantially unidirectional propagation inside the ring cavity), a polarizer 1810, the four-fiber structure of FIG. 3 (represented as fibers 1811-1814), and a polarizing beam splitter 1816. The cavity mirrors 1802 and the polarizing beam splitter 1816 define an optical cavity of the ring laser.

Such a cavity may provide for low-loss recirculation of low power pulses for regenerative amplification, and selective output coupling of high-peak power pulses to thereby substantially terminating the regenerative amplification process for a circulating pulse that reaches a predetermined peak power. Such a power-dependent output coupler may be used to provide substantially higher efficiency than a conventional q-switched laser (in which a fixed fraction of the signal undergoing regenerative amplification leaks out of the cavity during each round trip). Such a configuration may also substantially eliminate q-switch laser "pre-pulses" (low-amplitude pulses that precede the main output pulse, resulting from output coupler leakage during regenerative amplification). In some applications, such pre-pulses may be detrimental.

It should be understood that the embodiment shown in FIG. 18 is merely representative and is not meant to be limiting in any way. Rather, it is one of many regenerative amplification configurations contemplated in which one or more of the embodiments of the power selective optical switch structures disclosed herein is used to recirculate a pulse undergoing regenerative amplification until the circulating pulse reaches a peak power of order $P_{T=100\%}$, at which point the pulse is automatically coupled out of the regenerative amplifier by a power selective optical filter such as those disclosed herein.

Figure 19:
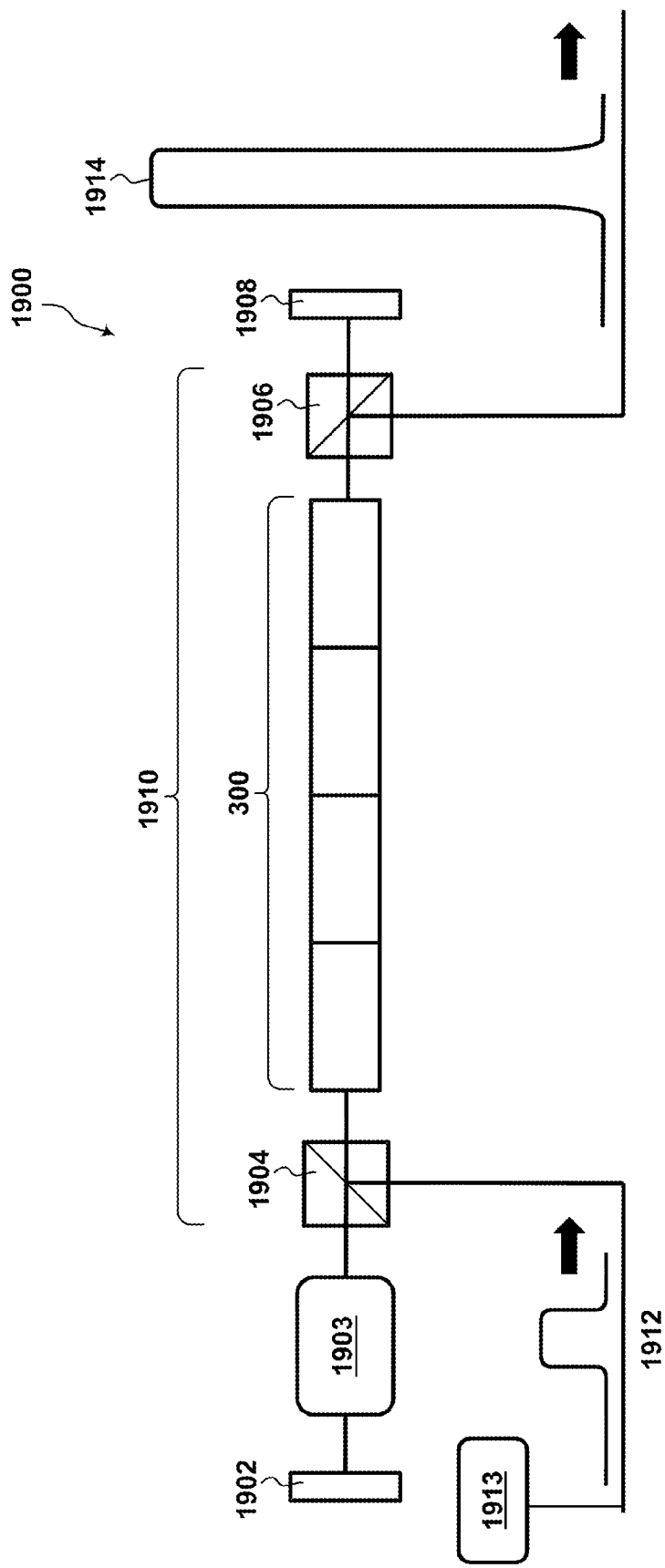
FIG. 19 is a diagrammatic view of an embodiment of an optical system illustrating the use of the optical switch structure of FIG. 4 for lasing cavity dumping.

FIG. 19 is a diagrammatic view of an embodiment of an optical system 1900 illustrating the use of the optical limiter structure 600 of FIG. 6 for lasing cavity dumping. The system 1900 comprises a first cavity end mirror 1902, a gain medium 1903, a first polarizing beam splitter 1904, the four-wave-plate structure 300 of FIG. 3, a second polarizing beam splitter 1906, and a second cavity end mirror 1908. Components 1904, 300, and 1906 together define a power-dependent optical filter 1910. In an embodiment, the circulating intra-cavity power is adjusted such that the interaction of SPM and XPM in the four-wave-plate structure 300 rotates the polarization of cw intracavity light passing therethrough by m×180°, where m is an integer greater than or equal to 1, thereby generating no net change in polarization state. One or more control pulses 1912 output from a control pulse source 1913 are directed through the four-wave-plate structure 300 and results in an additional 90° of polarization rotation in the four-wave-plate structure 300 that switches light out of the laser cavity for substantially the duration of the control pulse 1912. Thus, the application of the control pulse 1913 increases the power of the circulating signal in the optical cavity defined by the first cavity end mirror 1902 and the second cavity end mirror 1908 so that the polarization is rotated an additional 90°, which is selectively directed out of the optical cavity by the second polarizing beam splitter 1906. Where m>>1, the peak power of the cavity dumped output signal 1914 may be substantially larger than the peak power of the control pulse 1912.

In related embodiments, the optical switch structure 400, optical limiter structure 600, and/or related embodiments disclosed herein may be used to multiplex and/or demultiplex cw and high-peak-power signals, and more generally, low-peak-power signals and high-peak-power signals. Thus embodiments described herein may be used to "decouple" a high-peak-power signal from a large cw background, for example.

VI. Additional Embodiments for Power Selective Optical Filter Devices, Wave-Plate Structures, and Optical Systems In addition to the above-described embodiments, the power selective optical filter devices and/or wave-plate structures may be used in combination with each other to tailor a transmittance (i.e., transfer function) thereof. In addition, the power selective optical filter devices and/or wave-plate structures may be used in a variety of different optical systems. Furthermore, additional embodiments for power selective optical filters are described in this section. Herein below, embodiments pertaining to a single ZOZWP (FIG. 20) version of this device may be referred to as a "two fiber amplitude discriminator" ("2FAD") (power selective optical filter device 2000 of FIG. 20). Unless specifically indicated herein, any of the disclosed power selective optical filter devices and wave-plate structures may be used interchangeably with each other. However, certain applications may be better suited to using specific embodiments of the power selective optical filter devices disclosed herein. As with the "four fiber amplitude discriminator" ("4FAD") (power selective optical filter device 400 of FIG. 4), the 2FAD may be configured with substantially perpendicular input/output polarizers (in which case it may function as a switch), substantially parallel input/output polarizers (in which case it may function as a limiter), or with input and output polarizers disposed at other predetermined angles to form various different embodiments of power selective optical filter devices.

The transfer function of the 2FAD is given by:

$$T = \text{Sin}(2\Theta)^2 \ \text{Sin}\left(\frac{\Phi}{6}\text{Cos}(2\Theta)\right)^2$$

In the case of the 4FAD, if the input polarizer is oriented so that Θ=22.5°, the transmittance of the 4FAD is 100%. In the case of the 2FAD, it can be shown that peak transmittance is obtained if the input polarizer is oriented at Θ=~35°. That may result in a transmittance of ~88% (this number may be higher or lower in different embodiments). In the case of the 2FAD, there is a tradeoff between nonlinear phase shift and insertion loss.

$$T_{2FAD} = \text{Sin}(2\Theta)^2 \text{Sin}\left(\frac{\Phi}{6}\text{Cos}(2\Theta)\right)^2 =$$

$$\text{Sin}(2[35°])^2 \text{Sin}\left(\frac{\Phi}{6}\text{Cos}(2[35°])\right)^2 = \text{Sin}(70°)^2 \ \text{Sin}\left(\frac{\Phi}{6}\text{Cos}(2[35°])\right)^2 =$$

$$0.88\text{Sin}(0.057\Phi)^2 \ T_{4FAD} = \text{Sin}(4\Theta)^4 \text{Sin}\left(\frac{\Phi}{12}\text{Cos}(2\Theta)\right)^4 =$$

$$\text{Sin}(4[22.5°])^4 \ \text{Sin}\left(\frac{\Phi}{12}\text{Cos}(2[22.5°])\right)^4 =$$

$$\text{Sin}(90°)^4 \ \text{Sin}\left(\frac{\Phi}{12}\text{Cos}([45°])\right)^4 = \text{Sin}(0.059\Phi)^4$$

The coefficients in the above equations, 0.057 in the case of a 2FAD, and 0.059 in the case of a 4FAD, provide an indication of how much nonlinear phase shift is required to make the argument of the Sin function equal to π/2. Slightly more nonlinear phase shift is required in the case of the 2FAD, but for all intents and purposes, the two devices utilize nonlinear phase shift to provide optical switching (from T=0% to $T=T_{max}$) with comparable efficiency. This also implies that both devices offer approximately the same benefits from the standpoint of keeping fiber lengths as short as possible (e.g. to minimize the effects of group velocity dispersion in an ultra-short-pulse laser).

Fabrication of a 2FAD or a 4FAD may begin by preparing a large number (n) of PM fiber segments of nominally identical length (e.g. using ribbonization and a ribbon cleaver). The next fabrication step is to take two of the n PM fiber segments and fusion splice them together at about 90°, as described above, to form a ZOZWP. The ZOZWP is the basic building block for device fabrication. In a manufacturing setting, very large numbers of ZOZWPs may be fabricated by an automated or a semi-automated process at a relatively low cost.

In the case of a 2FAD, a single ZOZWP 200 may be spliced between two fiber polarizers 402 and 406 at predetermined angles. In this embodiment, all-fiber (rather than bulk, free-space) polarizers are used. However, bulk polarizers may be used in other embodiments. Fabrication of a 2FAD includes 1 ZOZWP, 2 fiber polarizers, and 2 angle-splicing operations. Fabrication of a 4FAD on the other hand includes 2 ZOZWP, 2 fiber polarizers, and 3 angle-splicing operations. The manufacturing set up for fabrication of both devices is nominally identical. Thus, the net difference between 2FAD and 4FAD fabrication is 1 ZOZWP and 1 angle-splicing operation.

If, for example, cost is dominated by fiber polarizer fabrication, then the difference in per-unit cost of a 2FAD and 4FAD may be negligible. There may be situations in which the performance of the 2FAD has little impact on the end use application, in which case some reduction in manufacturing cost may be realized. Determining whether to use a 2FAD or a 4FAD may be analyzed on a case-by-case basis. Several specific cases may be considered. The first case considered is a multi-stage fiber amplifier system in which successive high-gain amplifiers are separated by 4FADs. This is shown in the previously described two-stage fiber amplifier system 900 shown in FIG. 9, expect that the optical switch structure 400 shown in FIG. 9 may be considered a 4FAD. In this application, the extremely high extinction ratio of the 4FAD for low-input-power signals can be important from the standpoint of bidirectional ASE blocking. This is particularly true in the presence of non-ideal effects such as relaxation oscillations often observed in high gain amplifiers. The $Sin^4$ transfer function of the 4FAD is also important to filter out weak back-reflected pulses (generated by reflection at optical interfaces, the onset of SBS, etc.) that would otherwise traverse multiple stages of high-gain amplification. The same is true of weak back-reflected pulses generated by whatever object the output beam of the pulsed laser impinges on (e.g. in laser machining applications).

The second case considered is the use of a 4FAD to filter out the after-pulse generated by a microchip laser, such as depicted in the optical system 1000 shown in FIG. 10. The impact of a less steep switching transfer function is clear. Significant punch through of the after-pulse may be observed if a 2FAD rather than a 4FAD is used. For example, the amplitude of an after-pulse may be 8% of amplitude of a main pulse. In such a case, a 4FAD provides 17 dB greater extinction ratio than a 2FAD.

The third case considered is an all-fiber, passively mode-locked laser (e.g. 1700a or 1700b), such as that described above in FIGS. 17A and 17B. As will be discussed later, for the ideal case in which the polarizers and fiber Bragg grating ("FBG") 1718 have negligible insertion loss, the double-pass peak transmittance of the 4FAD-cavity-mirror assembly 400 is about 100%, whereas that of a 2FAD-cavity-mirror assembly is (at least in some embodiments) about 76%. Using realistic insertion-loss values for the all-fiber polarizers (0.5 dB per pass) and high-reflectivity Fiber Bragg grating mirror, the double-pass peak transmittance of the 4FAD-cavity-mirror assembly may be about 52%, and that of the 2FAD-cavity-mirror assembly may be about 35% (in some embodiments). The extent to which this constitutes a significant disadvantage is application dependent.

In the context of passively mode-locked lasers, one potential benefit of very high extinction ratio at low peak power concerns the question of self starting. When a passively mode-locked laser is first turned on, it may stabilize in a cw rather than pulsed mode of operation. Typically, the formation of a mode-locked pulse train is initiated by amplitude noise and/or parameter fluctuations that generate a transient waveform which, because of its higher peak power, experiences higher round trip gain in the laser cavity than does a cw signal. But this regenerative pulse amplification process requires an initial perturbation of some minimum size (otherwise self-starting would not be a concern). The potential advantage of a passive mode-locker having very high extinction for low-peak-power signals is that it allows very high levels of inversion (and thus, very high small signal gain) to be achieved in the gain medium before reaching the threshold for cw lasing (which then clamps the population inversion).

In this situation, when the pump laser is first turned on, the small signal gain ramps up to a very high value before the system as a whole reaches the threshold for cw lasing (at which point the round trip small-signal gain is equal to the round trip cavity loss). Over a wide range of operating conditions, initiation of lasing under conditions of very high gain does not result in stable cw operation, but rather, various forms of amplitude instability (relaxation oscillations, self-pulsing, chaotic pulse generation, etc.). These typically continue on an indefinite basis. Fiber lasers in particular exhibit such self-pulsing phenomena over a wide range of operating conditions. Such a condition is potentially conducive to self-starting of a mode-locked laser. This is in striking contrast to a passive mode-locking device such as a SESAM, whose insertion loss for low-power signals may only be tenths of a percent. Both the 2FAD-cavity-mirror assembly and 4FAD-cavity-mirror assembly provide extremely high extinction ratio for low-power signals.

The above discussion of the potential use scenarios for the 2FAD and the 4FAD is directed to various specific applications, and in each of those applications the 4FAD (or 2FAD) was configured as an optical switch, rather than some other type of device, such as an optical limiter. However, it should be understood that a 2FAD may be used instead of a 4FAD in all of the embodiments and applications described herein.

Figure 22:
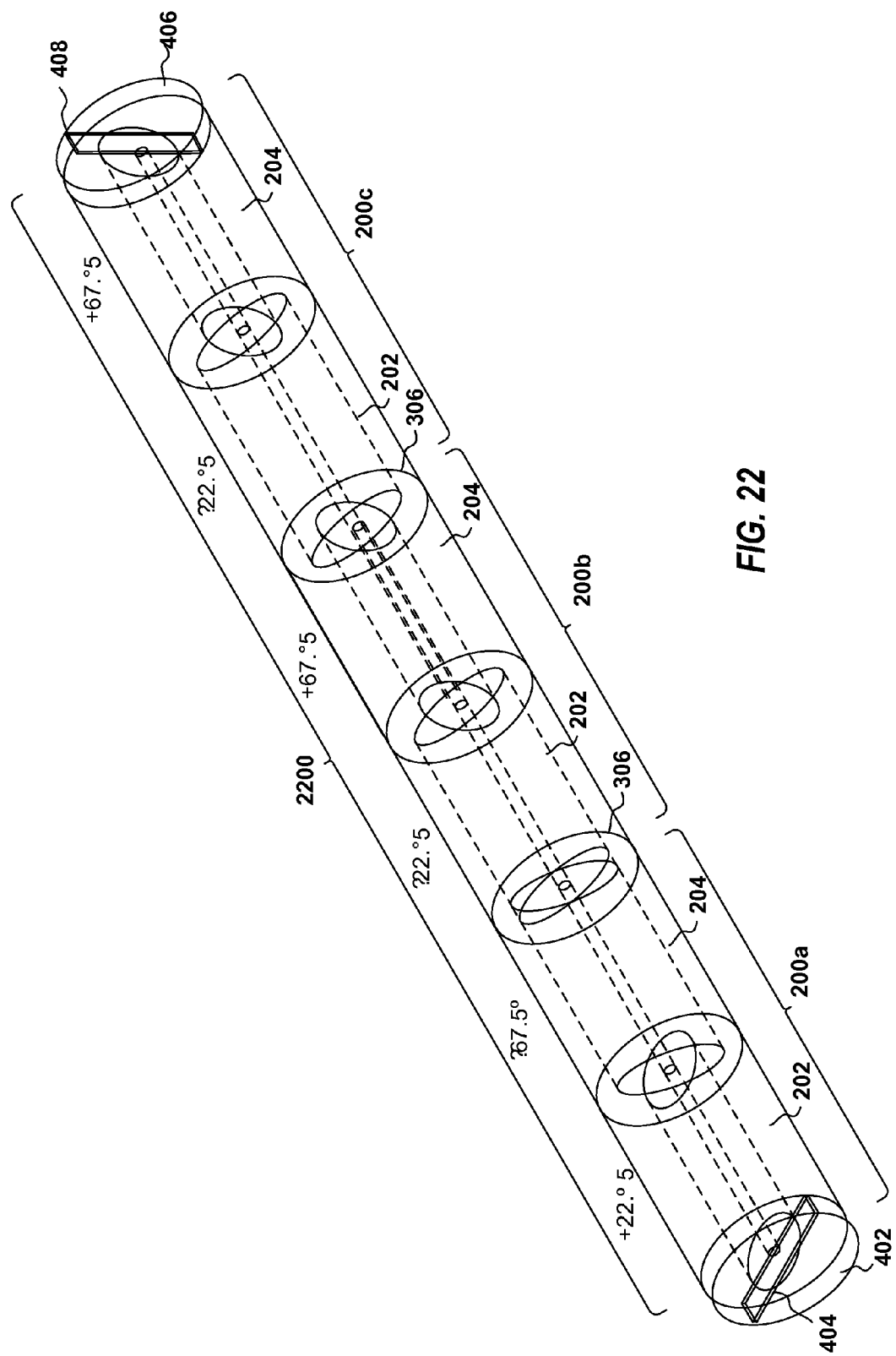
FIG. 22 is an isometric view of an embodiment of a power selective optical filter device configured as an optical switch structure that substantially attenuates low-peak-power optical signals while allowing high-peak-power optical signals to pass therethrough including the three of the wave-plate structures shown in FIG. 2 sandwiched between and disposed in a specified angular orientation relative to a pair of linear polarizers having substantially mutually perpendicular transmission axes.

Some embodiments may include multiple ZOZWPs. For instance, a power selective optical filter device may include a first, a second and a third ZOZWP. As shown in FIG. 22, ZOZWP 200a, ZOZWP 200b and ZOZWP 200c may be sandwiched between an input polarizer 402 and an output polarizer 406. The three ZOZWPs may be spliced in series, sandwiched between crossed input/output polarizers 402 and 406, wherein the angle of the slow axis, at the input of the $1^{st}$ ($2^{nd}$, $3^{rd}$) ZOZWP, with respect to a transmission axis 404 of the input polarizer 402, is denoted $\Theta_1$ ($\Theta_2$, $\Theta_3$). Such an arrangement may be referred to herein as a "6FAD" (power selective optical filter device 2200 shown in FIG. 22).

An alternative approach to determining which N-FAD configuration is to be used for a specific application is to conduct numerical calculations over the relevant range of ($\Theta_1$, $\Theta_2$, $\Phi$) parameter space, and then use one or more sorting algorithms to find combinations of $\Theta_1$ and $\Theta_2$ that correspond to useful transfer functions. In doing so, it may be concluded that of the infinite number of possible $T_{4FAD}(\Theta_1, \Theta_2, \Phi)$ transfer functions, $T_{4FAD}(\pi/8, -\pi/8, \Phi)$ may have the greatest all around functionality for various different contemplated applications. But it should be understood that other $T_{4FAD}(\Theta_1, \Theta_2, \Phi)$ configurations may readily be constructed that have varying degrees of functionality in various applications.

While an exhaustive numerical search of $(\Theta_1, \Theta_2, \Phi)$ parameter space may be considered useful for confirming that $T_{4FAD}(\pi/8, -\pi/8, \Phi)$ provides the best all-around performance and functionality for a specific application, in the case of more complex devices, such a numerical search may be a practical approach to determining the best combination of wave plate angles for a given application.

For example, numeric calculations led to the discovery that with the following combination of wave plate angles (degenerate 6FAD configurations shown in gray):

$$\Theta_1 = +\frac{\pi}{12} = +15° \quad \Theta_2 = -\frac{\pi}{12} = -15° \quad \Theta_3 = +\frac{\pi}{12} = +15°$$

$$\Theta_1 = -\frac{\pi}{12} = -15° \quad \Theta_2 = +\frac{\pi}{12} = +15° \quad \Theta_3 = -\frac{\pi}{12} = -15°$$

$$\Theta_1 = +\frac{5\pi}{12} = +75° \quad \Theta_2 = +\frac{\pi}{12} = +15° \quad \Theta_3 = +\frac{5\pi}{12} = +75°$$

$$\Theta_1 = -\frac{5\pi}{12} = -75° \quad \Theta_2 = -\frac{\pi}{12} = -15° \quad \Theta_3 = +\frac{5\pi}{12} = +75°$$

the "delayed switching" transfer function may thus be obtained, as shown below:

$$T(\Phi) = \left(\frac{1}{4}\left[1 - 3\text{Cos}\left(\frac{\Phi}{6\sqrt{3}}\right)\right]\text{Sin}\left(\frac{\Phi}{12\sqrt{3}}\right)\right)^2$$

Due to the nature and properties of the 6FAD, it may be well suited for pulse picking.

For example, a mode-locked fiber laser may provide a convenient means of generating picosecond-duration pulses (e.g. as described in the optical system 1600 of FIG. 16). Mode-locked fiber laser 1606 may generate such pulses 1601-1604 at a high repetition rate (e.g. 10 MHz). In one embodiment, an objective may be to down-sample the 10 MHz pulse train to a repetition rate of 100 kHz for subsequent amplification to generate ps-duration pulses of high pulse energy. Two input pulse trains of comparable pulse duration and peak power, one with a repetition rate of exactly 10.0 MHz (e.g. pulse train of input pulses 1601-1604), and one with a repetition rate of exactly 10.1 MHz (e.g. control pulse 1605), are wavelength multiplexed together, and coupled into the 6FAD 2200. The phase relationship between the two pulse trains is such that every 10 μs, the two pulses, hereafter referred to as the signal pulse ("SP") and control pulse ("CP"), enter the 6FAD coincident in time. The input power of each pulse individually corresponds to a nonlinear phase shift of $\Phi=15$ radians. In the absence of a control pulse, the signal pulse is almost completely blocked. In the presence of the control pulse ($\Phi_{SP}+\Phi_{CP}=30$ radians), the signal pulse is almost completely transmitted. Note that operation in the vicinity of $\Phi_{SP}+\Phi_{CP}=30$ radians should not pose problems from the standpoint of Stimulated Raman Scattering.

There is a trade-off between extinction ratio and on-state transmittance. In the above example, signal and control pulses of equal amplitude were used and operated at $\Phi=15$ radians. Instead of specifying a 50/50 ratio of input powers for the signal and control pulses, both on-state transmittance and off-state extinction ratio may be maximized by using a signal/control amplitude ratio of order 40/60. Specifically, the peak amplitude of the signal pulse ("SP") may be selected to coincide with the transmission null:

$$T_{6FAD}(15°, -15°, 15°, \Phi) = 0 \quad \Phi_{SP} = 12\sqrt{3}\,\text{Cos}^{-1}\left(\frac{2}{3}\right)$$

and choose the peak amplitude of the control pulse (CP) such that the sum of the signal and control pulse amplitudes coincide with the transmission maximum:

$$T_{6FAD}(15°, -15°, 15°, \Phi) = 1$$

$$\Phi_{SP} + \Phi_{CP} = 6\sqrt{3}\,\pi$$

$$\Phi_{CP} = 6\sqrt{3}\,\pi - 12\sqrt{3}\,\text{Cos}^{-1}\left(\frac{2}{3}\right)$$

It should also be noted that the amount of leakage in the absence of a control pulse depends in part on the temporal pulse profile. For example, in the limiting case of a rectangular pulse, there is no ripple in the off-state output waveform. By adjusting the amplitude of the rectangular pulse to coincide with the null in the T[$\Phi$] curve in the vicinity of $\Phi=12.8$ radians, zero leakage in the off-state may be achieved. But the vast majority of temporal pulse shapes encountered in real-world applications have non-negligible rise and fall times. Thus, the presumption of a rectangular waveform is rarely appropriate.

In some embodiments, the 6FAD 2200 (as shown in FIG. 22) out-performs both the 2FAD and 4FAD devices in pulse picking applications. Both a 4FAD switch (generally perpendicular input/output polarizers) and a 4FAD limiter (generally parallel input and output polarizers) may be used for pulse picking. In cases where a 4FAD switch is used for pulse picking, the off-state extinction ratio may only be around 6 dB. In the case of a 4FAD limiter, if the amplitudes of the signal and control pulses are made equal to $P_{T=0\%}$, assuming a rectangular temporal waveform for both pulses, the transmittance for an individual pulse is 0%. On the other hand, coincident signal and control pulses sum to an amplitude of 2 $P_{T=0\%}$, such that the transmittance for coincident pulses is 100%.

Returning to the subject of the 6FAD pulse picker, its theoretical extinction ratio for low-input-power signals is not as high as that of a 4FAD switch. On the other hand, an extinction ratio of 40 dB is achieved in the vicinity of $\Phi=0.5$ radians, which indicates that a 6FAD pulse picker would provide excellent hold off of low-peak-power signals such as ASE in many real-world applications.

Multiple other $T_{6FAD}(+\Theta, -\Theta, +\Theta, \Phi)$ transfer functions may be realized by using values of $\Theta$ other than $\pi/12$. Thus, while the above discussion emphasizes the use of the 6FAD in pulse picking applications, it should also be understood that a 6FAD may be used instead of a 2FAD or 4FAD in all of the embodiments contemplated herein.

The above principles may be extended to devices such as an 8FAD, a 10FAD, a 12FAD, etc. continuing perpetually to an N-FAD device, where N is a positive even integer. The additional complexity of fabricating and splicing 4, 5, 6, etc. ZOZWPs may be balanced against the potential utility of the transfer functions that may be realized with such device configurations. For example, consider the 8FAD configuration.

In some applications, the fact that such a device provides a transfer function that more closely resembles a conventional fast saturable absorber, which is monotonic in input power and saturates at 100% transmittance, may be of significant importance. Such a device may also be configured as a limiter by using parallel input/output polarizers, so as to provide a wide range of input power over which attenuation of high power signals is achieved.

Figure 26:
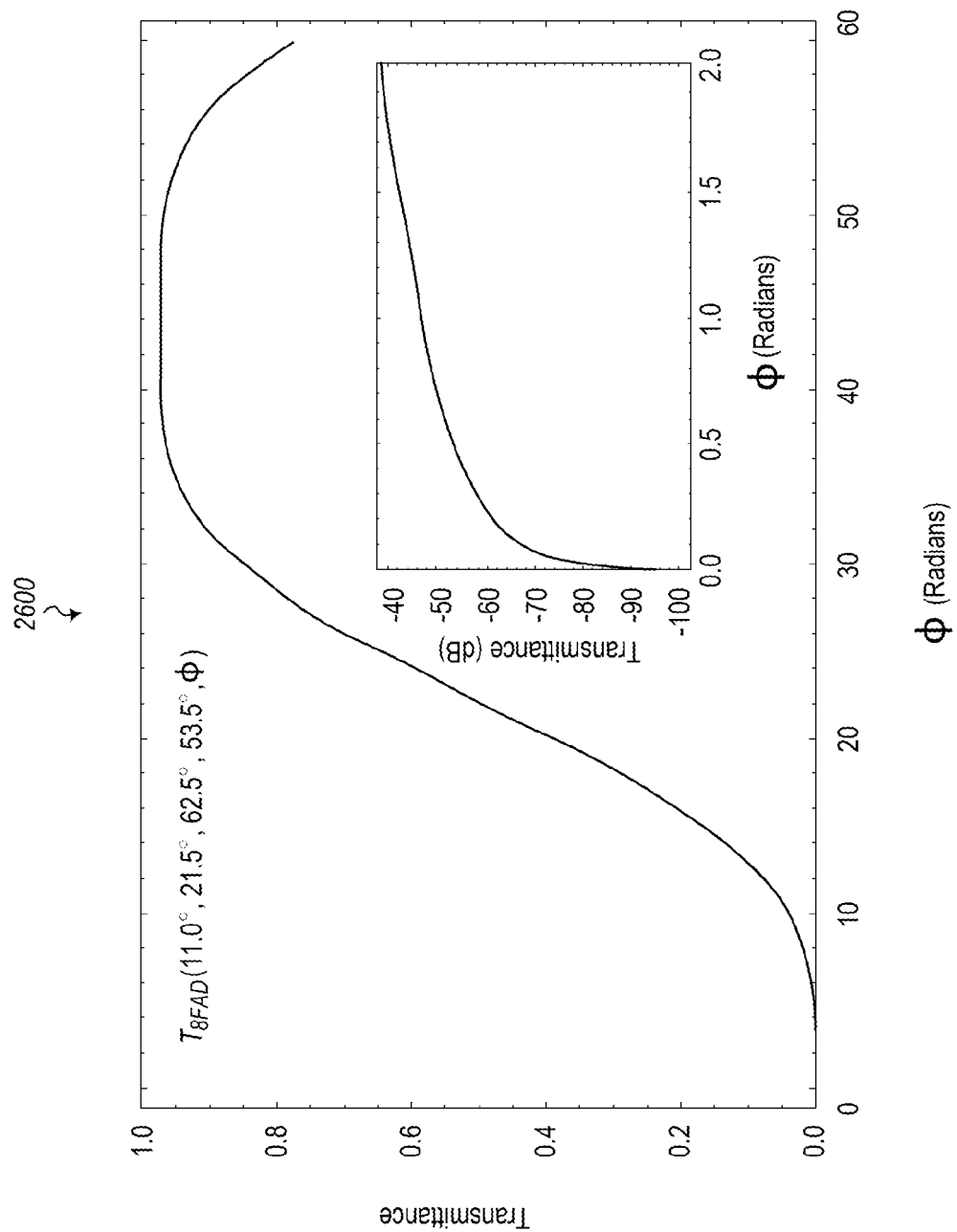
FIG. 26 is a transfer function graph of an embodiment of an 8FAD designed to provide a wide and flat bandpass region, high extinction for low-input-power signals, and high on-state transmittance.

In considering the application of devices such as 6FADs and 8FADs, it should be noted that the use of a larger number of fiber segments does not necessarily imply significantly increased vulnerability to nonlinear effects such as SRS. Indeed, such devices may be configured to operate such that $P_o$ corresponds to a nonlinear phase shift of $\Phi=30$ to 40 radians, whereas $P_o$ corresponds to a nonlinear phase shift of $\Phi\approx27$ radians for a conventional 4FAD. In some cases, as shown in transfer function graph 2600 of FIG. 26, a transfer function of an 8FAD may be designed to provide a wide and flat bandpass region, high extinction for low-input-power signals, and high on-state transmittance (in some cases, about 97%).

In some specific applications of FAD technology, reaching the threshold for stimulated Raman scattering may raise design issues. For example, in reference to an all-fiber, passively mode-locked fiber laser configurations, a potential problem with SRS may be anticipated because the 4FAD is double-passed in such a cavity configuration. On the right-hand side of the laser cavity, this potential problem may be remedied by ensuring that the high-reflectivity cavity end mirror does not have high reflectivity at the Raman signal wavelength. For example, the use of a conventional (non-chirped) FBG reflector may automatically provide this functionality, in which case the Raman signal generated during the first pass through the FAD is not re-circulated by the cavity end mirror. On the side of the laser cavity, the partially reflective output coupler (FBG OC) may be configured in an analogous manner, so as to prevent recirculation of the Raman signal.

In some cases, countermeasures may be used to inhibit SRS in FAD components or systems incorporating FAD components. These include, but are not limited to one or more of the following: 1) Conventional fiber Bragg grating reflectors adapted to selective extraction of Raman signal wavelengths (such as the cavity end-mirror configuration described above), 2) Wavelength division multiplexers (WDMs) adapted to selective extraction of Raman signal wavelengths, 3) Long-period gratings adapted to selective extraction of Raman signal wavelengths, 4) Coiling of one or more spans of fiber directed towards selective extraction of Raman signal wavelengths by exploiting the wavelength dependence of bend loss, 5) Core/cladding refractive-index profiles adapted to resonantly couple Raman signal wavelengths to the fiber cladding, 6) Core/cladding refractive-index profiles adapted to resonantly couple Raman signal wavelengths to the fiber cladding in the presence of fiber bending, 7) Dopant species adapted to preferentially absorb Raman signal wavelengths, 8) Fiber co-dopants adapted to increasing the ratio $n_2/g_{SRS}$, 9) Features and/or fabrication methods adapted to minimizing the length of one or more fiber components (e.g. polarizers), or combinations thereof.

Many of the above countermeasures for SRS may be used simultaneously and/or in conjunction with each other. Structures such as gratings may be written directly into one or more portions of the fiber used to construct the FAD device (as opposed to being fabricated in a separate piece of fiber which is then fusion spliced in place). When implemented in the form of one or more distributed wavelength filtering structures, such countermeasures need not entail a net increase in the total length of fiber used in such a component, device, system, etc.

With regard to the final item in the above list (i.e. item 9), when constructing very short FAD devices (e.g. devices with very high switching threshold and/or devices fabricated with high-nonlinearity fiber), the amount of additional fiber associated with an all-fiber input (or output) polarizer may constitute a significant fraction over the overall device length. For example, the length of an encapsulated polarizer may be 35 mm. In the context of the $P_o=10$-kW 4FAD switch discussed earlier, the combined length of the input and output polarizers (70 mm) is an order-of-magnitude smaller than the length of the four-fiber structure sandwiched between the two polarizers (700 mm). In this case, the length of the fiber pigtails associated with the fiber polarizers is not critical from the standpoint of suppressing SRS. One the other hand, consider a 4FAD switch constructed to have $P_o=100$-kW, for which the fiber polarizers constitute half of the overall device length. In this case, keeping the length of the polarizers (relative to the length of the ZOZWP assembly) to a minimum is a greater concern.

Accordingly, in addition to the SRS countermeasures described above, the use of low-$n_2$ fiber (e.g. large-mode-area fused silica fiber having a fluorine-down-doped cladding region) for the ZOZWP assembly may be considered in any such situation. Where the additional fiber associated with the input/output polarizers is of concern, tighter integration of the fiber polarizers and zero-order zero-wave plates may also be warranted. For example, in some cases it may be desirable to fabricate a 4FAD switch by splicing together the six PM fiber segments required (one for the input polarizer, four for the pair of zero-order zero-wave plates, and one for the output polarizer) prior to polarizer fabrication (which entails the application of a metal coating in the vicinity of the fiber core, followed by packaging operations such as recoating, potting, encapsulating, etc.).

Similar considerations apply to other components used in conjunction with FAD devices (e.g. 4FAD 300 or 2FAD 2000). For example, an all-fiber passively mode-locked fiber laser (e.g. laser 2400 of FIG. 24) may be constructed. For the sake of discussion, let us assume that such a mode-locked laser is implemented with a $P_o=1$-kW 4FAD switch of length 7 m. Assuming that the nonlinear coefficient $n_2$ of the rare-earth-doped gain fiber is comparable to that of the fiber used to fabricate the 4FAD switch, we may be limited to a comparable length of gain fiber (unless one or more anti-SRS counter measures such as those described above were implemented). In practice, however, such a laser system would most likely be implemented using a large-mode-area rare-earth-doped gain fiber, thereby providing an order-of-magnitude or more reduction in Raman gain in the gain fiber. Thus, as described above, in some applications of FAD technology, component selection, device architecture, operating conditions, etc. may be conducted with due consideration given to prevention of SRS.

Various different devices may implement or be based on FAD technology. These devices may be capable of providing more "exotic" transfer functions (e.g. very steep switching curves, ultra-high extinction ratio, greatly improved performance in pulse picking). Moreover, a new class of non-reciprocal optical devices may be provided in which transmittance depends on the direction that light propagates through the device.

Figure 23:
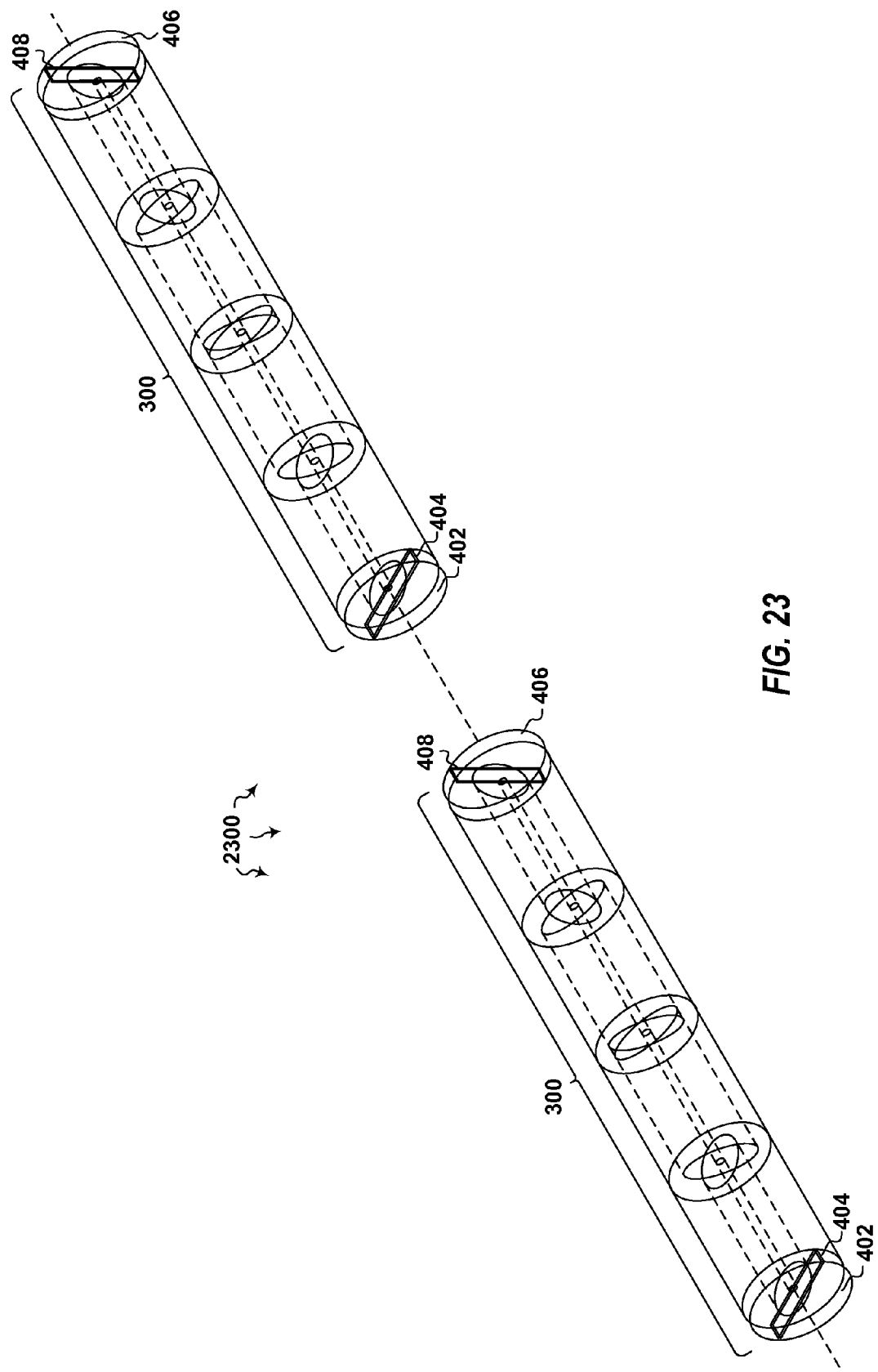
FIG. 23 is an isometric view of an embodiment of a power selective optical filter device configured as an optical switch structure that substantially attenuates low-peak-power optical signals while allowing high-peak-power optical signals to pass therethrough including two of the power selective optical filter devices shown in FIG. 4 arranged in series.

An embodiment of a power selective optical filter device 2300, as shown in FIG. 23 includes two 4FAD switches 300 (i.e., two of the power selective optical filter devices 400 shown in FIG. 4) cascaded in series. For the sake of discussion, it may be assumed that the polarizers 402 and 406 have negligible insertion loss. The net transmittance of two 4FAD switches in series is not simply the product of the individual device transfer functions:

$$T\{T_{4FAD}(22.5°,-22.5°,\Phi),T_{4FAD}(22.5°,-22.5°,\Phi)\} \neq T_{4FAD}(22.5°,-22.5°,\Phi)^2$$

but rather, has the more complicated mathematical form:

$$T\{T_{4FAD}(22.5°,-22.5°,\Phi),T_{4FAD}(22.5°,-22.5°,\Phi)\} = T_{4FAD}(22.5°,-22.5°,\Phi)T_{4FAD}(22.5°,-22.5°,\Phi T_{4FAD}[22.5°,-22.5°,\Phi]).$$

The nonlinear response of the first 4FAD switch strongly modulates the Φ argument of the second 4FAD switch, resulting in a dramatic steepening of the 4FAD switching curve for the overall power selective optical filter device 2300 (as shown in transfer function graph 2700 of FIG. 27). An improvement in extinction ratio may also be observed for low-power signals. For example, in one embodiment, at an input power that corresponds to Φ=10 radians, the extinction ratio of a single 4FAD switch is 9 dB, whereas that for two 4FADs in series the extinction ratio at Φ=10 radians is 52 dB. Thus, the effect of cascading such highly nonlinear devices may be far more dramatic than what is encountered when cascading ordinary (linear) passive optical components.

In some cases, the output polarizer 406 of the first 4FAD switch 300 may be used as the input polarizer of second 4FAD switch 300, such that a total of only three polarizers are required. Only two polarizers are required if a mirror is used to double-pass a single 4FAD. In some embodiments, the extinction ratio at very low power may be limited by non-ideal effects (e.g. the finite extinction ratio of the polarizers, angular misalignment at the fiber splices, less than perfect polarization holding behavior for the PM fiber, etc.). However, even if each 4FAD were limited to an extinction ratio of 30 dB, two devices in series would provide an extinction ratio of 60 dB, which is extraordinary.

Further embodiments may include two 6FAD switches in series, both configured as $T_{6FAD}(-15°, -15°, -15°, \Phi)$. Such a configuration may provide an extremely high extinction ratio at low input power, and a very steep switching curve. Other embodiments may include an ultra-high-performance FAD switch synthesized from two 6FADs spliced in series, where all six PM fiber splice angles have been roughly optimized for a pulse picking application. $P_o$ corresponds to a nonlinear phase shift of 32 radians, at which the transmittance is substantially 100%, while the extinction ratio at ½ $P_o$ is greater than 60 dB. While it should be understood that such a device would excel in the all-optical pulse picking applications considered earlier, in light of what may be achieved by cascading two FAD devices in series, the practicality of a simpler, non-optical pulse picking scheme may also be employed.

In some embodiments, attaining a pulse picking on/off extinction ratio of >60 dB may only require that the input signal be amplitude modulated to a modulation depth of 50% (3 dB). This implies that a wide variety of amplitude modulators could be used. For example, an acousto-optic modulator may be used, fully transmitting in $0^{th}$-order (off state) having a $1^{st}$-order diffraction efficiency of 50% (on state). Instead of requiring two, synchronized, actively mode-locked lasers, such a non-optical pulse picking scheme enables a single, passively mode-locked laser to be used.

In some cases, such a pulse-picking scheme may be implemented in the form of an all-fiber device. When using FAD technology, pulse picking only requires a modulator with a 3 dB on/off extinction ratio and a rise/fall time of tens of nanoseconds. This may make one or more existing all-fiber in-line amplitude modulator schemes viable candidates for high-performance, all-fiber, pulse picking system architectures.

Returning now to the embodiment where two 6FADs of equal length are spliced in series, various results may be accomplished by tailoring the ZOZWP angle optimization. In this case, the two 6FADs are configured to function as a combination of a high-extinction-ratio saturable absorber and an optical limiter. As such, $P_o$ corresponds to a nonlinear phase shift of 40 radians, at which the transmittance is substantially 100%. For Φ>40 radians, the T(Φ) has $\Phi^{-1}$ dependence, thereby providing an optical limiter with a flat transfer function. Over the entire the input power range 40<Φ<75, the output power may be constant to within ~1% percent. This two-6FAD device may be used to filter an input pulse with a Gaussian temporal waveform. Because of the optical limiting behavior of the device, the peak amplitude of the output pulse is clipped at $P=P_o$. Because of the saturable absorber behavior of the device, the clipped output waveform closely resembles a rectangular pulse.

FAD embodiments also provide the basis for a new class of non-reciprocal optical devices. Consider for example a non-reciprocal optical device that compromises a 3 dB attenuator and a 6FAD switch spliced in series. For example, FIG. 28A is a diagrammatic view of an embodiment of an optical system 2800 including a 6FAD 2802 in series with an attenuator 2804 to form a non-reciprocal optical device. For forward propagating light 2806, which passes through the 6FAD switch 2802 first and the 3-dB attenuator 2804 second, the transfer function is:

$$T_{fwd}(P) = \frac{1}{2}\mathrm{Sin}\left(\frac{\pi}{4}\frac{P}{P_o}\right)^4$$

One the other hand, for backward propagating light 2808, which passes through the attenuator 2804 first and the 6FAD switch 2802 second, the transfer function is:

$$T_{fwd}(P) = \frac{1}{2}\mathrm{Sin}\left(\frac{\pi}{2}\frac{P}{P_o}\right)^4$$

Figure 28B:
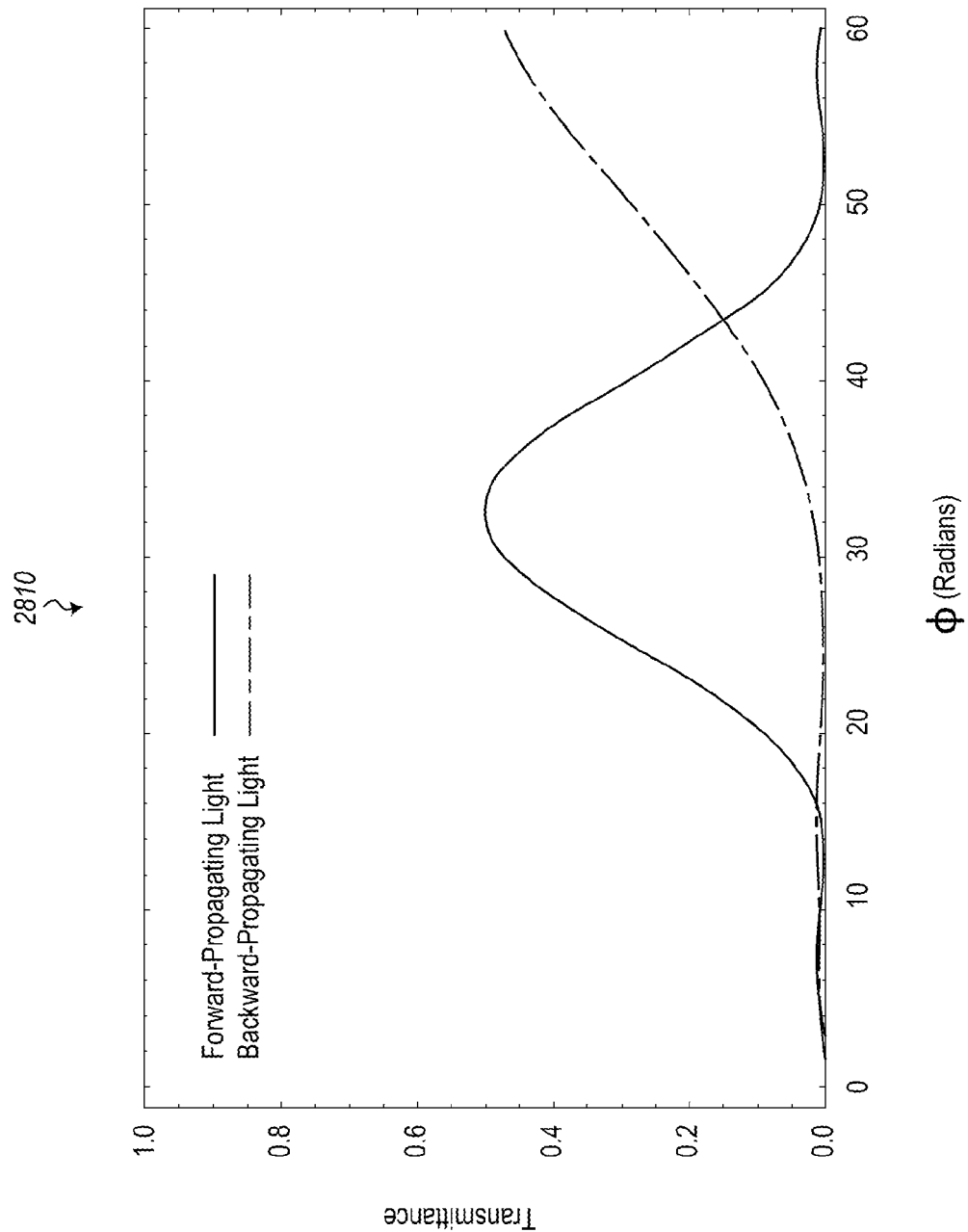
FIG. 28B is a transfer function graph of an embodiment of a power selective optical filter device including a 6FAD arranged in series with an attenuator so that the transfer function is dependent of the direction of propogation of the signal.

As shown in transfer function graph 2810 of FIG. 28B, at an input power of $P_o$, the insertion loss in the forward direction is 3 dB, while the insertion loss in the backward direction is 9 dB (and much greater at slightly lower input powers). Such a device illustrates the manner in which the order of operations performed by an attenuator and a FAD switch do not commute.

An alternative embodiment of the same 6FAD switch device architecture provides substantially zero insertion loss and improved extinction ratio for backward propagating light. Another non-reciprocal optical device may comprise a 4FAD switch and a 10 dB fiber amplifier. In such case, gain may be used rather than loss in conjunction with the non-commutative property of such a device configuration. Unlike the 6FAD device, no signal is being thrown away (i.e. by absorbing it in an attenuator), and a higher forward/backward extinction ratio may be achieved (40 dB instead of 6 dB). Moreover, the extinction ratio may be made much greater than 40 dB by slightly increasing the gain of the fiber amplifier. Unlike a conventional FAD switch, which blocks low-power signals (such as ASE) in both directions and passes high-power pulses in both directions, such a device has the useful property that it blocks low-power signals in both directions and passes high-power pulses in only one direction. There are many potential applications for such a non-reciprocal fiber amplifier. One implementation includes the use of such structure to enforce unidirectional operation of a ring laser cavity without the need for a Faraday isolator.

Figure 21A:
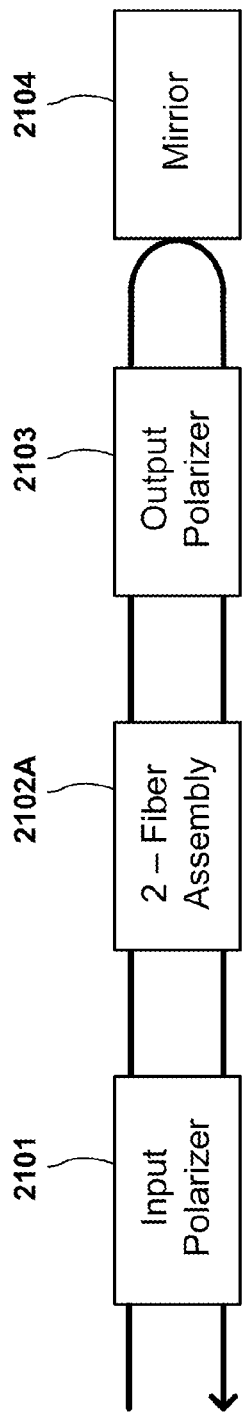
FIGS. 21A and 21B are diagrammatic views of embodiments in which a fiber amplitude discriminator is used in conjunction with input and output polarizers and a mirror to reflect a signal back through the former.
Figure 21B:
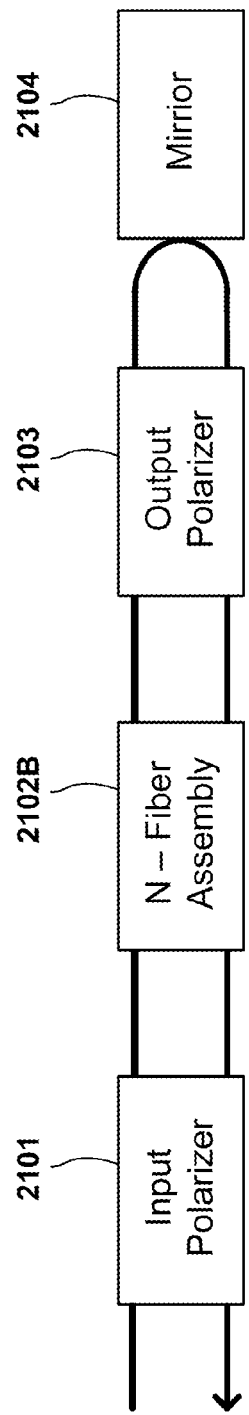

The performance of FAD devices may be evaluated when used in conjunction with non-ideal (i.e. lossy) components. The in-line all-fiber polarizers mentioned above may have an insertion loss of 0.5 dB. Referring to the schematic diagram of FIG. 21B, the transfer function of the mode-locked laser cavity 4FAD-end-mirror assembly is:

$$T(P) = T_{pol} T_{4FAD}(P) T_{pol} R_{FBG} T_{pol} T_{4FAD}(P[T_{pol} T_{4FAD}(P) T_{pol} R_{FBG} T_{pol}]) T_{pol}$$

where $T_{pol}$ is the single-pass polarizer transmittance (89%), and $R_{FBG}$ is the reflectivity of the fiber Bragg grating cavity end mirror 2104 (assumed to be 99%). The signal makes a total of four polarizer passes (through input polarizer 2101 and output polarizer 2103), which account directly for 2.0 dB of loss. The double-passed 4FAD (e.g. N-FAD 2102B) still performs its intended function, but an additional 0.8 dB of loss results from the nonlinear interaction of polarizer insertion loss with the transfer function of the 4FAD switch. While a net insertion loss for the 4FAD may be around 2.8 dB, the net insertion loss for a 2FAD (2102A) cavity end mirror assembly may be around 4.5 dB. It should be noted that substantially any N-FAD configuration may be double-passed, including 4FAD, 6FAD, 8FAD, 10FAD, etc.

This net insertion loss may be alleviated or reduced by different implementations. In the system architecture of the passively mode-locked ring laser 2400 of FIG. 24, the ZOZWP assembly 2405 (e.g., an all fiber ZOZWP assembly) is twisted by about 90° along a longitudinal axis thereof, such that a low-power signal passing through the polarizer 2406 in either direction makes only one pass through the amplifier 2407 before being extinguished (when it reencounters the polarizer). On the other hand, a pulse with a peak power equal to $P_o$ of the ZOZWP assembly 2405, experiences a nonlinear polarization rotation of about 90° inside the ZOZWP assembly 2405. This substantially cancels out the polarization rotation associated with twisting the ZOZWP assembly 2405, such that multi-pass amplification is permitted. Unidirectional operation is the result of the non-commutative interaction of the ZOZWP and the polarizer. In the embodiment shown in FIG. 25, a second polarizer 2406B (in addition to first polarizer 2406A) may be added to bi-directionally block recirculation of ASE in the ring cavity, and to bi-directionally isolate the output of the laser with respect to ASE. It should be understood that the specific permutations of components shown in FIGS. 24 and 25 are meant to be representative rather than limiting.

Figure 24:
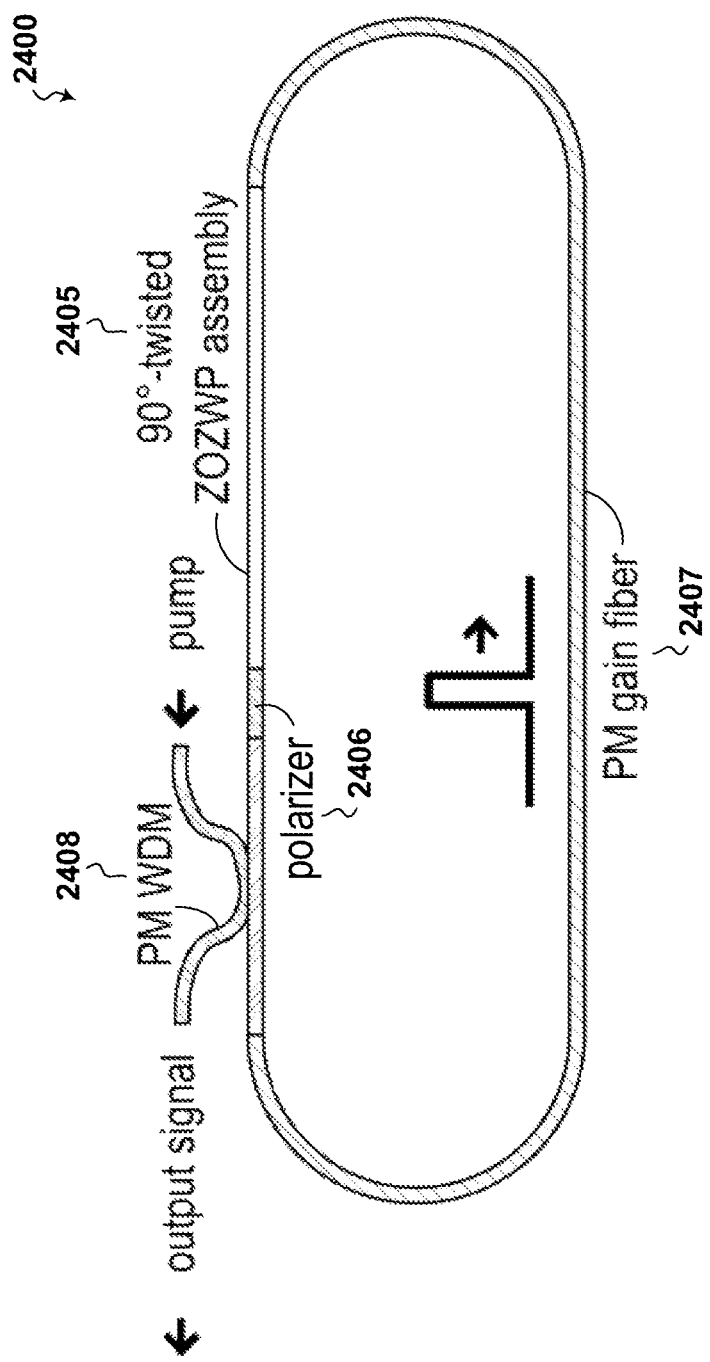
FIG. 24 is a diagrammatic view of an embodiment of a self-starting, passively mode-locked fiber laser with a single polarizer and an about 90 degree twisted ZOZWP.
Figure 25:
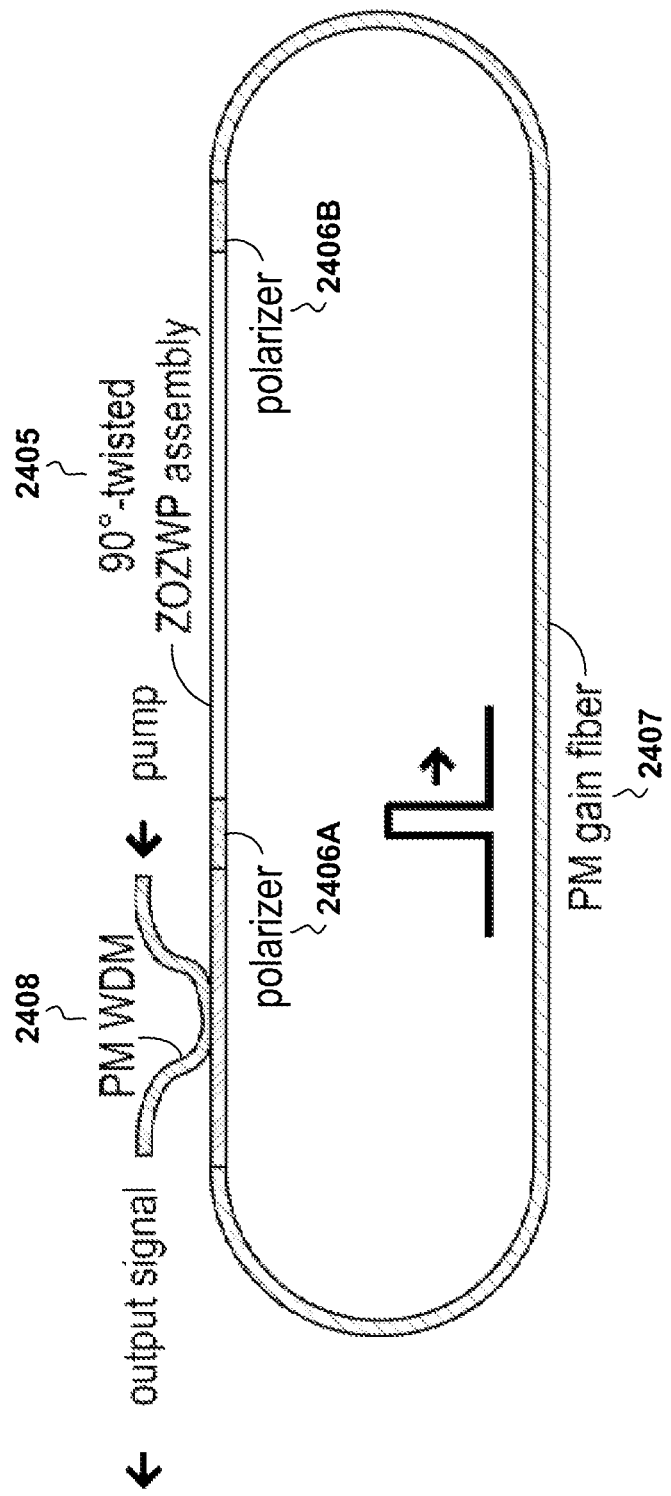
FIG. 25 is a diagrammatic view of another embodiment of a self-starting, passively mode-locked fiber laser with an about 90 degree twisted ZOZWP sandwiched between first and second polarizers.

The two ring laser systems shown in FIGS. 24 and 25 do not explicitly include filters to control the center wavelength and spectral distribution of the mode-locked pulses generated. Such properties may largely be controlled by wavelength distribution of the amplifier gain spectrum. However, such functionality may readily be incorporated. For instance, one or more fiber circulators may be used to insert Fiber Bragg gratings for wavelength and/or dispersion control. This illustrates an advantage of linear cavity configurations (such as those described above); fiber Bragg gratings for wavelength and/or dispersion control (and in some cases, pump multiplexing) may be implemented without the need for circulators (which typically are expensive and have high insertion loss).

On the other hand, a dichroic WDM may be used to (a) band pass filter the component of the signal in the correct (p) polarization so as to control the center wavelength and output spectral distribution, (b) reject (reflect) signal in the wrong (s) polarization so as to provide the functionality of a polarizer, (c) function as an output coupler (described below), (d) multiplex the pump (reflected in either polarization) for either core pumping or cladding pumping, (e) filter out the low-power SRS signal (reflected in either polarization and dumped into the pump source), or in some cases, a subset of the above functions. Light passed by the all-fiber, in-line polarizer enters the dichroic WDM 2408 s-polarized unless it is subject to nonlinear polarization rotation in the ZOZWP assembly 2405. Again it should be understood that the configuration shown described above is meant to be representative rather than limiting. It should also be appreciated that one or more dichroic WDMs could also be used for some or all of the above purposes in any type of non-ring cavity as well.

In one embodiment, a 1080 nm fiber ring mode-locked laser may be provided. Light emerging from the laser's in-line polarizer is p polarized. The ZOZWP assembly is twisted by 90 degrees, such that low-peak-power signals exiting the ZOZWP assembly are s-polarized. All such low-peak-power signals are kicked out of the ring cavity. Under steady state operating conditions, the peak power of the pulse impinging on the FAD is slightly in excess of $P_o$, such that the ZOZWP assembly rotates the polarization slightly beyond 90 degrees. The p-polarized component of this signal is recirculated through the PM fiber amplifier, thereby completing one round trip around the cavity. The s-polarized component of this signal is the output coupled beam. Pulses of peak power <$P_o$ are subject to a positive feedback effect; as the pulses grow in amplitude on successive passes through the fiber amplifier, an ever increasing fraction of their amplitude is recirculated and regeneratively amplified. Pulses of peak power >$P_o$ are subject to a negative feedback effect; as they grow in amplitude, an ever increasing fraction of their amplitude is output coupled rather than recirculated.

Steady state operation at peak powers somewhat in excess of $P_o$ entails reaching an equilibrium condition between round trip cavity loss and round trip cavity gain. Signals arising from spontaneous and stimulated Raman scatting ($\lambda$>1115 nm) are kicked out of the cavity in both the s and p polarizations. Note also that the dichroic has a nominal reflectivity of 100% for pump light (e.g. for $\lambda$<1000 nm) in both the s and p polarizations. The output spectrum of the mode-locked laser is largely dictated by the gain curve of the fiber amplifier, and the long wavelength cutoff of the dichroic filter. In this case a relatively long Yb-doped fiber amplifier with peak gain in the vicinity of 1080 nm is employed. Unidirectional operation results from the non-commutative interaction of cavity losses (polarizers, fiber-to-free-space coupling, etc.) and the nonlinear transfer function of the FAD saturable absorber.

Thus, a single bulk optic may perform the functions of polarizer, wavelength filter, signal output coupler, and pump input coupler. The insertion loss associated with fiber-to-free-space coupling is, in some cases, around 0.25 dB. The insertion loss of the dichroic filter/polarizer is, in some cases, around 0.05 dB. Thus, in this example, the net insertion loss is around 0.30 dB, which compares favorably with all-fiber in-line polarizers (typically 0.5 dB). Moreover, the polarization extinction ratio of the dichroic filter/polarizer is (at least in some cases)>60 dB, which is superior to that of a typical all-fiber in-line polarizer (~30 dB).

Earlier it was noted that while one or more fiber circulators may be used to insert fiber Bragg gratings for wavelength and/or dispersion control in a ring cavity, the expense and high insertion loss associated with optical circulators may be seen as a drawback. In some implementations, fiber-coupled FAD devices that operate in transmission may be used, while in other applications fiber-coupled FAD devices that operate in reflection may be used. Some applications may call for single-stage FAD devices, while other applications may call for multi-pass operation of a single FAD device and/or two or more FAD devices connected in series.

Additional representative embodiments of FAD-based optical devices may be directed towards using a single bulk optic, one or more times, to provide the functionality of a polarizer and wavelength filter, with low insertion loss and high polarization extinction ratio.

Figure 20:
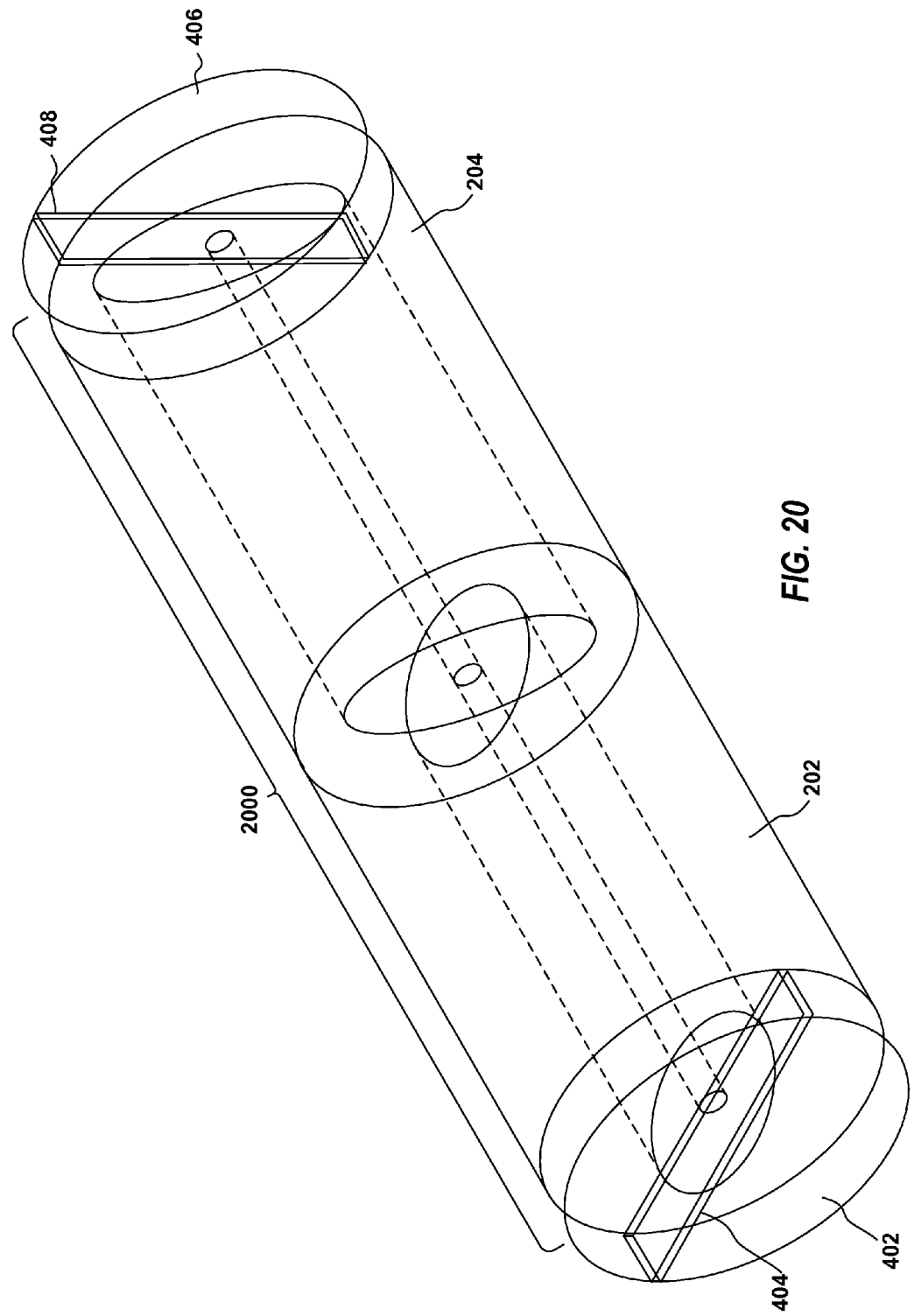
FIG. 20 is an isometric view of an example of a structure having substantially zero net retardation, substantially independent of signal wavelength and ambient temperature, including two wave plates having substantially equal retardation and disposed in a substantially mutually perpendicular orientation sandwiched between and disposed in a specified angular orientation relative to a pair of linear polarizers having substantially mutually perpendicular transmission axes.

For example, one device configuration may perform a function analogous to the all-fiber FAD device of FIG. 20. The differences are (1) only a single polarizing optic is required (i.e. one of polarizers 402 and 406 may be removed), (2) each pass through the polarizer only results in a 0.3 dB insertion loss (as opposed to 0.5 dB insertion loss for an all-fiber in-line polarizer), (3) the polarizer extinction ratio is >60 dB (rather than ~30 dB for an all-fiber in-line polarizer), (4) the polarizing optic also provides >60 dB rejection of SRS. A P-polarized signal within the pass band of the dichroic is transmitted back and forth in the horizontal direction. Some signals may be unwanted such as SRS and in-band signal of the wrong polarization that are rejected in reflection. In particular, note that SRS is rejected at both the input and output of the FAD device. This makes SRS a non-issue. Therefore, two or more such devices may be cascaded or arranged in series without any concern for SRS. In addition, such a device would in no way exacerbate the problem of SRS originating in other components (i.e. a rare-earth doped fiber amplifier), but rather, serve to isolate downstream components from any such SRS.

Another device configuration may include a single-pass FAD device that operates in reflection. Upon entering the device, unwanted are signals reflected by the dichroic, such that they circulate counter-clockwise through to the non-twisted ZOZWP. They are then diverted out of the optical path during their second encounter with the dichroic. In band signals of the correct input polarization (p) circulate in the clockwise direction, undergo nonlinear polarization rotation, and are then rerouted down the input fiber s-polarized. Another device configuration comprises a double-pass FAD device that operates in reflection. And, yet another device configuration also includes a double-pass FAD device that operates in reflection, but uses an FBG mirror rather than a bulk mirror.

Still another device configuration may be directed towards operation of two FAD devices in series. Again, only a single polarizing/wavelength-filtering optic is required. More generally, such a device configuration may be used to operate N-FAD devices in series using a single polarizing/wavelength-filtering optic (in which case 2 n+2 GRIN lenses are used). Alternatively, prefabricated lens arrays could be used. By placing a mirror or FBG at the end of the device's optical path (as in FIGS. 21A and 21B), a device may be created that operates in reflection in which each ZOZWP assembly is double passed. For example, a specified device configuration may be used that has nominally identical ZOZWPs and splice a FBG mirror onto the output pigtail. This would provide a quadruple-pass FAD device that operates in reflection, again requiring only a single polarizing/wavelength-filtering optic. And despite the fact that such a device amounts to four ZOZWP assemblies cascaded in series, the prospect of cascaded SRS is completely eliminated.

It should be understood that the device configurations described above may be implemented in the form of fully packaged fiber pigtailed devices, where the dimensions of the GRIN lenses, dichroic, etc. may be of order mm. In some cases one or more ZOZWP assemblies would be pigtailed to, but largely reside outside the confines of, the packaged assembly (depending on ZOZWP fiber length and fiber bend radius considerations).

In some cases, applications may arise in which the desire to eliminate miniature bulk optics and/or free-space optical paths assumes a higher priority than minimization of insertion loss. A two-stage FAD device may be provided in which three all-fiber, in-line polarizers are co-located on a common substrate. In this manner, they may be fabricated simultaneously. More generally, such a structure may be implemented for N or more FAD devices in series, wherein N+1 all-fiber, in-line polarizers may be co-located on a common substrate, and may be fabricated simultaneously.

A variant of the above all-fiber device architecture may also be provided that incorporates all-fiber, in-line, birefringence filters for suppression of SRS. In one embodiment, a "fiber birefringence-filter wave plate" may comprise a length of polarization maintaining fiber spliced at a 45° angle with respect to the transmission axis of the corresponding all-fiber, in-line input polarizer. In one example scenario, a Yb-doped fiber laser operating at a center wavelength of 1066.1 nm is provided. The length of the fiber birefringence-filter wave plate is 10½ times the beat length of the PM fiber at 1066.1 nm. At 1066.1 nm (281.40 THz), this segment of PM fiber functions as a half-wave plate oriented at 45°. Thus, it rotates the linearly polarized light emerging from the polarizer by 90°. At 1119.4 nm (281.40 THz−13.40 THz=268.00 THz), this same segment of PM fiber is 11 beat lengths long, such that it functions as a full wave plate; it rotates the linearly polarized light emerging from the polarizer by 0°. $\Delta i_{SRS}$=13.40 THz is the frequency shift associated with the peak of the SRS gain curve in fused silica. Thus, 1119.4 nm corresponds to the first order Stokes signal generated by a signal at 1066.1 nm. Accordingly, such a structure, followed immediately by a second, orthogonal, in-line fiber polarizer, may be used to filter out light at, and in the vicinity of, the SRS wavelength.

In essence, a birefringence filter has been provided with a free spectral range (FSR) of 2 $\Delta v_{SRS}$=26.8 THz out of a short length (several centimeters) of PM fiber, so as to create an all fiber structure for in-line filtering of SRS. The signal and SRS wavelengths are separated by ½ FSR. For a PM fiber having a beat length of 3 mm at a wavelength of 1 µm, the physical length of such a 10½λ retarder is of order 3 cm, which is quite practical. Note that because the linearly polarized signal is injected at 45° with respect to the fast/slow axis of the PM fiber segment, the interaction of self-phase modulation and cross phase modulation do not contribute additional polarization rotation.

Continuing the above example, the device could operate at a center wavelength of 1017.6 nm or 1119.4 nm, such that the intermediate segment of PM fiber functions as a full-order wave plate at the signal wavelength and a half-wave plate at the SRS wavelength. A potential advantage of such a scheme is that it entails the fabrication of parallel, rather than perpendicular polarizers, which, depending on the polarizer fabrication process, may be more straightforward. But these two wavelengths lie at the extreme edges of the Yb gain spectrum, which imposes practical limitations.

To work around these limitations, a birefringence filter may be constructed with a free spectral range of ⅔ $\Delta v_{SRS}$=8.93 THz out of a ~9-cm-long segment of PM fiber, so as to create an all fiber structure for in-line filtering of SRS in which the signal and SRS wavelengths are separated by 1.5

FSR. This would allow the use of parallel polarizers because the PM fiber segment represents a 32 λ retarder for light at the signal wavelength, and a 30½ λ retarder for light at the SRS wavelength.

Note that other more exotic birefringence filters (e.g. Lyot, Solc) could be implemented in analogous manner if desired. Lastly, it should be understood that wavelength-selective structures other than a multiple-order wave plate could be incorporated into such an intermediate span of PM fiber, including but not limited to long-period gratings, and SRS-absorbing dopants (discussed previously above).

The embodiments described herein are meant to representative rather than limiting. Numerous variations on the device configurations and concepts presented thus far are may readily be implemented. For example, consider the device configuration above of the series-connected FADs in transmission. In this example, it may be assumed that this device configuration is being used to implement the ultra-high-performance FAD switch comprising two 6FADs in series described above. The transfer function calculated above is that of an ideal device in which the polarizers and other components have zero insertion loss. As discussed earlier, in reality, an insertion loss of 0.30 dB is expected each time the fiber U-bench is traversed (e.g. 93% transmittance for fiber→GRIN lens→dichroic→GRIN lens→fiber propagation). Thus, a signal emerging from the first ZOZWP assembly with a peak power of $P_o$ would impinge upon the $2^{nd}$ ZOZWP assembly with a peak power of only 0.93 $P_o$. This implies that the transmission maxima of the two ZOZWP assemblies would be detuned by 7%, resulting in unnecessary additional insertion loss, and a significant deviation from the theoretical transfer function.

To remedy this issue, the length of the PM fiber segments used to construct the $2^{nd}$ ZOZWP assembly could be made 7% longer than those used to construct the $1^{st}$ ZOZWP assembly, thereby lowering the switching threshold of the $2^{nd}$ ZOZWP by 7%. More generally, fiber lengths, mode-field areas, and/or $n_2$ values may be manipulated so as to compensate for component insertion loss, splice loss, etc. and/or to create other, more exotic achieve transfer functions not attainable by cascading FAD devices having identical switching thresholds. N-FAD assemblies of different equal or unequal fiber lengths may be used to create desirable transfer characteristics. Indeed, N-FAD assemblies may include various combinations of equal or unequal fiber lengths, single-pass or double-pass implementations, or including different N-FAD assemblies in series.

In one example, $\Phi_o$ is 26.7 radians for a 4FAD configured with ZOZWP angles of +22.5° and −22.5°, whereas $\Phi_o$ is 32.7 radians for a 6FAD configured with ZOZWP angles of +15.0°, −15.0°, and +15.0°. Thus, it may be desirable to adjust the length of fibers used in the 4FAD and 6FAD ZOZWP assemblies accordingly, so as to align their transmission maxima. More generally, any number of FAD devices may be cascaded, and some or all such devices may comprise different types of ZOZWP structures. For example, a number of interesting transfer functions may be realized using a 4FAD, 6FAD or 8FAD cascading sequence.

Similarly, there exist numerous embodiments related to device construction that have yet to be described explicitly. One embodiment includes the use of PM fibers including various fiduciary markings adapted to make an accurate determination of PM fiber splice angle. For example, one or more facets, striations, or patterns could be inscribed longitudinally along the length of the PM fiber preform so as to create microscopic features adapted machine vision recognition in the drawn fiber.

It should also be noted that, unless otherwise specified, it should also be understood that each of the components, device configurations, etc. described herein may be applied to fibers incorporating one or more additional cladding structures adapted to transmission of high-power pump light (e.g. double-clad fiber structures).

Another embodiment related to fabrication of ZOZWPs comprising two PM fibers of precisely matched optical path lengths may also be provided. As discussed in the parent application, ideally the two optical retarders comprising each ZOZWP structure are fabricated so as to have identical retardation. For example, a ZOZWP structure fabricated from two segments of PM fiber of identical geometry and composition would ideally be assembled from PM fiber segments of identical length. To the extent that process control limitations impose some degree of variability in the fabrication of such ZOZWP structures, the use of photosensitive fiber is contemplated, adapted to post-fabrication trimming of fiber optical path length, so as to trim any such retardation error to substantially zero. This may also be desirable in situations where one or more non-uniform fiber deployment conditions (e.g. bending) introduce some degree of retardation imbalance.

To implement such an optical path length correction, the nominally ZOZWP structures could be oriented at a predetermined angle (e.g. 45°), between two linear polarizers oriented at predetermined angles (e.g. 0° and 90°), where one end of the above polarizer-ZOZWP-polarizer structure is coupled to a white light source, and the other end of the above polarizer-ZOZWP-polarizer structure is coupled to a spectrum analyzer. Assuming wave plate and polarizer angles of 45°, 0°, and 90° are used as suggested above, a perfectly balanced ZOZWP would result in no transmission of light at any wavelength. To the extent that there existed some degree of retardation imbalance, we would observe an optical spectrum sinusoidally modulated in wavelength.

In this embodiment, assume such a measurement is being conducted on a nominally ZOZWP structure comprising PM fiber segments A and B. If fiber A is side illuminated with a UV source having an appropriate wavelength distribution, the optical path length of fiber segment A will gradually begin to increase, in which case, one of two things may happen. If fiber segment A was too short as manufactured, UV exposure will initially reduce the retardation error, in which case the wavelength period of the sinusoidally modulated white light spectrum will increase. Then fiber segment A would continue to be exposed until the sinusoidal modulation pattern disappears (and the transmitted power reaches a minimum value, ideally zero). If the wrong fiber is exposed, a decrease in the wavelength period of the sinusoidal spectrum may be observed, indicating that UV exposure of fiber segment A is making the retardation imbalance worse. In this case, a user may switch to exposing fiber segment B (e.g. by turning off light source A and turning on light source B).

In some embodiments, an apparatus for ZOZWP trimming may comprise one or more UV lamps (e.g. an Hg lamp with or without wavelength conversion phosphors). In further embodiments, such a lamp (or other light source) may be adapted to provide illumination in the near ultraviolet region (e.g. 330 nm) so as to allow UV exposure through the jacket of the fiber (which is typically opaque at the deep ultraviolet wavelengths commonly used for exposure of photosensitive fibers, such as 248 nm). Alternatively, such an apparatus may comprise a bare Hg lamp (e.g. emitting at 254 nm) illuminating a fiber for which a portion of the fiber jacket has been removed, and/or incorporating a jacket material transparent in a portion of the deep ultraviolet region.

It should be noted that although the present discussion has emphasized FAD devices constructed from fusion-spliced segments of polarization-maintaining fiber, all of the embodiments contemplated herein may also be implemented using bulk optic retarders rather than PM fibers. In particular, such embodiments have numerous applications for pulsed laser systems operating at extremely high peak power. Such bulk optic retarders may be deployed in the form of discrete bulk optics, or merged into a single bulk optic (e.g. by diffusion bonding), and further integrated with polarizing elements, and/or optical coatings adapted to provide polarization and/or wavelength discrimination. Such bulk optics may include weakly guiding gradient-index structures adapted to maintaining a constant beam diameter as a function of propagation distance, or may be adapted to the use of a freely diffracting beam.

Figure 29:
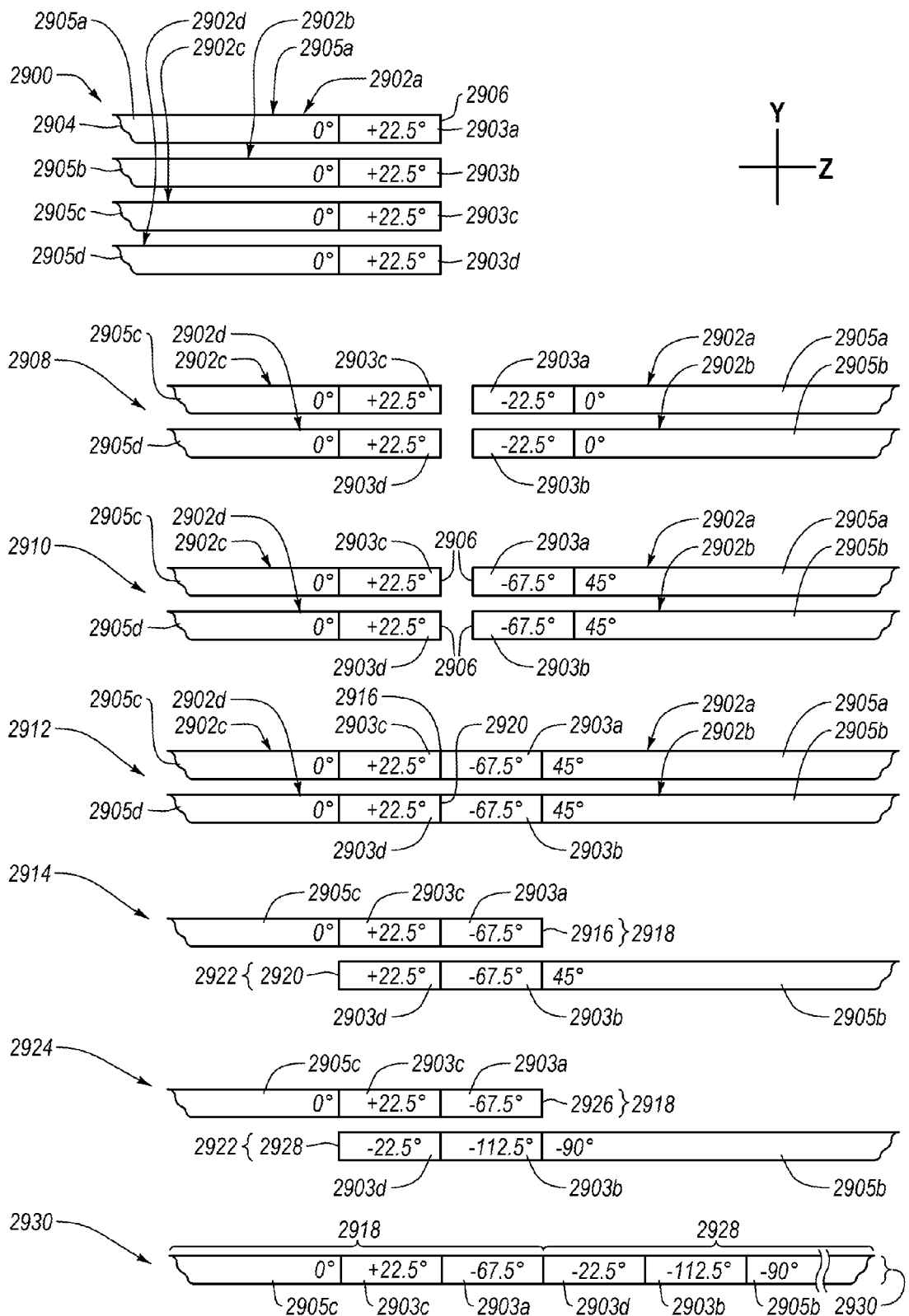
FIG. 29 is a schematic diagram of a method of manufacturing a 4FAD device according to an embodiment.
Figure 30:
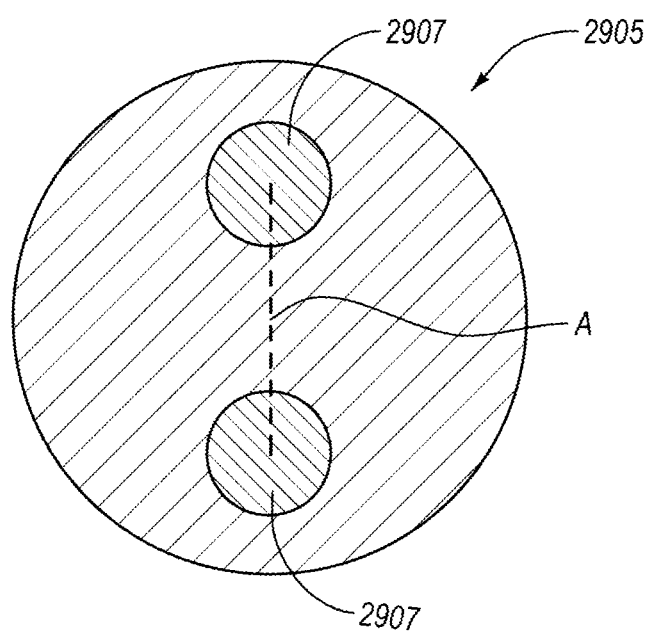
FIG. 30 is a cross-sectional view of a representative polarization-maintaining optical fiber shown in FIG. 29.

The process for fabricating a FAD device may be chosen based on the particular application. For example, manufacturing of very short FAD devices having a length of a few centimeters for use in very high peak power applications can present some challenges. FIG. 29 is a schematic diagram of a method of manufacturing a 4FAD device according to an embodiment. In act 2900, four ribbon-cleaved PM optical fibers 2902a-2902d are provided. Each PM optical fiber 2902a-2902d includes a corresponding PM optical fiber portion 2903a-2903d fusion spliced with a corresponding PM fiber optical portion 2905a-2905d. End 2904 of each PM optical fiber portion 2905a-2905d is shown as jagged and uncleaved, while end 2906 of each PM optical fiber 2903a-2903d is shown as being cleaved by an appropriate technique so that each of the PM optical fiber portions 2903a-2903d have approximately the same length. Each PM optical fiber portion 2905a-2905d has its respective axis A between stress rods 2907 (see FIG. 30) oriented substantially parallel to the y-axis and each PM optical fiber portion 2903a-2903d has its respective slow axis oriented at about +22.5° relative to the y-axis. This is indicated by the 0° and +22.5° on each PM optical fiber 2902a-2902d. However, it should be noted that choosing the orientation relative to y-axis is arbitrary and any of other axis may be used for orientation purposes of the method provided it is used consistently through out all of the acts of the fabrication process.

In act 2908, two of the PM optical fibers 2902a-2902d (e.g., PM optical fibers 2902a and 2902b) may be rotated about 180° about the y-axis to reorient the slow axes of the PM optical fiber portions 2903a and 2903b relative to the y-axis to about −22.5°. In act 2910, the PM optical fibers 2902a and 2902b are rotated about the z-axis to reorient the slow axes of the PM optical fiber portions 2902a and 2902b relative to the y-axis to about −67.5°.

After the reorientation performed in act 2910, in act 2912, the respective cleaved ends 2906 of the PM optical fiber portions 2903c and 2903a may be fusion spliced together and the respective cleaved ends 2906 of the PM optical fiber portions 2903d and 2903b may be fusion spliced together. In act 2914, the PM optical fiber portion 2903a may be cleaved at location 2916 at which it is fusion spliced to form fiber structure 2918 and the PM optical fiber 2902b may be cleaved at location 2920 at which it is fusion spliced to form fiber structure 2922. Even after the cleaving operations, each PM optical fiber portion 2903a-2903 still has substantially the same length.

In act 2924, the fiber structure 2922 may be rotated approximately −45° about the z-axis. In act 2930, cleaved end 2926 of the PM optical fiber portion 290 of the fiber structure 2918 is fusion spliced with cleaved end 2928 of the fiber structure 2922 to form 4FAD device 2932. Because of the two-fold symmetry of the PM fibers 2902a-2902d about the z-axis, the resulting 4FAD device 2932 is equivalent to the four-wave-plate structure 300 shown in FIG. 4.

Other less precise manufacturing methods may be used in longer or lower peak power FAD devices that depart from the method shown in FIG. 29.

The embodiments of the present invention may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

The invention claimed is:

1. A power selective optical filter device, comprising:
    an input polarizer having a transmission axis, the input polarizer configured to selectively transmit at least a portion of an input signal therethrough, wherein the at least a portion of the input signal exhibits a polarization state and a power;
    a wave-plate structure positioned to receive the at least a portion of the input signal, the wave-plate structure including:
        at least a first substantially zero-order, zero-wave plate configured to alter the polarization state of the at least a portion of the input signal passing therethrough in a manner that is dependent on the power of the at least a portion of the input signal, the at least a first substantially zero-order, zero-wave plate including:
            an entry wave plate having a fast axis; and
            an exit wave plate having a fast axis, the fast axis of the entry wave plate oriented at a predetermined angle relative to the fast axis of the exit wave plate, the entry wave plate of the first substantially zero-order, zero-wave plate oriented relative to the transmission axis of the input polarizer at a selected entry-wave-plate angle; and
    an output polarizer positioned to receive the polarization-state-altered signal output from the wave-plate structure, the output polarizer configured to selectively transmit at least a portion of the polarization-state-altered signal based on the polarization state thereof.

2. The power selective optical filter device of claim 1 wherein the at least a first substantially zero-order, zero-wave plate structure comprises only a single one of the at least a first substantially zero-order, zero-wave plate.

3. The power selective optical filter device of claim 1 wherein the output polarizer has a transmission axis that is substantially perpendicular to the transmission axis of the input polarizer such that the power selective optical filter device functions as an optical switch.

4. The power selective optical filter device of claim 1 wherein the output polarizer has a transmission axis that is substantially parallel to the transmission axis of the input polarizer such that the power selective optical filter device functions as an optical limiter.

5. The power selective optical filter device of claim 1 wherein respective transmission axes of the input polarizer and the output polarizer are disposed at predetermined angles to each other relative to provide peak signal power transmittance.

6. The power selective optical filter device of claim 1 wherein the wave-plate structure includes N number of the at least a first substantially zero-order, zero-wave plates, wherein N is a positive, even numbered integer.

7. The power selective optical filter device of claim 1, wherein a transfer function of the power selective optical filter device is tailored to modify one or more specified power selective optical filter device characteristics.

8. The power selective optical filter device of claim 1 wherein the wave-plate structure comprises:
a second substantially zero-order, zero-wave plate arranged in series with the at least a first substantially zero-order, zero-wave plate, the second substantially zero-order, zero-wave plate configured to alter the polarization state of the at least a portion of the input signal passing therethrough in a manner that is dependent on the power of the at least a portion of the input signal, the second substantially zero-order, zero-wave plate including:
an entry wave plate having a fast axis; and
an exit wave plate having a fast axis, the fast axis of the entry wave plate oriented at a predetermined angle relative to the fast axis of the exit wave plate, the entry wave plate of the second substantially zero-order, zero-wave plate oriented relative to the transmission axis of the input polarizer at a selected entry-wave-plate angle.

9. The power selective optical filter device of claim 1 wherein the wave-plate structure comprises:
a second substantially zero-order, zero-wave plate configured to alter the polarization state of the at least a portion of the input signal passing therethrough in a manner that is dependent on the power of the at least a portion of the input signal, the at least one substantially zero-order, zero-wave plate including:
an entry wave plate having a fast axis; and
an exit wave plate having a fast axis, the fast axis of the entry wave plate oriented at a predetermined angle relative to the fast axis of the exit wave plate, the entry wave plate of the second substantially zero-order, zero-wave plate oriented relative to the transmission axis of the input polarizer at a selected entry-wave-plate angle; and
a third substantially zero-order, zero-wave plate configured to alter the polarization state of the at least a portion of the input signal passing therethrough in a manner that is dependent on the power of the at least a portion of the input signal, the at least one substantially zero-order, zero-wave plate including:
an entry wave plate having a fast axis; and
an exit wave plate having a fast axis, the fast axis of the entry wave plate oriented at a predetermined angle relative to the fast axis of the exit wave plate, the entry wave plate of the third substantially zero-order, zero-wave plate oriented relative to the transmission axis of the input polarizer at a selected entry-wave-plate angle;
wherein the at least a first, second, and third substantially zero-order, zero-wave plates are connectively attached to each other in series.

10. The power selective optical filter device of claim 1, further comprising a mirror positioned and configured so that the input signal that is transmitted through the input polarizer, the at least a first substantially, zero-order, zero-wave plate, and the output polarizer, is reflected by the minor back through the output polarizer, the at least a first substantially, zero-order, zero-wave plate, and the input polarizer.

11. The power selective optical filter device of claim 1 wherein each of the entry wave plate and the exit wave plate of the at least a first substantially, zero-order, zero-wave plate comprises a polarization maintaining fiber.

12. The power selective optical filter device of claim 1 wherein each of the entry wave plate and the exit wave plate of the at least a first substantially, zero-order, zero-wave plate comprises a bulk birefringent optical element.

13. The power selective optical filter device of claim 1 wherein:
the input polarizer comprises an input bulk optical medium configured selectively transmit the at least a portion of the input signal; and
the output polarizer comprises an bulk optical medium configured to selectively transmit the at least a portion of the polarization-state-altered signal based on the polarization state thereof.

14. The power selective optical filter device of claim 1 wherein the fast axis of the entry wave plate of the at least a first substantially zero-order, zero-wave plate is oriented at an angle of Θ with respect to the transmission axis of the input polarizer, wherein the angle Θ is about 17.5 degrees to about 27.5 degrees.

15. The power selective optical filter device of claim 14 wherein the angle Θ is about 22.5 degrees.

16. The power selective optical filter device of claim 14 wherein the angle Θ is about 15 degrees.

17. The power selective optical filter device of claim 1, further comprising an attenuator disposed in series with the power selective optical filter device, wherein transmittance of the power selective optical filter is dependent upon a direction that the input signal propagates through the power selective optical filter device.

18. An optical system comprising two optical fiber amplifiers arranged between the power selective optical filter device of claim 1, wherein the power selective optical filter device is configured to limit amplified spontaneous emission generated by the two optical fiber amplifiers.

19. A power selective optical filter device, comprising:
a first power selective optical filter device that includes:
a first input polarizer having a transmission axis, the first input polarizer configured to selectively transmit at least a portion of an input signal therethrough, wherein the at least a portion of the input signal exhibits a polarization state and a power;
a first wave-plate structure positioned to receive the at least a portion of the input signal, the first wave-plate structure including:
a first substantially zero-order, zero-wave plate; and
a second substantially zero-order, zero-wave plate arranged in series with the first substantially zero-order, zero-wave plate and oriented at a selected angle relative to the first substantially zero-order, zero-wave plate, the first and second substantially zero-order, zero-wave plates configured to alter the polarization state of the at least a portion of the input signal passing therethrough in a manner that is dependent on the power of the at least a portion of the input signal, each of the first and second substantially zero-order, zero-wave plates including:
an entry wave plate having a fast axis; and
an exit wave plate having a fast axis, the fast axis of the entry wave plate oriented substantially perpendicular to the fast axis of the exit wave plate, each of the entry wave plates of the first and second substantially zero-order, zero-wave plates oriented relative to the transmission axis of the input polarizer at a respective selected entry-wave-plate angle; and
a first output polarizer positioned to receive the polarization-state-altered signal output from the first wave-plate structure, the first output polarizer configured to selectively transmit at least a portion of the polarization-state-altered signal based on the polarization state thereof; and a second power selective optical filter device arranged in series with the first power selective optical filter device to receive the at least a portion of the polarization-state-altered signal, the second power selective optical filter device includes:

a second wave-plate structure positioned to receive the at least a portion of the input signal from the first power selective optical filter device, the second wave-plate structure including:

a first substantially zero-order, zero-wave plate; and a second substantially zero-order, zero-wave plate arranged in series with the first substantially zero-order, zero-wave plate and oriented at a selected angle relative to the first substantially zero-order, zero-wave plate, the first and second substantially zero-order, zero-wave plates configured to alter the polarization state of the at least a portion of the polarization-state-altered signal passing therethrough in a manner that is dependent on the power of the at least a portion of the polarization-state-altered signal, each of the first and second substantially zero-order, zero-wave plates including:

an entry wave plate having a fast axis; and an exit wave plate having a fast axis, the fast axis of the entry wave plate oriented substantially perpendicular to the fast axis of the exit wave plate, each of the entry wave plates of the first and second substantially zero-order, zero-wave plates oriented relative to the transmission axis of the first input polarizer at a respective selected entry-wave-plate angle; and a second output polarizer positioned to receive the polarization-state-altered signal output from the second wave-plate structure of the second power selective optical filter device, the second output polarizer configured to selectively transmit at least a portion of the polarization-state-altered signal based on the polarization state thereof.

20. The power selective optical filter device of claim 19 wherein the first output polarizer of the first power selective optical filter device functions as an input polarizer for the second power selective optical filter device.

21. The power selective optical filter device of claim 19 wherein the second power selective optical filter device comprises a second input polarizer configured selectively transmit at least a portion of the polarization-state-altered signal based on the polarization state thereof received from the first power selective optical filter device, with the second wave-plate structure positioned between the second input polarizer and the second output polarizer.

22. A self-starting, passively mode-locked fiber laser, comprising:

a polarizer having a transmission axis, the polarizer configured to selectively transmit at least a portion of an input signal therethrough, wherein the at least a portion of the input signal exhibits a polarization state and a power;

a fiber amplifier configured to receive the at least a portion of the input signal and amplify the power of the at least a portion of the input signal; and a wave-plate structure positioned to receive the at least a portion of the amplified input signal from the fiber amplifier, the wave-plate structure including:

at least a first substantially zero-order, zero-wave plate configured to alter the polarization state of the at least a portion of the amplified input signal passing therethrough in a manner that is dependent on the power of the at least a portion of the amplified input signal, the first substantially zero-order, zero-wave plate including:

an entry wave plate having a fast axis; and an exit wave plate having a fast axis, the fast axis of the entry wave plate oriented at a predetermined angle relative to the fast axis of the exit wave plate, the entry wave plate of the first substantially zero-order, zero-wave plate oriented relative to the transmission axis of the polarizer at a selected entry-wave-plate angle;

wherein the wave-plate structure is twisted along a longitudinal axis thereof such that signals having a power below a threshold power level passing through the polarizer in either direction make only one pass through the fiber amplifier before being substantially extinguished when the signal reencounters the polarizer.

23. The self-starting, passively mode-locked fiber laser of claim 22 wherein the wave-plate structure is twisted about the longitudinal axis thereof about 90°.

24. The self-starting, passively mode-locked fiber laser of claim 22, further comprising a second polarizer, wherein the second polarizer is configured to bi-directionally block recirculation of amplified spontaneous emission in a ring cavity of the self-starting, passively mode-locked fiber laser.

25. The self-starting, passively mode-locked fiber laser of claim 24 wherein the second polarizer bi-directionally isolates the output signal of the self-starting, passively mode-locked fiber laser relative to the amplified spontaneous emission.

* * * * *